(12) United States Patent
Yu et al.

(10) Patent No.: US 12,245,132 B2
(45) Date of Patent: Mar. 4, 2025

(54) PATH SWITCHING METHOD, COMMUNICATION APPARATUS, AND COMMUNICATION SYSTEM

(71) Applicant: HUAWEI TECHNOLOGIES CO., LTD., Guangdong (CN)

(72) Inventors: Fang Yu, Shenzhen (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 355 days.

(21) Appl. No.: 17/687,195

(22) Filed: Mar. 4, 2022

(65) Prior Publication Data
US 2022/0225211 A1 Jul. 14, 2022

Related U.S. Application Data

(63) Continuation of application No. PCT/CN2020/070752, filed on Jan. 7, 2020.

(30) Foreign Application Priority Data

Sep. 6, 2019 (WO) ................ PCT/CN2019/104809

(51) Int. Cl.
*H04W 40/34* (2009.01)
*H04W 28/02* (2009.01)
(Continued)

(52) U.S. Cl.
CPC ....... *H04W 40/34* (2013.01); *H04W 28/0268* (2013.01); *H04W 40/12* (2013.01);
(Continued)

(58) Field of Classification Search
CPC ..... H04W 40/34; H04W 40/36; H04W 40/38; H04W 40/12; H04W 40/125;
(Continued)

(56) References Cited

U.S. PATENT DOCUMENTS

2017/0238215 A1  8/2017  Jin

FOREIGN PATENT DOCUMENTS

| CN | 104038971 A | 9/2014 |
| CN | 104285472 A | 1/2015 |

(Continued)

OTHER PUBLICATIONS

Extended European Search Report issued in European Application No. 20860253.2 on Sep. 26, 2022, 9 pages.
(Continued)

*Primary Examiner* — Ian N Moore
*Assistant Examiner* — Brian T Le
(74) *Attorney, Agent, or Firm* — Fish & Richardson P.C.

(57) ABSTRACT

This application provides example path switching methods, example communication apparatuses, and example communication systems. One example method includes obtaining, by a session management network element, a context of a first transport layer connection, where the first transport layer connection is between a source transport layer proxy network element and a terminal device. In response to determining that a protocol data unit (PDU) session anchor for the terminal device needs to be changed, the session management network element can send the context of the first transport layer connection to a target transport layer proxy network element, where the context is used to establish a third transport layer connection between the target transport layer proxy network element and the terminal device.

19 Claims, 23 Drawing Sheets

(51) Int. Cl.
*H04W 36/00* (2009.01)
*H04W 40/12* (2009.01)
*H04W 40/28* (2009.01)
*H04W 76/12* (2018.01)
*H04W 80/06* (2009.01)

(52) U.S. Cl.
CPC ........... *H04W 40/28* (2013.01); *H04W 76/12* (2018.02); *H04W 36/00695* (2023.05); *H04W 80/06* (2013.01)

(58) Field of Classification Search
CPC ..... H04W 40/14; H04W 40/16; H04W 40/28; H04W 76/12; H04W 12/02; H04W 28/0268; H04W 80/06; H04L 63/00
See application file for complete search history.

(56) References Cited

FOREIGN PATENT DOCUMENTS

| | | |
|---|---|---|
| CN | 109417741 A | 3/2019 |
| CN | 110167092 A | 8/2019 |
| WO | 2017194172 A1 | 11/2017 |
| WO | 2019147970 A1 | 8/2019 |

OTHER PUBLICATIONS

3GPP TR 23.793 V16.0.0 (Dec. 2018), "3rd Generation Partnership Project; Technical Specification Group Services and System Aspects; Study on access traffic steering, switch and splitting support in the 5G system architecture (Release 16)," Dec. 2018, 114 pages.

3GPP TS 23.501 V16.1.0 (Jun. 2019), "3rd Generation Partnership Project; Technical Specification Group Services and System Aspects; System Architecture for the 5G System; Stage 2 (Release 16)," Jun. 2019, 367 pages.

Huawei, HiSilicon, "TS 23.502: Clarification of Xn based HO," SA WG2 Meeting #124, S2-178811, Reno, USA, Nov. 27-Dec. 1, 2017, 20 pages.

PCT International Search Report and Written Opinion issued in International Application No. PCT/CN2019/104809 on May 28, 2020, 19 pages (with English translation).

PCT International Search Report and Written Opinion issued in International Application No. PCT/CN2020/070752 on Jun. 10, 2020, 17 pages (with English translation).

PATH SWITCHING METHOD, COMMUNICATION APPARATUS, AND COMMUNICATION SYSTEM

CROSS-REFERENCE TO RELATED APPLICATIONS

This application is a continuation of International Application No. PCT/CN2020/070752, filed on Jan. 7, 2020, which claims priority to International Application No. PCT/CN2019/104509, filed on Sep. 6, 2019. The disclosures of the aforementioned applications are hereby incorporated by reference in their entireties.

TECHNICAL FIELD

This application relates to the communication field, and more specifically, to a path switching method, a communication apparatus, and a communication system.

BACKGROUND

In a communication system, when a terminal device moves from a coverage area of an original base station to a coverage area of a current base station, an air interface handover is triggered, that is, a base station of the terminal device is handed over from the original base station to the current base station. Although a location of the terminal device changes, the terminal device still accesses an original user plane network element in this case. Actually, a user plane network element closest to the terminal device may have changed, but the terminal device still performs packet transmission with the original user plane network element. In this case, a transmission path is long. Accordingly, a packet transmission latency increases, affecting user experience.

SUMMARY

This application provides a path switching method, a communication apparatus, and a communication system. In a path switching process, because a status interaction case of a service layer is fully considered, a service latency can be reduced, and user experience can be improved.

According to a first aspect, a path switching method is provided. The method includes: if a source transport layer proxy network element determines that path switching needs to be performed, switching, by the source transport layer proxy network element, a data transmission path from a first path to a second path after receiving a complete service response packet sent by a first application server for a service request, where the first path is a path established between a terminal device and the first application server, the first path includes a first transport layer connection and a second transport layer connection, the first transport layer connection is a transport layer connection between the source transport layer proxy network element and the terminal device, the second transport layer connection is a transport layer connection between the source transport layer proxy network element and the first application server, the second path includes a third transport layer connection and a fourth transport layer connection, the third transport layer connection is a transport layer connection between a target transport layer proxy network element and the terminal device, and the fourth transport layer connection is a transport layer connection between the target transport layer proxy network element and a second application server.

According to the path switching method provided in this application, the terminal device may separately establish a transport layer connection to the source transport layer proxy network element and the target transport layer proxy network element. When path switching needs to be performed, the source transport layer proxy network element may switch the data transmission path from the transport layer connection between the terminal device and the source transport layer proxy network element to the transport layer connection between the terminal device and the target transport layer proxy network element after receiving the complete service response packet for the service request sent by the terminal device. In this way, a problem that a same service request needs to be repeatedly initiated after path switching because the complete service response packet for the service request sent by the terminal device is not received can be avoided. In the method provided in this application, because a status interaction case of a service layer is fully considered, a service latency can be reduced, and user experience can be improved.

In this application, the first transport layer connection may be a multipath transmission control protocol (multipath transmission control protocol, MPTCP) connection, or may be a transmission control protocol (multipath transmission control protocol, TCP) connection, and the second transport layer connection may be a TCP connection. In addition, the first transport layer connection may alternatively be a quick UDP internet connection (Quick UDP Internet Connections, QUIC), and the second transport layer connection may be a user datagram protocol (user datagram protocol, UDP) connection.

The third transport layer connection may be an MPTCP connection, or may be a TCP connection, and the fourth transport layer connection may be a TCP connection. In addition, the third transport layer connection may alternatively be a quick UDP internet connection (Quick UDP Internet Connections, QUIC), and the fourth transport layer connection may be a user datagram protocol (user datagram protocol, UDP) connection. If the first transport layer connection is an MPTCP connection, the third transport layer connection is also an MPTCP connection. If the first transport layer connection is a TCP connection, the third transport layer connection is also a TCP connection.

With reference to the first aspect, in some implementations of the first aspect, the switching a data transmission path from a first path to a second path includes: indicating, by the source transport layer proxy network element, the terminal device to switch the data transmission path from the first transport layer connection to the third transport layer connection, where the first transport layer connection and the third transport layer connection are multipath transmission control protocol (multipath transmission control protocol, MPTCP) connections, and the first transport layer connection and the third transport layer connection belong to a same MPTCP session.

Therefore, the terminal device may switch the data transmission path from the first transport layer connection to the third transport layer connection based on an indication of the source transport layer proxy network element.

With reference to the first aspect, in some implementations of the first aspect, the method further includes: sending, by the source transport layer proxy network element, a context of the first transport layer connection to the target transport layer proxy network element, where the context is used to establish the third transport layer connection;

After establishment of the first transport layer connection is completed, the source transport layer proxy network element sends the context of the first transport layer connection to the target transport layer proxy network element, so that the target transport layer proxy network element may establish the third transport layer connection.

With reference to the first aspect, in some implementations of the first aspect, the switching a data transmission path from a first path to a second path includes: sending, by the source transport layer proxy network element, a context of the first transport layer connection to the target transport layer proxy network element, where the context includes a first transport layer connection parameter and a transmission status parameter, the first transport layer connection parameter is used to generate the third transport layer connection, and the transmission status parameter is used to indicate a data transmission status of the first transport layer connection.

Optionally, both the first transport layer connection and the third transport layer connection are TCP connections.

With reference to the first aspect, in some implementations of the first aspect, the indicating, by the source transport layer proxy network element, the terminal device to switch the data transmission path from the first transport layer connection to the third transport layer connection includes: adjusting, by the source transport layer proxy network element, a priority of the first transport layer connection, so that a priority of the third transport layer connection is higher than the priority of the first transport layer connection.

With reference to the first aspect, in some implementations of the first aspect, the sending, by the source transport layer proxy network element, a context of the first transport layer connection to the target transport layer proxy network element includes: sending, by the source transport layer proxy network element, the context to the target transport layer proxy network element by sending the context to a session management network element.

With reference to the first aspect, in some implementations of the first aspect, the determining, by a source transport layer proxy network element, that path switching needs to be performed includes: receiving, by the source transport layer proxy network element, a path switching indication message sent by the session management network element.

With reference to the first aspect, in some implementations of the first aspect, the determining, by a source transport layer proxy network element, that path switching needs to be performed includes: receiving, by the source transport layer proxy network element, a third transport layer connection establishment complete message, where the third transport layer connection establishment complete message is used to indicate that establishment of the third transport layer connection is completed.

With reference to the first aspect, in some implementations of the first aspect, both the source transport layer proxy network element and the target transport layer proxy network element are user plane network elements, or both the source transport layer proxy network element and the target transport layer proxy network element are mobile edge computing (mobile edge computing, MEC) platform network elements.

With reference to the first aspect, in some implementations of the first aspect, both the source transport layer proxy network element and the target transport layer proxy network element are mobile edge computing MEC platforms; and before the sending, by the source transport layer proxy network element, a context of the first transport layer connection to the target transport layer proxy network element, the method further includes: receiving, by the source transport layer proxy network element, a data network access identifier (data network access identifier, DNAI) change notification sent by a session management network element, where the DNAI change notification includes a target DNAI; and determining, by the source transport layer proxy network element, the target transport layer proxy network element based on the target DNAI.

With reference to the first aspect, in some implementations of the first aspect, the context includes some or more of the following: an internet protocol (internet protocol, IP) address and a port number that are used by the terminal device for the first transport layer connection, hash encryption algorithm information used for the first transport layer connection, key (Key) information used for the first transport layer connection, a mapping relationship between a data sequence number (data sequence number, DSN) and a subflow sequence number (subflow sequence number, SSN), and an initial subflow sequence number (initial subflow sequence number, ISSN).

With reference to the first aspect, in some implementations of the first aspect, the first application server and the second application server provide a same application service.

According to a second aspect, a path switching method is provided. The method includes: receiving, by a target transport layer proxy network element, a context of a first transport layer connection, where the first transport layer connection is a transport layer connection between a source transport layer proxy network element and a terminal device; establishing, by the target transport layer proxy network element, a third transport layer connection to the terminal device based on the context; and after completing establishment of the third transport layer connection, sending, by the target transport layer proxy network element, a third transport layer connection establishment complete message to a session management network element or the source transport layer proxy network element, where the third transport layer connection establishment complete message is used to indicate that the establishment of the third transport layer connection is completed.

According to the method provided in this application, the target transport layer proxy network element may establish the third transport layer connection based on the context of the first transport layer connection. Therefore, when the terminal device needs to perform path switching, a data transmission path may be switched from the first transport layer connection to the third transport layer connection.

With reference to the second aspect, in some implementations of the second aspect, both the source transport layer proxy network element and the target transport layer proxy network element are user plane network elements, or both the source transport layer proxy network element and the target transport layer proxy network element are mobile edge computing MEC platform network elements.

According to a third aspect, a path switching method is provided. The method includes: obtaining, by a session management network element, a context of a first transport layer connection, where the first transport layer connection is a transport layer connection between a source transport layer proxy network element and a terminal device; and when a protocol data unit (protocol data unit, PDU) session (session) anchor for the terminal device needs to be changed, sending, by the session management network element, the context of the first transport layer connection to a target transport layer proxy network element, where the context is used to establish a third transport layer connection between the target transport layer proxy network element and the terminal device.

According to the method provided in this application, the session management network element may send the context of the first transport layer connection between the terminal device and the source transport layer proxy network element to the target transport layer proxy network element, so that the target transport layer proxy network element may establish the third transport layer connection to the terminal device based on the context. Further, when the terminal device needs to perform path switching, a data transmission path may be switched from the first transport layer connection to the third transport layer connection.

With reference to the third aspect, in some implementations of the third aspect, the method further includes: when determining that establishment of the third transport layer connection is completed, sending, by the session management network element, path switching indication information to the source transport layer proxy network element, where the path switching indication information is used to indicate the source transport layer proxy network element to switch a data transmission path from the first transport layer connection to the third transport layer connection.

Based on this solution, the source transport layer proxy network element may determine, based on the switching indication information, that the establishment of the third transport layer connection is completed.

With reference to the third aspect, in some implementations of the third aspect, the path switching indication information is specifically used to indicate the source transport layer proxy network element to modify a priority of the first transport layer connection, so that a priority of the third transport layer connection is higher than the priority of the first transport layer connection.

With reference to the third aspect, in some implementations of the third aspect, the first transport layer connection and the third transport layer connection are multipath transmission control protocol MPTCP connections, and the first transport layer connection and the third transport layer connection belong to a same MPTCP session.

With reference to the third aspect, in some implementations of the third aspect, both the source transport layer proxy network element and the target transport layer proxy network element are user plane network elements.

According to a fourth aspect, a path switching method is provided. The method includes: when a terminal device determines that path switching needs to be performed, switching, by the terminal device, a data transmission path from a first path to a second path after receiving a complete service response packet for a service request, where
the first path is a path established between the terminal device and a first application server, the first path includes a first transport layer connection and a second transport layer connection, the first transport layer connection is a transport layer connection between a source transport layer proxy network element and the terminal device, the second transport layer connection is a transport layer connection between the source transport layer proxy network element and the first application server, the second path includes a third transport layer connection and a fourth transport layer connection, the third transport layer connection is a transport layer connection between a target transport layer proxy network element and the terminal device, and the fourth transport layer connection is a transport layer connection between the target transport layer proxy network element and a second application server.

According to the path switching method provided in this application, the terminal device may separately establish a transport layer connection to the source transport layer proxy network element and the target transport layer proxy network element. When path switching needs to be performed, the terminal device may switch from the transport layer connection to the source transport layer proxy network element to the transport layer connection to the target transport layer proxy network element after receiving the complete service response packet for the service request sent by the terminal device. In this way, a problem that a same service request needs to be repeatedly initiated after path switching because the complete service response packet for the service request sent by the terminal device is not received can be avoided. In the method provided in this application, because a status interaction case of a service layer is fully considered, a service latency can be reduced, and user experience can be improved.

With reference to the fourth aspect, in some implementations of the fourth aspect, the service response packet is received by the terminal device from the source transport layer proxy network element, and the service response packet indicates that a priority of the third transport layer connection is higher than a priority of the first transport layer connection.

With reference to the fourth aspect, in some implementations of the fourth aspect, the determining, by a terminal device, that path switching needs to be performed includes: receiving, by the terminal device, a third transport layer connection establishment complete message sent by the target transport layer proxy network element, where the third transport layer connection establishment complete message is used to indicate that establishment of the third transport layer connection is completed; or receiving, by the terminal device, path switching indication information sent by a session management network element.

With reference to the fourth aspect, in some implementations of the fourth aspect, the first transport layer connection and the third transport layer connection are multipath transmission control protocol MPTCP connections, and the first transport layer connection and the third transport layer connection belong to a same MPTCP session.

With reference to the fourth aspect, in some implementations of the fourth aspect, both the source transport layer proxy network element and the target transport layer proxy network element are user plane network elements, or both the source transport layer proxy network element and the target transport layer proxy network element are mobile edge computing MEC platform network elements.

With reference to the fourth aspect, in some implementations of the fourth aspect, the first application server and the second application server provide a same application service.

According to a fifth aspect, a path switching method is provided. A first transport layer connection is established between a terminal device and a first application server, a second transport layer connection is established between the terminal device and a second application server, and the method includes: when determining that path switching needs to be performed, switching, by the terminal device, a data transmission path from the first transport layer connection to the second transport layer connection after receiving a complete service response packet sent by the first application server for a service request, where the service request comes from the terminal device.

According to the path switching method provided in this application, the terminal device may separately establish a transport layer connection to the first application server and the second application server. When path switching needs to be performed, the terminal device may switch from the first transport layer connection to the second transport layer connection after receiving the complete service response packet for the service request sent by the terminal device. In this way, a problem that a same service request needs to be repeatedly initiated after path switching because the complete service response packet for the service request sent by the terminal device is not received can be avoided. In the method provided in this application, because a status interaction case of a service layer is fully considered, a service latency can be reduced, and user experience can be improved.

With reference to the fifth aspect, in some implementations of the fifth aspect, the determining, by the terminal device, that path switching needs to be performed includes: receiving, by the terminal device, path switching indication information sent by a session management network element.

With reference to the fifth aspect, in some implementations of the fifth aspect, the first transport layer connection and the second transport layer connection are multipath transmission control protocol MPTCP connections, and the first transport layer connection and a third transport layer connection belong to a same MPTCP session.

With reference to the fifth aspect, in some implementations of the fifth aspect, the first application server and the second application server provide a same application service.

According to a sixth aspect, a path switching method is provided. The method includes: when a source transport layer proxy network element determines that path switching needs to be performed, sending, by the source transport layer proxy network element, a new service request packet and a context of a first transport layer connection to a target transport layer proxy network element if the source transport layer proxy network element receives the new service request packet sent by a terminal device, where the context of the first transport layer connection is used by the target transport layer proxy network element to establish a third transport layer connection, the third transport layer connection is a transport layer connection between the target transport layer proxy network element and the terminal device, and the first transport layer connection is a transport layer connection between the terminal device and the source transport layer proxy network element.

According to a seventh aspect, a path switching method is provided. The method includes: receiving, by a target transport layer proxy network element, a new service request packet and a context of a first transport layer connection that are sent by a source transport layer proxy network element; sending, by the target transport layer proxy network element, the new service request packet to a second application server through a fourth transport layer connection, where the fourth transport layer connection is a transport layer connection between the target transport layer proxy network element and the second application server; establishing, by the target transport layer proxy network element, a third transport layer connection to a terminal device based on the context of the first transport layer connection, where the first transport layer connection is a transport layer connection between the terminal device and the source transport layer proxy network element; and receiving, by the target transport layer proxy network element, a packet sent by the terminal device through the third transport layer connection, and sending the packet to the second application server through the fourth transport layer connection.

Herein, the new service request packet means that a service request packet is not a segmented service request packet, or a service request packet is a segmented service request packet and is the first segment.

It should be understood that a complete service request packet corresponding to one service request may be divided into a plurality of segments for transmission. To be specific, one segment may be transmitted each time, and a server responds to all segments after receiving all the segments. Alternatively, a server responds to each segment. In this case, the server needs to return a response to the terminal device based on one or more received segments (where for example, the server may return a response based on the first segment service request after receiving the first segment service request, to indicate the terminal device to continue to send a subsequent segment request; and return a response based on the first segment service request and the second segment service request after receiving the second service request). After receiving a complete response packet sent by the server, the terminal device may send a new service request packet.

The first transport layer connection and the second transport layer connection may be TCP connections.

According to the path switching method provided in this application, a transport layer connection is established between the source transport layer proxy network element and the terminal device. After the source transport layer proxy network element determines that path switching needs to be performed and detects the new service request packet sent by the terminal device, a status of the first transport layer connection on the source transport layer proxy network element may be migrated to the target transport layer proxy network element, so that a transmission path of a packet may be switched from a path to a first application server to a path to the second application server. According to this method, it can be ensured that a complete status interaction process is performed on a same path, to ensure an ultra-low latency requirement of an application in an application migration process.

With reference to the sixth aspect or the seventh aspect, in some implementations, the context of the first transport layer connection includes a first transport layer connection parameter and a first transmission status parameter, the first transport layer connection parameter is used to generate the third transport layer connection, and the first transmission status parameter is used to indicate a data transmission status of the first transport layer connection.

With reference to the sixth aspect, in some implementations of the sixth aspect, the determining, by a source transport layer proxy network element, that path switching needs to be performed includes: receiving, by the source transport layer proxy network element, a path switching indication message sent by a session management network element.

With reference to the seventh aspect, in some implementations of the seventh aspect, before the sending, by the target transport layer proxy network element, the new service request packet to a second application server through a fourth transport layer connection, the method further includes: receiving, by the target transport layer proxy network element, IP address information of the second application server sent by a session management network element, and establishing the fourth transport layer connection based on the IP address information.

According to an eighth aspect, a path switching method is provided. The method includes: receiving, by a target transport layer proxy network element, a context of a first transport layer connection and a context of a second transport layer connection that are sent by a source transport layer proxy network element, where the first transport layer connection is a transport layer connection between the source transport layer proxy network element and a terminal device, and the second transport layer connection is a transport layer connection between the source transport layer proxy network element and a first application server; generating, by the target transport layer proxy network element, a third transport layer connection based on the context of the first transport layer connection, and generating a fifth transport layer connection based on the context of the second transport layer connection, where the third transport layer connection is a transport layer connection between the target transport layer proxy network element and the terminal device, and the fifth transport layer connection is a transport layer connection between the target transport layer proxy network element and the first application server; and if the target transport layer proxy network element receives, through the third transport layer connection, a new service request packet sent by the terminal device, switching, by the target transport layer proxy network element, a data transmission path from a first path to a second path, where the first path is a path established between the terminal device and the first application server, the first path includes the third transport layer connection and the fifth transport layer connection, the second path includes the third transport layer connection and a fourth transport layer connection, the fourth transport layer connection is a transport layer connection between the target transport layer proxy network element and a second application server, the second transport layer connection is a transport layer connection between the source transport layer proxy network element and the first application server, the context of the first transport layer connection is used by the target transport layer proxy network element to generate the third transport layer connection, the context of the second transport layer connection is used by the target transport layer proxy network element to generate the fifth transport layer connection, the third transport layer connection is the transport layer connection between the target transport layer proxy network element and the terminal device, and the fifth transport layer connection is the transport layer connection between the target transport layer proxy network element and the first application server.

Herein, the new service request packet means that a service request packet is not a segmented service request packet, or a service request packet is a segmented service request packet and is the first segment.

It should be understood that a complete service request packet corresponding to one service request may be divided into a plurality of segments for transmission. To be specific, one segment may be transmitted each time, and a server (for example, the first application server or the second application server) responds to all segments after receiving all the segments. Alternatively, a server responds to each segment. In this case, the server needs to return a response to the terminal device based on one or more received segments (where for example, the server may return a response based on the first segment service request after receiving the first segment service request, to indicate the terminal device to continue to send a subsequent segment request; and return a response based on the first segment service request and the second segment service request after receiving the second service request). After receiving a complete response packet sent by the server, the terminal device may send a new service request packet. Alternatively, the terminal device may send a new service request packet at any time. The new service request packet, a corresponding response packet, a subsequent segmented packet corresponding to the new service request packet, and a response packet corresponding to the segmented packet are transmitted through the second path. Another service request packet and a corresponding service response packet are transmitted through a third path.

The first transport layer connection, the second transport layer connection, the third transport layer connection, and the fifth transport layer connection may all be TCP connections.

According to the method provided in this application, a transport layer connection is established between the source transport layer proxy network element and the terminal device. When the source transport layer proxy network element determines that path switching needs to be performed, a transport layer connection status on the source transport layer proxy network element is migrated to the target transport layer proxy network element. In addition, after detecting the new service request packet sent by the terminal device, the target transport layer proxy network element switches a transmission path of the service request packet from a transport layer connection between the target transport layer proxy network element and the first application server to a transport layer connection between the target transport layer proxy network element and the second application server. According to this method, it can be ensured that a complete status interaction process is performed on a same path, to ensure an ultra-low latency requirement of an application in an application migration process.

With reference to the eighth aspect, in some implementations of the eighth aspect, before the switching, by the target transport layer proxy network element, a data transmission path from a first path to a second path, the method further includes: obtaining, by the target transport layer proxy network element, IP address information of the second application server from a session management network element; and establishing the fourth transport layer connection based on the IP address information.

With reference to the eighth aspect or the ninth aspect, in some implementations, the context of the first transport layer connection includes a first transport layer connection parameter and a first transmission status parameter, the first transport layer connection parameter is used to generate the third transport layer connection, and the first transmission status parameter is used to indicate a data transmission status of the first transport layer connection; and the context of the second transport layer connection includes a second transport layer connection parameter and a second transmission status parameter, the second transport layer connection parameter is used to generate the fifth transport layer connection, and the second transmission status parameter is used to indicate a data transmission status of the second transport layer connection.

According to a tenth aspect, a path switching method is provided. The method includes: when a terminal device determines that path switching needs to be performed, switching, by the terminal device, a data transmission path from a first transport layer connection to a second transport layer connection if a to-be-sent service request packet is a new service request packet, where the first transport layer connection is a transport layer connection between the terminal device and a first application server, and the second transport layer connection is a transport layer connection between the terminal device and a second application server.

If the to-be-sent service request packet is the new service request packet, the method includes that the to-be-sent service request packet is a segmented service request packet and is the first segment of a complete service request packet corresponding to the to-be-sent service request packet; or the to-be-sent service request packet is not a segmented service request packet.

According to the method provided in this application, the first application server and the second application server each may establish a transport layer connection to the terminal device. When path switching needs to be performed, the terminal device switches from the transport layer connection to the first application server to the transport layer connection to the second application server if the terminal device determines that the to-be-sent service request packet is the new service request packet. According to the method, it can be ensured that path switching is performed after a complete status interaction process is completed, to ensure an ultra-low latency requirement of an application in an application migration process.

Optionally, the determining, by a terminal device, that path switching needs to be performed includes: receiving, by the terminal device, path switching indication information sent by a session management network element; or determining, by the terminal device, that establishment of the second transport layer connection is completed.

Optionally, the first transport layer connection and the second transport layer connection are multipath transmission control protocol MPTCP connections, and the first transport layer connection and a third transport layer connection belong to a same MPTCP session.

Optionally, the first application server and the second application server provide a same application service.

According to an eleventh aspect, a path switching method is provided. The method includes: when a terminal device determines that path switching needs to be performed, if a to-be-sent service request packet is a new service request packet, switching, by the terminal device, a data transmission path from a first path to a second path, where the first path is a path established between the terminal device and a first application server, the first path includes a first transport layer connection and a second transport layer connection, the first transport layer connection is a transport layer connection between a source transport layer proxy network element and the terminal device, the second transport layer connection is a transport layer connection between the source transport layer proxy network element and the first application server, the second path includes a third transport layer connection and a fourth transport layer connection, the third transport layer connection is a transport layer connection between a target transport layer proxy network element and the terminal device, and the fourth transport layer connection is a transport layer connection between the target transport layer proxy network element and a second application server.

The first transport layer connection and the second transport layer connection may be MPTCP connections.

If the to-be-sent service request packet is the new service request packet, the method includes that the to-be-sent service request packet is a segmented service request packet and is the first segment of a complete service request packet corresponding to the to-be-sent service request packet; or the to-be-sent service request packet is not a segmented service request packet.

According to the method provided in this application, the source transport layer proxy network element and the target transport layer proxy network element each may establish a transport layer connection to the terminal device. When path switching needs to be performed, the terminal device switches from the transport layer connection to the first application server to the transport layer connection to the second application server if the terminal device determines that the to-be-sent service request packet is the new service request packet. According to the method, it can be ensured that path switching is performed after a complete status interaction process is completed, to ensure an ultra-low latency requirement of an application in an application migration process.

Optionally, the determining, by a terminal device, that path switching needs to be performed includes: receiving, by the terminal device, a third transport layer connection establishment complete message sent by the target transport layer proxy network element, where the third transport layer connection establishment complete message is used to indicate that establishment of the third transport layer connection is completed; or receiving, by the terminal device, path switching indication information sent by a session management network element.

Optionally, the first transport layer connection and the third transport layer connection are multipath transmission control protocol MPTCP connections, and the first transport layer connection and the third transport layer connection belong to a same MPTCP session.

Optionally, both the source transport layer proxy network element and the target transport layer proxy network element are user plane network elements, or both the source transport layer proxy network element and the target transport layer proxy network element are mobile edge computing MEC platform network elements.

Optionally, the first application server and the second application server provide a same application service.

According to a twelfth aspect, a path switching method is provided. The method includes: when a source transport layer proxy network element determines that path switching needs to be performed, sending, by the source transport layer proxy network element, a new service request packet and a context of a first transport layer connection to a target transport layer proxy network element if the source transport layer proxy network element receives the new service request packet sent by a terminal device, where the context of the first transport layer connection is used by the target transport layer proxy network element to establish a third transport layer connection, the third transport layer connection is a transport layer connection between the target transport layer proxy network element and the terminal device, and the first transport layer connection is a transport layer connection between the terminal device and the source transport layer proxy network element; sending, by the target transport layer proxy network element, the new service request packet to a second application server through a fourth transport layer connection, where the fourth transport layer connection is a transport layer connection between the target transport layer proxy network element and the second application server; establishing, by the target transport layer proxy network element, the third transport layer connection based on the context of the first transport layer connection; and receiving, by the target transport layer proxy network element, a packet sent by the terminal device through the third transport layer connection, and sending the packet to the second application server through the fourth transport layer connection.

Herein, the new service request packet means that a service request packet is not a segmented service request packet, or a service request packet is a segmented service request packet and is the first segment.

It should be understood that a complete service request packet corresponding to one service request may be divided into a plurality of segments for transmission. To be specific, one segment may be transmitted each time, and a server responds to all segments after receiving all the segments. Alternatively, a server responds to each segment. In this case, the server needs to return a response to the terminal device based on one or more received segments (where for example, the server may return a response based on the first segment service request after receiving the first segment service request, to indicate the terminal device to continue to send a subsequent segment request; and return a response based on the first segment service request and the second segment service request after receiving the second service request). After receiving a complete response packet sent by the server, the terminal device may send a new service request packet.

The first transport layer connection and the second transport layer connection may be TCP connections.

According to the path switching method provided in this application, a transport layer connection is established between the source transport layer proxy network element and the terminal device. After the source transport layer proxy network element determines that path switching needs to be performed and detects the new service request packet sent by the terminal device, a status of the first transport layer connection on the source transport layer proxy network element may be migrated to the target transport layer proxy network element, so that a transmission path of a packet may be switched from a path to a first application server to a path to the second application server. According to this method, it can be ensured that a complete status interaction process is performed on a same path, to ensure an ultra-low latency requirement of an application in an application migration process.

According to a thirteenth aspect, a path switching method is provided. The method includes: receiving, by a source transport layer proxy network element, status migration indication information sent by a session management network element; sending, by the source transport layer proxy network element, a context of a first transport layer connection and a context of a second transport layer connection to a target transport layer proxy network element based on the status migration indication information, where the first transport layer connection is a transport layer connection between the source transport layer proxy network element and a terminal device, the second transport layer connection is a transport layer connection between the source transport layer proxy network element and a first application server, the context of the first transport layer connection is used by the target transport layer proxy network element to generate a third transport layer connection, the context of the second transport layer connection is used by the target transport layer proxy network element to generate a fifth transport layer connection, the third transport layer connection is a transport layer connection between the target transport layer proxy network element and the terminal device, and the fifth transport layer connection is a transport layer connection between the target transport layer proxy network element and the first application server;

generating, by the target transport layer proxy network element, the third transport layer connection based on the context of the first transport layer connection, and generating the fifth transport layer connection based on the context of the second transport layer connection; and if the target transport layer proxy network element receives, through the third transport layer connection, a new service request packet sent by the terminal device, switching, by the target transport layer proxy network element, a data transmission path from a first path to a second path, where the first path is a path established between the terminal device and the first application server, the first path includes the third transport layer connection and the fifth transport layer connection, the second path includes the third transport layer connection and a fourth transport layer connection, and the fourth transport layer connection is a transport layer connection between the target transport layer proxy network element and a second application server.

Herein, the new service request packet means that a service request packet is not a segmented service request packet, or a service request packet is a segmented service request packet and is the first segment.

The first transport layer connection, the second transport layer connection, the third transport layer connection, and the fifth transport layer connection may all be TCP connections.

According to the method provided in this application, a transport layer connection is established between the source transport layer proxy network element and the terminal device. When the source transport layer proxy network element determines that path switching needs to be performed, a transport layer connection status on the source transport layer proxy network element is migrated to the target transport layer proxy network element. In addition, after detecting the new service request packet sent by the terminal device, the target transport layer proxy network element switches a transmission path of the service request packet from a transport layer connection between the target transport layer proxy network element and the first application server to a transport layer connection between the target transport layer proxy network element and the second application server. According to this method, it can be ensured that a complete status interaction process is performed on a same path, to ensure an ultra-low latency requirement of an application in an application migration process.

According to a fourteenth aspect, a communication apparatus is provided and includes modules or units configured to perform the method according to any one of the first aspect to the thirteenth aspect and the possible implementations of the first aspect to the thirteenth aspect.

According to a fifteenth aspect, a communication apparatus is provided and includes a processor. The processor is coupled to a memory, and may be configured to execute instructions in the memory, to implement the method according to any one of the first aspect or the thirteenth aspect and the possible implementations of the first aspect or the thirteenth aspect. Optionally, the communication apparatus further includes the memory. Optionally, the communication apparatus further includes a communication interface, and the processor is coupled to the communication interface.

According to a sixteenth aspect, a processor is provided and includes an input circuit, an output circuit, and a processing circuit. The processing circuit is configured to: receive a signal through the input circuit, and transmit a signal through the output circuit, so that the processor performs the method according to any one of the first aspect to the thirteenth aspect and the possible implementations of the first aspect to the thirteenth aspect.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in this embodiment of this application.

According to a seventeenth aspect, a processing apparatus is provided and includes a processor and a memory. The processor is configured to: read instructions stored in the memory, receive a signal through a receiver, and transmit a signal through a transmitter, to perform the method according to any one of the first aspect to the thirteenth aspect and the possible implementations of the first aspect to the thirteenth aspect.

Optionally, there are one or more processors, and there are one or more memories.

Optionally, the memory may be integrated with the processor, or the memory and the processor are separately disposed.

In a specific implementation process, the memory may be a non-transitory (non-transitory) memory, for example, a read-only memory (read only memory, ROM). The memory and the processor may be integrated on a same chip, or may be separately disposed on different chips. A type of the memory and a manner of disposing the memory and the processor are not limited in this embodiment of this application.

It should be understood that, a related data exchange process, for example, sending of indication information may be a process of outputting the indication information from the processor, and receiving of indication information may be a process of receiving the indication information by the processor. Specifically, data output by the processor may be output to the transmitter, and input data received by the processor may be from the receiver. The transmitter and the receiver may be collectively referred to as a transceiver.

The processing apparatus according to the seventeenth aspect may be one or more chips. The processor in the processing apparatus may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in a memory. The memory may be integrated into the processor, or may be located outside the processor and exist independently.

According to an eighteenth aspect, a computer program product is provided. The computer program product includes a computer program (also referred to as code or instructions). When the computer program is run, a computer is enabled to perform the method according to any one of the first aspect to the thirteenth aspect and the possible implementations of the first aspect to the thirteenth aspect.

According to a nineteenth aspect, a computer-readable medium is provided. The computer-readable medium stores a computer program (also referred to as code or instructions). When the computer program is run on a computer, the computer is enabled to perform the method according to any one of the first aspect to the thirteenth aspect and the possible implementations of the first aspect to the thirteenth aspect.

According to a twentieth aspect, a communication system is provided and includes at least two of the source transport layer proxy network element, the target transport layer proxy network element, the first application server, the second application server, and the session management network element. Optionally, the communication system may further include the terminal device described above.

DESCRIPTION OF EMBODIMENTS

The following describes technical solutions of this application with reference to the accompanying drawings.

The technical solutions in embodiments of this application may be applied to various communication systems, for example, a long term evolution (long term evolution, LTE) system, a universal mobile telecommunication system (universal mobile telecommunication system, UNITS), a worldwide interoperability for microwave access (worldwide interoperability for microwave access, WiMAX) communication system, a 5th generation (5th generation, 5G) system, a new radio (new radio, NR) system, and another new system that emerges with the development of a technology.

Figure 1:
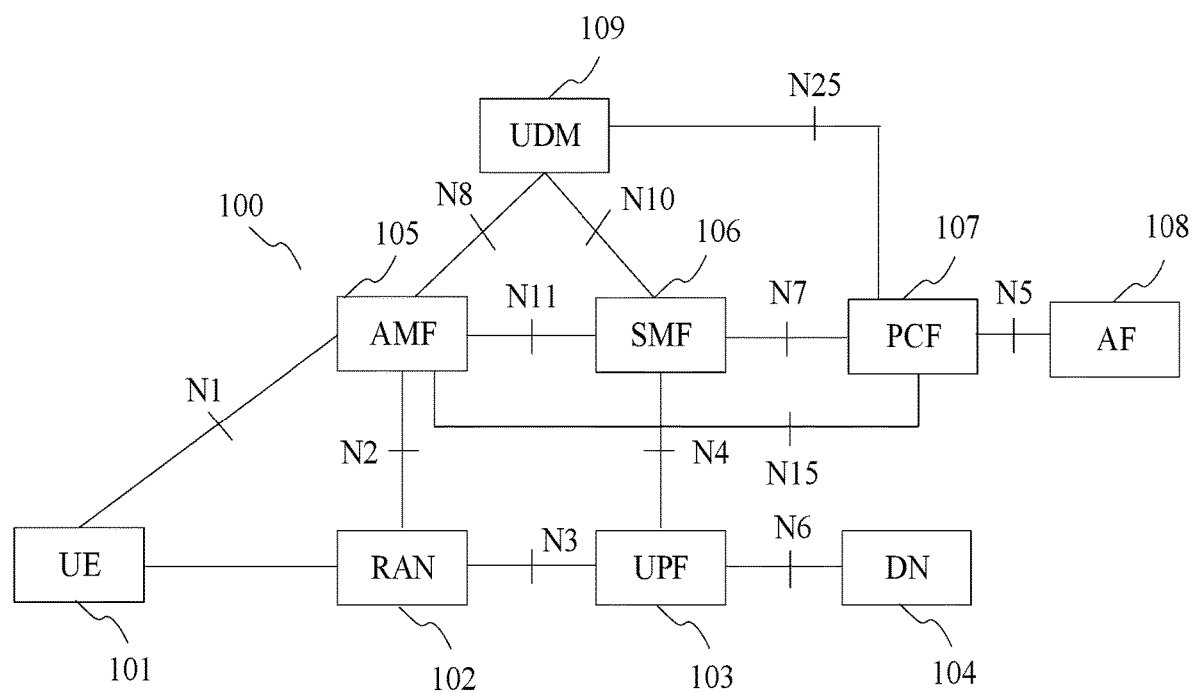
FIG. 1 is a schematic diagram of an architecture of a 5G system applied to this application.

FIG. 1 is a schematic diagram of a 5G system that may be applied to this application. As shown in FIG. 1, the system may be divided into two parts: an access network and a core network. The access network is used to implement a radio access-related function, and mainly includes a radio access network (radio access network, RAN) device 102. The core network mainly includes the following several key logical network elements: a user plane function (user plane function) 103, an access and mobility management function (access and mobility management function, AMF) 105, a session management function (session management function, SMF) 106, a policy control function (policy control function, PCF) 107, and a unified data management function (unified data management) 109. The system 100 may further include user equipment (user equipment, UE) 101, a data network (data network, DN) 104, and an application function (application function, AF) 108. An interface between network elements is that shown in FIG. 1. It should be understood that network elements may further communicate with each other through a service-oriented interface.

The UE may also be referred to as a terminal device. The terminal device may communicate with one or more core networks (core networks, CNs) through a RAN device. The terminal device may also be referred to as an access terminal, a terminal, a subscriber unit, a subscriber station, a mobile station, a remote station, a remote terminal, a mobile device, a user terminal, a wireless network device, a user agent, or a user apparatus. The terminal may be a cellular phone, a cordless phone, a session initiation protocol (session initiation protocol, SIP) phone, a wireless local loop (wireless local loop, WILL) station, a personal digital assistant (personal digital assistant, PDA), a handheld device having a wireless communication function, a computing device, another device connected to a wireless modem, a vehicle-mounted device, a wearable device, a terminal device in an internet of things, a terminal device in an internet of vehicles, any form of terminal device in a future network, or the like.

The RAN device is a device for connecting a terminal device to a wireless network, and may be specifically a base station. There may be various forms of base stations, for example, a macro base station, a micro base station (also referred to as a small cell), a relay station, and an access point. Specifically, the base station may be an access point (access point, AP) in a wireless local area network (wireless local area network, WLAN), a base transceiver station (base transceiver station, BTS) in a global system for mobile communications (global system for mobile communications, GSM) or code division multiple access (code division multiple access, CDMA), a NodeB (NodeB, NB) in wideband code division multiple access (wideband code division multiple access, WCDMA), an evolved NodeB (Evolved NodeB, eNB, or eNodeB) in LTE, a relay station, an access point, a vehicle-mounted device, a wearable device, a next generation NodeB (the next generation NodeB, gNB) in a 5G system, a base station in a future evolved public land mobile network (public land mobile network, PLMN) network, or the like. For ease of description, in all embodiments of this application, the RAN device is collectively referred to as a base station.

The UDM provides functions such as managing subscription data of a user and generating authentication information of the user.

The AMF is mainly responsible for functions such as registration management of the UE, connection management of the UE, reachability management of the UE, access authorization and access authentication of the UE, a security function of the UE, mobility management of the UE, network slice (network slice) selection, and SMF selection. The AMF serves as an anchor of an N1/N2 interface signaling connection, provides an N1/N2 interface session management (session management, SM) message routing for the SMF, and maintains and manages status information of the UE.

The SMF is mainly responsible for all control plane functions in UE session management. The control plane functions include UPF selection and control, internet protocol (internet protocol, IP) address assignment and management, quality of service (quality of service, QoS) management of a session, obtaining of a policy and charging control (policy and charging control, PCC) policy from the PCF, and the like. The SMF is also used as a termination of an SM part that is in a non-access stratum (non-access stratum, NAS) message.

The PCF has functions such as providing a policy rule for a control plane functional entity.

The AF may be an application server that may belong to an operator or a third party.

The UPF is mainly responsible for processing a user packet, for example, forwarding and charging, and may be used as an anchor of a protocol data unit (protocol data unit, PDU) session (session) connection, that is, a PDU session anchor (PDU session anchor, PSA) that is responsible for UE data packet filtering, data transmission/forwarding, rate control, charging information generation, user plane QoS processing, uplink transmission authentication, transmission class verification, downlink data packet cache, downlink data notification triggering, and the like. The UPF may also serve as a branching point for a multi-homed (multi-homed) PDU session.

The DN is a network that provides a data transmission service for a user, for example, is an IP multimedia service (IP Multimedia service, IMS) or the internet. The DN may include an application server (application server, AS). The AS is a software framework, provides an environment in which an application program runs, and is configured to provide the application program with services such as security, data, transaction support, load balancing, and large-scale distributed system management. The UE communicates with the AS to obtain an application packet. It should be noted that the AF is a control plane of the AS.

It should be understood that the embodiments of this application are not limited to being applied only to the system architecture shown in FIG. 1. For example, a communication system to which the communication method in the embodiments of this application may be applied may include more or fewer network elements or devices. The devices or the network elements in FIG. 1 may be hardware, or may be software obtained through functional division, or a combination thereof. The devices or the network elements in FIG. 1 may communicate with each other through another device or network element.

To effectively meet requirements of a high bandwidth and a low latency required for rapid development of the mobile internet and the internet of things and reduce network load, mobile edge computing (mobile edge computing, MEC) is proposed. Specifically, an MEC platform network element is deployed at the edge UPF, so that a low-latency and high-bandwidth service can be provided for the UE. The MEC platform network element is mainly used to implement coordination between an application and a network. For example, the MEC platform network element provides MEC application-related configuration information for an MEC application server to enable interaction between the UE and an MEC application, and provides MEC application-related information, including availability of the MEC application, for the UE. The MEC platform network element, an anchor UPF, and the application server may be deployed in a same data center.

It should be understood that the MEC platform network element and the UPF may be deployed as independent network elements, or a function of the MEC platform network element may be deployed on the UPF.

It should be noted that the solution in this application is applicable to a scenario in which the MEC platform network element is deployed. In this application, the MEC platform network element, the MEC platform, the MEC network element, and the MEC (for example, the source MEC (source MEC, S-MEC) and the target MEC (target MEC, T-MEC)) are interchangeable.

In a communication system, when UE moves from a coverage area of an original base station to a coverage area of a current base station, an air interface handover is triggered, that is, a base station of the UE is handed over from the original base station to the current base station. Although a location of the UE changes, the UE still accesses an original user plane network element in this case. Actually, a user plane network element closest to the UE may have changed, but the UE still performs packet transmission with the original user plane network element. In this case, a transmission path is long. Accordingly, a packet transmission latency increases. To reduce the packet transmission latency, it is necessary to switch a transmission path from the original user plane network element to a new user plane network element, that is, to perform PSA relocation.

Figure 2:
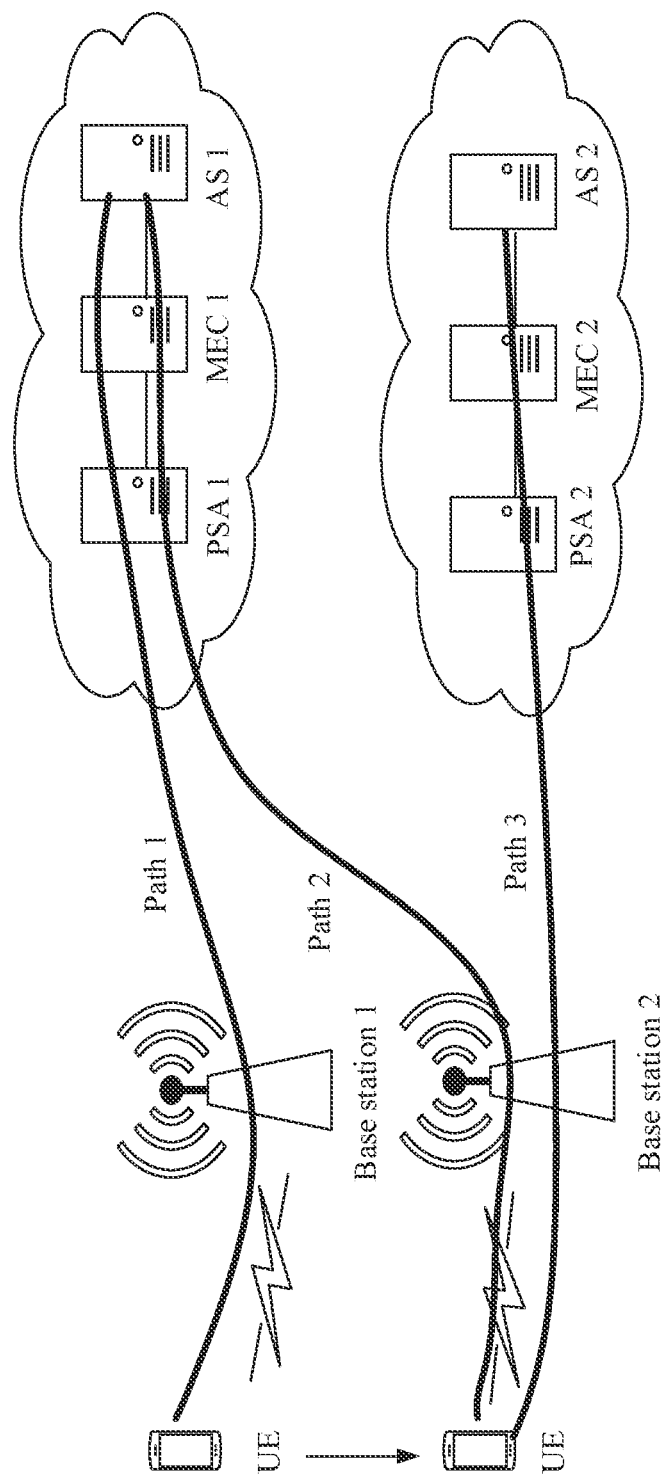
FIG. 2 is a schematic diagram of a PSA relocation scenario.

FIG. 2 is a schematic diagram of a PSA relocation scenario. As shown in FIG. 2, an AS 1 and an AS 2 may provide a same application service. When UE moves from a coverage area of a base station 1 to a coverage area of a base station 2, an air interface handover is first triggered. Before the handover, user plane data is transmitted through a path 1, and after the handover, user plane data is transmitted through a path 2. However, in this case, the UE accesses a user plane anchor PSA 1 through the base station 2, and a user plane transmission path is detoured. As a result, a path latency increases. For some low-latency services, for example, in a typical scenario with a 5-ms latency requirement, if an anchor is not switched from the PSA 1 to a PSA 2 in this case, that is, the user plane transmission path is switched from the path 2 to a path 3, and the path 2 is still used, a latency of the path 2 further increases when the UE continues to move, and the 5-ms latency requirement cannot be met. Therefore, the user plane transmission path needs to be switched from the path 2 to the path 3.

PSA relocation may be implemented in two PDU session modes: (1) a service and session continuity mode (service and session continuity mode, SSC mode) 3; and (2) an uplink classifier (uplink classifier, UL CL).

The SSC mode 3 means that when an SMF determines to switch a user plane path, if a user plane path of an original PDU session is not an optimal path due to UE movement, the SMF requests the UE to reestablish a new PDU session to a same DN, and the SMF selects a new PSA for the reestablished PDU session and requests the UE to release the original PDU session when a timer expires or after a previous service flow has been transferred to the new PDU session.

The UL CL means that the SMF may insert a UL CL into a data transmission path of the original PDU session when adding a new PSA UPF to the original PDU session. A "UL CL" function is provided by the UPF to forward a data packet that meets a service filtering rule to a specified path. When the UPF having the "UL CL" function is inserted into a PDU session data channel, this PDU session may provide, through a plurality of PSAs, a plurality of different paths access to a same DN. The "UL CL" function is to transmit uplink data to different PDU session anchors and combine and transmit downlink data to the UE. A common scenario is that the UPF having the UL CL function and the newly added anchor UPF are co-located, that is, the newly added PSA UPF also has the UL CL function.

For detailed content of the SSC mode 3 and the UL CL, refer to an existing technology.

The foregoing manners of performing path switching by using the SSC mode 3 and the UL CL do not consider a status exchange case of a service layer. Consequently, a service latency may increase, and user experience is affected.

To resolve the foregoing problem, this application provides a plurality of path switching methods. In these methods, a source transport layer proxy network element (for example, a PSA UPF or an MEC platform network element) performs path switching after one time of complete status exchange at a service layer, so that a service latency can be reduced, and user experience can be improved.

Before the method in this application is described in detail, some concepts mentioned in this application are first briefly described.
1. Hypertext Transfer Protocol (hyperText Transfer Protocol, HTTP)

In this protocol, a client obtains application data from a server by using an HTTP request (HTTP request)/HTTP response (HTTP response) message.

The HTTP is a stateless application layer protocol. To be specific, content requested by a current HTTP request is unrelated to a previous HTTP request sent by the client.
2. Transmission Control Protocol (Transmission Control Protocol, TCP)

The TCP is a connection-oriented, reliable, and byte stream-based transport layer communication protocol. To ensure reliability of packet transmission, the TCP allocates a sequence number to each packet. In addition, the sequence number also ensures that packets transmitted to a receive end are received in sequence. The receive end returns a corresponding acknowledgment (acknowledgment, ACK) for a successfully received byte. If a transmit end does not receive the acknowledgment within a proper round-trip time (round-trip time, RTT), corresponding data (assuming that the data is lost) is retransmitted.

A procedure of establishing a TCP connection is described by using an example in which a TCP connection is established between a client and a server.

The client and the server establish the TCP connection based on a TCP three-way handshake process:

(1) The client sends a TCP synchronization sequence number (synchronize sequence numbers, SYN) message to the server, and waits for an acknowledgment of the server.

(2) After receiving the TCP SYN message, the server returns a SYN+ACK message.

(3) After receiving the SYN+ACK message, the client returns another ACK message to acknowledge that the SYN+ACK message has been received.

3. Multipath TCP (Multipath TCP, MPTCP)

The MPTCP is a multipath TCP protocol used for multipath transmission. A core idea of the MPTCP is to add a multipath TCP layer, between an application layer and a transport layer, that supports multipath transmission, to implement multipath transmission.

Figure 3:
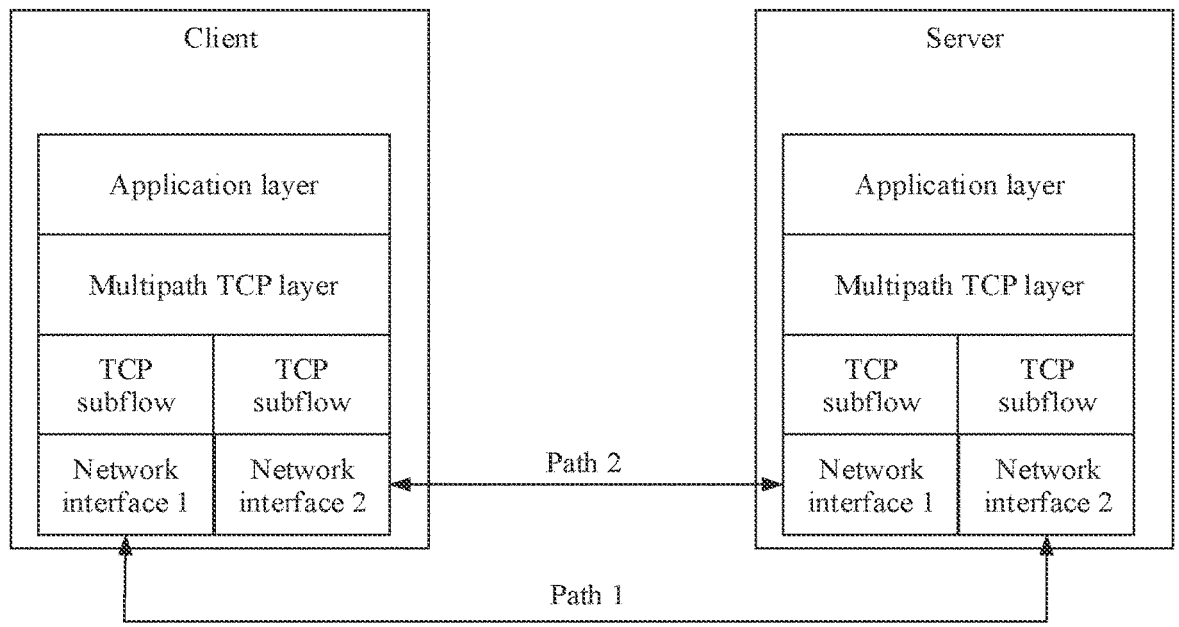
FIG. 3 is a schematic diagram of an MPTCP protocol architecture.

An example in which a client sends data to a server is used. As shown in FIG. 3, a multipath TCP layer of the client may divide data transmitted at an application layer into a plurality of TCP subflows, different TCP subflows are sent to the server through different network interfaces, and the server aggregates the different TCP subflows at an MPTCP layer and sends the aggregated TCP subflows to an application layer, to implement multipath transmission between the client and the server.

The client and the server establish an MPTCP connection based on an MPTCP three-way handshake process:

(1) The client sends a TCP SYN message to the server. An MPTCP option field includes an MP_CAPABLE option, and the option includes a session key (Key) of the client, (2) If supporting the MPTCP, the server returns a SYN+ACK message. An MPTCP option field also includes an MP_CAPABLE option, and the option carries a key of the server.

(3) The client returns an ACK message. An MPTCP option field includes an MP_CAPABLE option, and the option carries the key of the client and the key of the server.

The session key Key is used by the client and the server to separately generate a token (token) used to identify an MPTCP session between the client and the server.

The session key Key is further used by the client and the server to generate a 32-bit hash shared key, that is, a hash-based message authentication code (Hash-based message authentication code, HMAC). In this way, when a new connection is established on the MPTCP session, the client and the server use the hash-based message authentication code as authentication information to perform authentication. Therefore, after three-way handshakes, one of two communication ends obtains MPTCP session data of the other end.

4. Newly Create an MPTCP Connection

An MPTCP session may have two (or more) MPTCP connections. In an MPTCP session, a process of newly creating an MTPCP connection is similar to the three-way handshake process. A difference lies in that a message carries an UP JOIN option instead of the MP_CAPABLE option. MP_JOIN may include a token value of an original session (connection) and a hash shared key of a peer end. The hash shared key of the peer end is used for authentication, and the token value of the original session is used to indicate that the newly generated MPTCP connection joins the original session. In addition, MP_JOIN may further include a random number, to prevent a replay attack. MP_JOIN may further include an address of a transmit end. In this way, even if network address translation (Network Address Translation, NAT) is performed on an address value of the transmit end, the peer end can still obtain the address of the transmit end.

The following describes the method provided in this application with reference to the concepts described above.

It should be understood that, for any method described below, these steps or operations in the method are merely examples. In actual operations, other operations or variations of some operations in the method may be further performed to implement the method. In addition, for a method shown in any of the accompanying drawings, steps in the method may be performed in a sequence different from that presented in the figure, and not all the operations in the figure may be performed.

Figure 4:
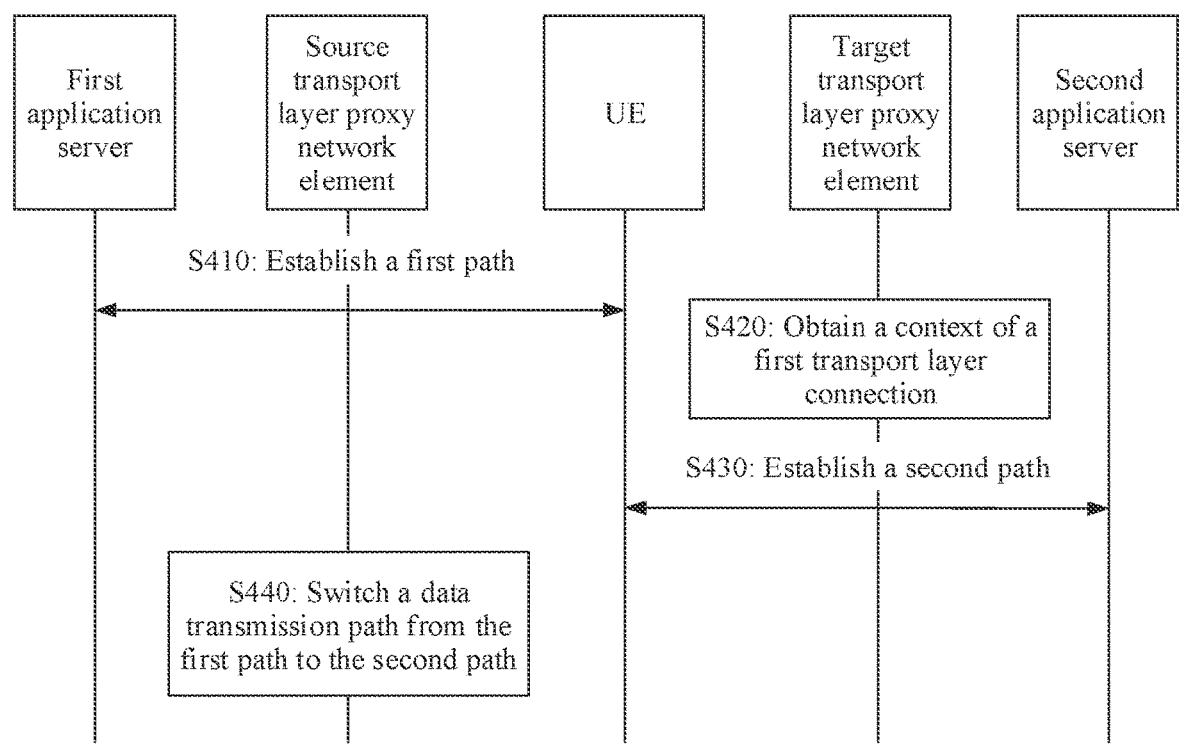
FIG. 4 is a schematic flowchart of a path switching method according to this application.

It should be further understood that a name of a message or a name of information in this application does not constitute any limitation on an actual function of the message or the information, FIG. 4 is a schematic flowchart of a path switching method 400 according to this application. As shown in FIG. 4, the method 400 may include S410 to S440. The following describes the steps.

S410: Establish a first path between UE and a first application server.

Specifically, a first transport layer connection is established between the UE and a source transport layer proxy network element, and a second transport layer connection is established between the source transport layer proxy network element and the first application server. The first transport layer connection and the second transport layer connection form a first path. It may be understood that user plane data may be transmitted between the UE and the first application server through the first path, or in other words, data may be transmitted between the UE and the first application server through the first path.

In this application, the first transport layer connection may be an MPTCP connection, or may be a TCP connection, and the second transport layer connection may be a TCP connection. For details about how to establish the MPTCP connection and the TCP connection, refer to the foregoing related descriptions or the following related descriptions.

In addition, the first transport layer connection may alternatively be a quick UDP internet connection (Quick UDP Internet Connections, QUIC), and the second transport layer connection may be a user datagram protocol (user datagram protocol, UDP) connection. For details about how to establish the QUIC and the UDP connection, refer to an existing technology.

S420: A target transport layer proxy network element obtains a context of the first transport layer connection.

Optionally, the context of the first transport layer connection may include an IP address used by the UE for the first transport layer connection. The first transport layer connection may further include a port number of the UE.

It should be noted that an IP address or FP address information mentioned in this application may be an internet protocol version 4 (Internet Protocol version 4, IPv4) address or an internet protocol version 6 (Internet Protocol version 6, IPv6) prefix.

Optionally, the context of the first transport layer connection may further include one or more of the following: key information of two ends (that is, the UE and the source transport layer proxy network element) of the first transport layer connection, hash encryption algorithm information (for example, an HMAC-SHA256 encryption algorithm is used), a mapping relationship between a data sequence number (data sequence number, DSN) and a subflow sequence number (subflow sequence number, SSN), and an initial subflow sequence number (initial subflow sequence number, ISSN). For detailed content of the HMAC-SHA256, the DSN, the SSN, the ISSN, and the like, refer to the existing technology.

In an implementation, after establishment of the first transport layer connection is completed or establishment of the first path is completed, the source transport layer proxy network element may send the context of the first transport layer connection to a session management network element. After detecting that the UE moves and needs to switch a PSA, the session management network element may send the context of the first transport layer connection to the target transport layer proxy network element.

Further, in this implementation, both the source transport layer proxy network element and the target transport layer proxy network element may be user plane network elements, and may be specifically anchor user plane network elements, that is, PSAs. In this case, the source transport layer proxy network element may be referred to as a source PSA (source PSA, S-PSA), and the target transport layer proxy network element may be referred to as a target PSA (target PSA, T-PSA).

In another implementation, after establishment of the first transport layer connection or establishment of the first path is completed, forwarding of a session management network element is not required, and the source transport layer proxy network element may directly send the context of the first transport layer connection to the target transport layer proxy network element.

For example, after the establishment of the first transport layer connection or the establishment of the first path is completed, the source transport layer proxy network element or the UE may send a first transport layer connection establishment complete message to the session management network element, to indicate that the establishment of the first transport layer connection is completed. After the session management network element detects that the UE moves and needs to switch a PSA, and receives the first transport layer connection establishment complete message, the session management network element may send a data network access identifier (data network access identifier, DNAI) change (change) notification to the source transport layer proxy network element. The DNAI change notification may include a target DNAI. The source transport layer proxy network element may determine the target transport layer proxy network element based on the target DNAI, and then may send the context of the first transport layer connection to the target transport layer proxy network element.

Further, in this implementation, both the source transport layer proxy network element and the target transport layer proxy network element may be MEC platform network elements. In addition, in this case, an MEC platform network element and a user plane network element are separately deployed. In this application, an MEC platform network element corresponding to the source transport layer proxy network element may be referred to as a source MEC (source MEC, S-MEC), and an MEC platform network element corresponding to the target transport layer proxy network element may be referred to as a target MEC (target MEC, T-MEC).

It should be understood that the session management network element may be an SMF, or may be a network element having a function of the SMF. For ease of understanding, the following describes the method provided in this application by using an example in which the session management network element is an SMF.

S430: The target transport layer proxy network element establishes a second path between the UE and a second application server.

Specifically, the target transport layer proxy network element establishes a third transport layer connection to the UE, and establishes a fourth transport layer connection to the second application server. The third transport layer connection may be established based on the context of the first transport layer connection. The third transport layer connection and the fourth transport layer connection form the second path. It may be understood that user plane data may be transmitted between the UE and the second application server through the second path.

In this application, if the first transport layer connection is an MPTCP connection, the third transport layer connection is also an MPTCP connection, and the first transport layer connection and the third transport layer connection belong to a same MPTCP session. If the first transport layer connection is a TCP connection, the third transport layer connection is also a TCP connection. If the second transport layer connection is a TCP connection, the fourth transport layer connection may be a TCP connection. However, this is not limited in this application. For details about how to establish the MPTCP connection and the TCP connection, refer to the foregoing related descriptions or the following related descriptions.

In addition, if the first transport layer connection is a QUIC, the third transport layer connection is also a QUIC. If the second transport layer connection is a UDP connection, the fourth transport layer connection is also a UDP connection. For details about how to establish the QUIC and the UDP connection, refer to the existing technology.

For example, the second application server and the first application server may provide a same application service. The second application server and the first application server may be a same server, or may be different servers. This is not limited in this application. In addition, the second application server and the first application server may belong to a same DN.

S440: If determining that path switching needs to be performed, the source transport layer proxy network element switches a data transmission path from the first path to the second path after receiving a complete service response packet sent by the first application server for a service request (which is also referred to as a service request message or a service request packet). The service request is sent by the UE.

For example, when receiving path switching indication information sent by the session management network element or receiving a third transport layer connection establishment complete message, the source transport layer proxy server may switch the data transmission path from the first path to the second path if receiving the complete service response packet sent by the first application server for the service request.

For example, if a service request message is an HTTP request (HTTP request) message, and a service response message is an HTTP response (HTTP response) message, the source transport layer proxy network element may determine, by parsing the HTTP response message and the HTTP response message, whether a complete HTTP response message sent by the first application server for the HTTP request is received. For example, the source transport layer proxy network element may determine, based on a message status code in the HTTP response message, whether the HTTP response message is a segment response message. If the HTTP status code carried in the HTTP response message is 200, it indicates that the HTTP response message is not segmented, and the source transport layer proxy network element may determine that the complete response message of the corresponding HTTP request message has been received when receiving the HTTP response message. If the HTTP status code carried in the HTTP response message is 206, it indicates that the first application server sends a service packet to the UE in a manner of segmented responses, and the source transport layer proxy network element needs to determine, based on a range field carried in the HTTP request message and a content-range field in the HTTP response message, whether the received HTTP response message is the last segment response message corresponding to the HTTP request message. The range field carried in the HTTP request message is used by the UE to notify the first application server of a range of requested content, and the content-range field in the HTTP response message is used by the first application server to indicate a range and an actual length of a response.

For example, that the source transport layer proxy network element switches a data transmission path from the first path to the second path may specifically include: The source transport layer proxy network element sends first indication information to the UE, where the first indication information is used by the UE to switch the data transmission path from the first transport layer connection to the third transport layer connection.

For example, after determining that the complete service response packet sent by the first application server for the service request sent by the UE has been received, the source transport layer proxy network element includes the first indication information in the service response packet, so that the UE switches the data transmission path from the first transport layer connection to the third transport layer connection based on the first indication information after receiving the response packet.

For example, if the service request message and the service response message are respectively an HTTP request message and an HTTP response message, the source transport layer proxy network element may modify an MPTCP option of a TCP layer of the HTTP response message for the HTTP request message or an MPTCP option of a TCP layer of the last segment of the HTTP response message for the HTTP request message, which is specifically that in a process of encapsulating the HTTP response message, the source transport layer proxy network element sets a flag B of an MP_PRIO option in a TCP header to 1. This is equivalent to modifying a priority of the first transport layer connection, so that the first transport layer connection is used as a backup path.

It should be understood that, in this application, the source transport layer proxy network element receives, within preset duration after receiving a switching request message or the third transport layer connection establishment complete message, the complete service response packet for the service request; or the source transport layer proxy network element receives the complete service response packet for the service request before receiving a switching request message or the third transport layer connection establishment complete message, it may be considered that the complete service response packet for the service request is received.

It should be further understood that, in this application, the complete service response packet for the service request is a complete service response packet for a service request sent by the UE last time.

According to the path switching method provided in this application, the UE may separately establish a transport layer connection to the source transport layer proxy network element and the target transport layer proxy network element. When path switching needs to be performed, the source transport layer proxy network element may perform path switching after receiving the complete service response packet for the service request sent by the UE. In this way, a problem that a same service request needs to be repeatedly initiated after path switching because the complete service response packet for the service request sent by the UE is not received can be avoided. In the method provided in this application, because a status interaction case of a service layer is fully considered, a service latency can be reduced, and user experience can be improved.

In the following, unless otherwise stated, reference may be made to the foregoing descriptions for meanings of same terms or words.

As described above, the source transport layer proxy network element and the target transport layer proxy network element may be PSAs or MECs. To be specific, the PSA or the MEC may be integrated with a transport layer proxy function, such as a TCP proxy function and an MPTCP proxy function. For the two cases, the following separately describes a specific procedure of the method shown in FIG. 4.

First, with reference to FIG. 5A and FIG. 5B to FIG. 8, the following describes in more detail the method shown in FIG. 4 when a transport layer proxy network element is a PSA. For ease of understanding, in FIG. 5A and FIG. 5B to FIG. 8, an example in which a session management network element is an SMF, a source transport layer proxy network element is a source PSA (Source PSA, S-PSA), a target transport layer proxy network element is a target PSA (target PSA, T-PSA), a first application server is a source application server (source AS, S-AS), and a second application server is a target AS (target AS, T-AS) is Bused for description.

Figure 5A:
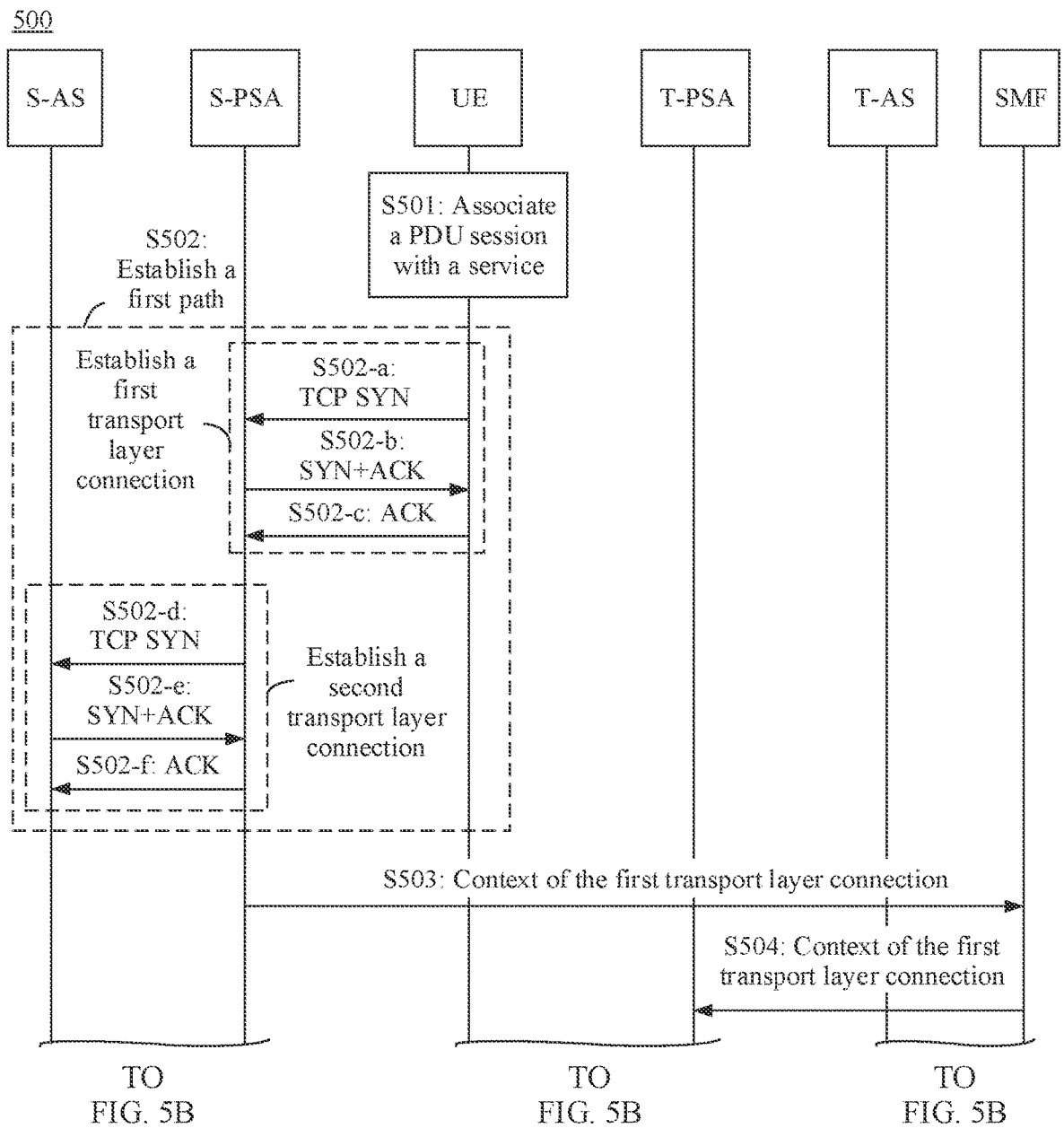
FIG. 5A and FIG. 5B are a schematic flowchart of a specific example of a path switching method according to this application.
Figure 5B:
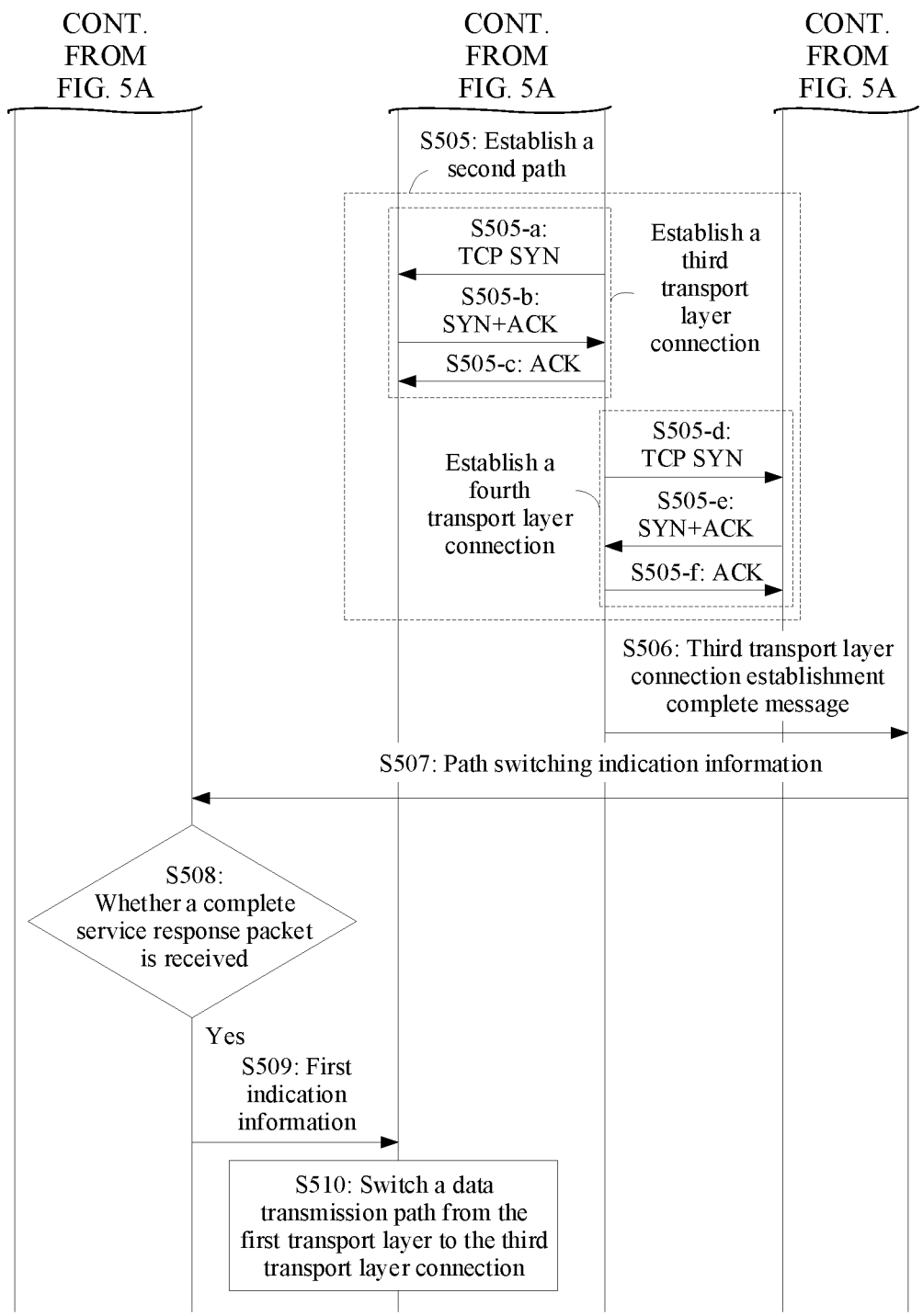
Figure 6:
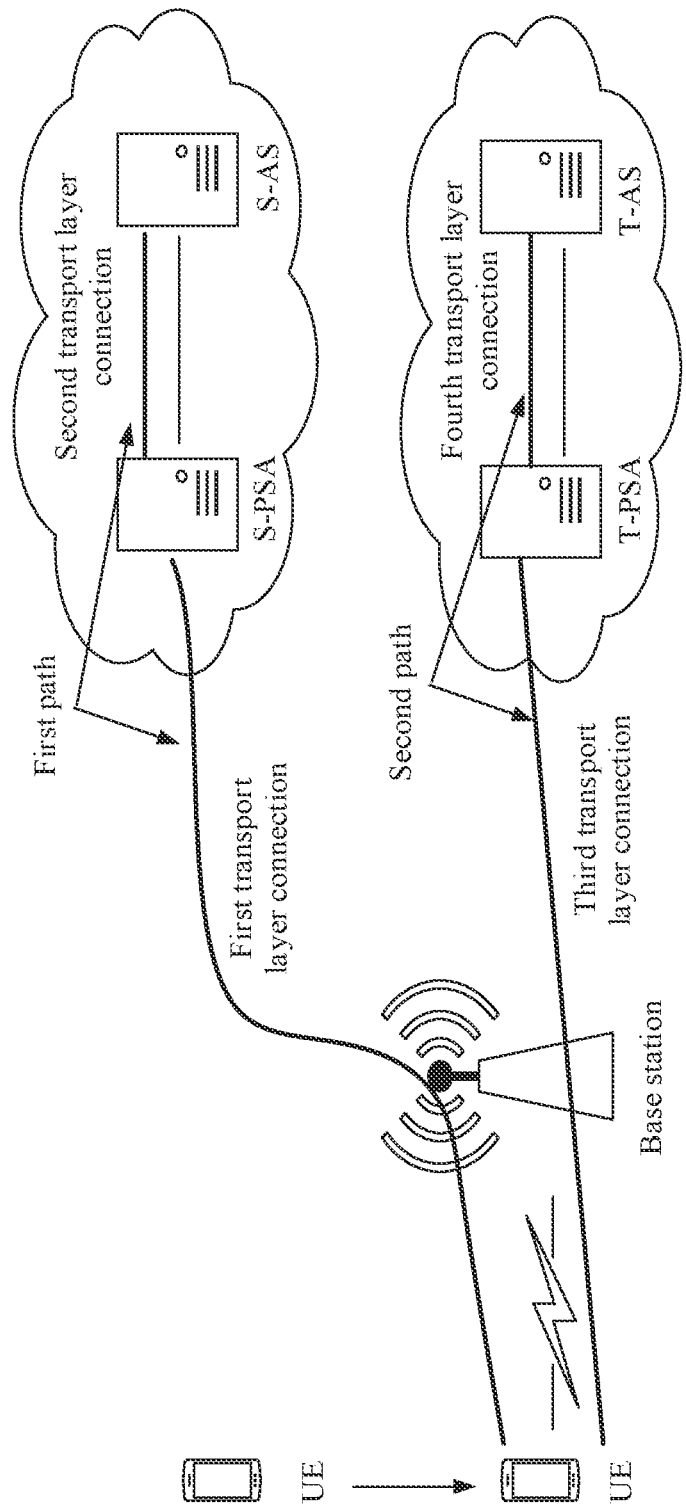
FIG. 6 is a schematic diagram of a data transmission path before and after path switching.
Figure 7:
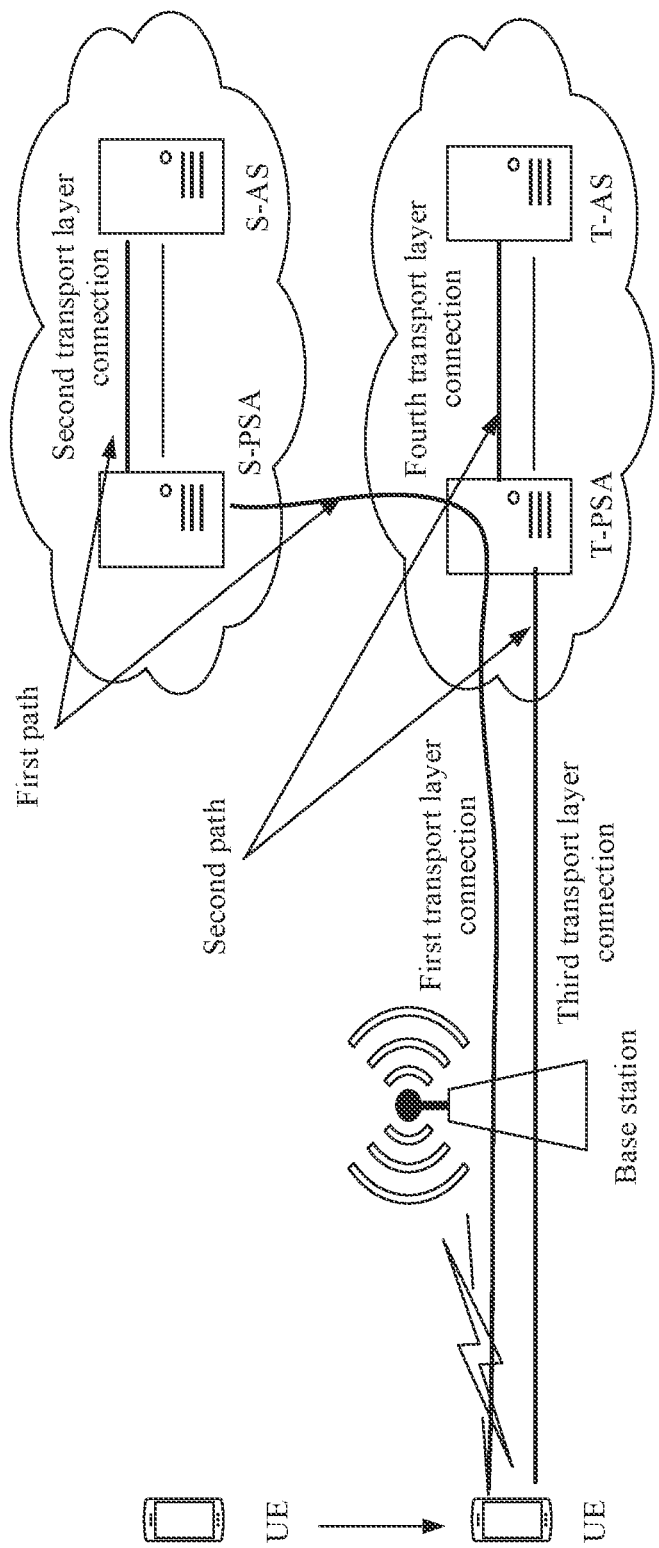
FIG. 7 is another schematic diagram of a data transmission path before and after path switching.

FIG. 5A and FIG. 5B are a schematic flowchart of a path switching method. In the method, a first transport layer connection and a third transport layer connection are MPTCP connections, and a second transport layer connection and a fourth transport layer connection are TCP connections. As shown in FIG. 5A and FIG. 5B, the method may include S501 to S510. The following separately describes the steps.

S501: When determining that an application needs to initiate a service, UE associates a PDU session with the service.

For example, if a PDU session that meets a QoS requirement of the service exists in the UE, the UE associates the PDU session with the service. If a PDU session that meets a QoS requirement of the service does not exist in the UE, the UE establishes a PDU session for the service by interacting with a core network, and associates the session with the service.

It should be understood that, in this application, when initiating a service, the UE needs to first establish a transport layer connection, to send a service packet or service data through the transport layer connection. A packet at a transport layer includes a packet for establishing a transport layer connection. An example in which the transport layer connection is a TCP connection is used. For a TCP packet, TCP SYN, SYN+ACK, and ACK messages that are sent in a TCP three-way handshake process need to be sent from the UE to a PSA through a base station by using a corresponding PDU session, and then sent from the PSA to an AS in a DN. After a TCP connection is established, a service packet of the UE is transmitted through the TCP connection. To be specific, the service packet is encapsulated into the TCP packet by the UE based on a parameter of the TCP connection, and then is sent from the UE to the AS through the base station and the PSA by using a PDU session corresponding to the TCP connection. That is, a transport layer connection between each UE and a server needs to be associated with one PDU session, and a transport layer connection between the UE and an S-PSA or a T-PSA in this application also needs to be associated with one PDU session.

Optionally, in a PDU session establishment process, an SMF may indicate the S-PSA to activate a TCP proxy function for a specific service data flow (service data flow, SDF).

Optionally, path switching performed by the UE, the transport layer proxy network element, or the SMF on a packet in this application is performed for one or more specific service data flows.

S502: Establish a first path between the UE and an S-AS.

Specifically, an MPTCP connection is established between the UE and the S-PSA, and a TCP connection is established between the S-PSA and the S-AS.

Optionally, an IP address used by the UE to establish the first path may be allocated to the UE after the S-PSA activates the TCP proxy function in the PDU session establishment process. Details may be as follows:

The S-PSA receives an indication sent by the SMF, activates the TCP proxy function for the specific service flow, allocates, to the UE, the IP address used to establish a transport layer connection of the first path, and sends the IP address to the SMF by using an N4 session establishment response message or an N4 session modification request message. The SMF sends the IP address to the UE by using NAS signaling. Subsequently, the UE initiates establishment of the first transport layer connection by using the IP address.

Optionally, the UE may alternatively initiate establishment of the first transport layer connection by using an IP address of the PDU session.

S502 may be implemented in the following manner:

1. The MPTCP connection between the S-PSA and the UE, that is, the first transport layer connection between the S-PSA and the UE is established based on the MPTCP three-way handshake process. Details are as follows:

502-a: When initiating a service, the UE sends a TCP SYN message (syn=j) to the S-AS, and waits for an acknowledgment of the S-AS. The SYN message carries a multipath capability MP_CAPABLE option (option), the MP_CAPABLE is used to indicate that a local-end device (that is, the UE) supports the MPTCP and performs key exchange between the UE and a peer end, where j represents a sequence number.

502-b: After receiving the TCP SYN message sent by the UE, the S-PSA activates the TCP proxy function based on the indication of the SMF, so that the S-PSA, acting as proxy for the S-AS, establishes the MPTCP connection to the UE In other words, the S-PSA, acting as proxy for the S-AS, sends a SYN+ACK message (syn=k, ack=j+1) to the UE. The SYN+ACK message carries the MP_CAPABLE option to indicate that the S-AS supports the MPTCP, where k represents a sequence number.

502-c: The UE sends an ACK message (ack=k+1) to the S-PSA to acknowledge that the SYN+ACK message has been received. The S-PSA receives the ACK message from the UE and completes three-way handshakes with the UE, and establishment of the first transport layer connection between the UE and the S-PSA is completed.

2. The TCP connection between the S-PSA and the S-AS, that is, the second transport layer connection between the S-PSA and the S-AS is established based on the TCP three-way handshake process. Details are as follows:

502-d: The S-PSA sends a TCP SYN message (syn=m) to the S-AS, and waits for an acknowledgment of the S-AS, where m represents a sequence number.

502-e: After receiving the TCP SYN message, the S-AS returns a SYN+ACK message (syn=n, ack=m+1), where n represents a sequence number.

502-f: After receiving the SYN+ACK message, the S-PSA returns an ACK message (ack=n+1) to acknowledge that the SYN+ACK message has been received.

After 502-a is performed, an execution sequence of the foregoing steps may be as follows: 502-b and 502-c are performed in parallel with 502-d to 502-f. To be specific, 502-d, 502-e, and 502-f are sequentially performed when 502-b and 502-c are sequentially performed. Alternatively, the steps may be performed in a sequence of 502-a, 502-d, 502-e, 502-b, 502-c, and 502-f. To be specific, the S-PSA sends the SYN+ACK message (syn=k, ack=j+1) to the UE after receiving the SYN+ACK message syn=n, ack=m+1) returned by the S-AS, and returns the ACK message (ack=n+1) to the S-AS after receiving the ACK message (ack=k+1) returned by the UE.

S503: The S-PSA sends a context of the first transport layer connection to the SMF.

Specifically, after establishment of the first path or the first transport layer connection is completed, the S-PSA sends the context of the first transport layer connection to the SMF.

For example, the S-PSA may send the context of the first transport layer connection to the SMF by using an N4 session modification request message. The context is a context of the MPTCP connection between the UE and the S-PSA, and may include, for example, one or more of the following: an IP address and a port number that are used by the UE for the first transport layer connection, key information of both ends, that is, the UE and the S-PSA, of the MPTCP connection, hash encryption algorithm information (for example, an HMAC-SHA256 encryption algorithm is used), a mapping relationship between a DSN and an SSN, an ISSN, and other information.

S504: The SMF sends the context of the first transport layer connection to the T-PSA.

Specifically, when detecting that the UE moves and needs to switch the PSA, the SMF selects the T-PSA for the UE, and sends the context of the first transport layer connection to the selected T-PSA.

For example, the SMF may send the context to the T-PSA by using an N4 session modification request message. When sending the context, the SMF may further indicate the T-PSA to activate a TCP proxy function for a specific SDF.

For example, the SMF may select the target T-PSA for the UE based on a location of the UE.

This application may be applied to two modes, that is, a UL CL mode and an SSC mode 3. In the UL CL mode, the SMF selects the T-PSA and then inserts the T-PSA as a UL CL. In the SSC mode 3, the SMF triggers the UE to establish a new PDU session, and the T-PSA is used as a user plane anchor for the PDU session. In an alternative manner of S503 and S504, the S-PSA may directly send the context of the first transport layer connection to the T-PSA. For example, the context may be transmitted by establishing a user plane tunnel between the S-PSA and the T-PSA.

Optionally, the SMF further sends IP address information of a T-AS to the T-PSA. The IP address information is used by the T-PSA to establish a transport layer connection to the T-AS, and the IP address information may be an IPv4 address. For example, the SMF may send the IP address information to the T-PSA by using an N4 session establishment request message or an N4 session modification request message.

S505: The T-PSA establishes a second path between the UE and the T-AS.

Specifically, the T-PSA establishes an MPTCP connection, that is, the third transport layer connection, to the UE based on the context of the first transport layer connection, so that the third transport layer connection and the first transport layer connection belong to a same MPTCP session. In addition, the T-PSA establishes a TCP connection, that is, the fourth transport layer connection, to the T-SA.

The MPTCP connection between the T-PSA and the UE, that is, the third transport layer connection between the T-PSA and the UE, is established based on the MPTCP three-way handshake process. Details are as follows:

505-a: The T-PSA sends a TCP SYN message (syn=p) to the UE, and waits for an acknowledgment of the UE. The SYN message carries an MP_JOIN option, and the MP_JOIN option may carry a token value of the UE, an IP address of the T-PSA, and a local random number of the T-PSA that are in the context obtained by the T-PSA in step S04, where p represents a sequence number.

505-b: After receiving the TCP SYN message sent by the T-PSA, the UE sends a SYN+ACK message (syn=q, ack=p+1) to the T-PSA. The SYN+ACK packet carries an MP_JOIN option, and the MP_JOIN option carries the HMAC of the UE, a local random number of the UE, and an IP address of the UE, where q represents a sequence number.

505-c: The T-PSA sends an ACK message (ack=p+1) to the UE to acknowledge that the SYN+ACK message has been received. The UE receives the ACK message from the T-PSA and completes three-way handshakes with the T-PSA, and establishment of the third transport layer connection between the UE and the T-PSA is completed.

The TCP connection between the T-PSA and the T-AS, that is, the fourth transport layer connection between the T-PSA and the T-AS, is established based on the TCP three-way handshake process. Details are as follows:

505-d: The T-PSA sends a TCP SYN message (syn=s) to the T-AS, and waits for an acknowledgment of the T-AS, where s represents a sequence number.

505-e: After receiving the TCP SYN message, the T-AS returns a SYN+ACK message (syn=t, ack=s+1), where t represents a sequence number.

505-f: After receiving the SYN+ACK message, the T-PSA returns an ACK message (ack=t+1) to acknowledge that the SYN+ACK message has been received.

The execution steps 505-a to 505-c and 505-d to 505-f in the foregoing steps are independently performed. To be specific, 505-d, 505-e, and 505-f are sequentially performed when 505-a, 505-b, and 505-c are sequentially performed. Alternatively, 505-a, 505-b, and 505-c may be sequentially performed first, and then 505-d, 505-e, and 505-f may be sequentially performed. Alternatively, 505-d, 505-e, and 505-f are sequentially performed first, and then 505-a, 505-b, and 505-c are sequentially performed. This is not limited in this application.

When the third transport layer connection is established, the last bit of a flag in the MP_JOIN option may be set to B=1 in the TCP SYN message initiated by the T-PSA (that is, step S05-a), to indicate that a newly created subflow is a backup path backup path. To be specific, in this case, when the first transport layer connection is available, the third transport layer connection is used as a backup path and is not used to transmit data, and the data is still transmitted on the first transport layer connection.

Optionally, in the UL CL mode or the SSC mode 3, an IP address used by the UE for the second path or the third transport layer connection of the second path may be allocated by the T-PSA to the UE. Details may be as follows: After receiving the context of the first transport layer connection, the T-PSA allocates, to the UE, the IP address used for the transport layer connection of the second path, the T-PSA sends the IP address to the SMF, and the SMF sends the IP address to the UE by using NAS signaling. Specifically, the T-PSA may send the IP address to the SMF by using an N4 session establishment response message corresponding to the N4 session establishment request message in step S504, or may send the IP address to the SMF by using an N4 session modification request message. It should be noted that the destination IP address used by the T-PSA in 5-505a is the IP address allocated to the UE.

Optionally, the IP address used by the UE for the second path or the third transport layer connection of the second path may alternatively be the IP address of the PDU session.

S506: After establishment of the third transport layer connection is completed, the T-PSA sends a third transport layer connection establishment complete message to the SMF.

S507: The SMF sends path switching indication information to the S-PSA.

After learning, based on the third transport layer connection establishment complete message, that the establishment of the third transport layer connection is completed, the SMF sends the path switching indication information to the S-PSA, to indicate the S-PSA to perform path switching.

S508: After receiving the path switching indication information, the S-PSA determines whether a complete service response packet sent by the S-AS for a service request sent by the UE is received.

If a determining result is "yes", S509 is performed. If a determining result is not "yes", S509 and a subsequent step are not performed.

In this step, the S-PSA needs to first detect a service request packet and a service response packet, to determine whether the complete service response packet sent by the S-AS for the service request sent by the UE is received. A time point at which the S-PSA starts to detect the service request packet and the service response packet is not limited in this application. For example, the S-PSA may start to detect the service request packet and the service response packet after receiving the path switching indication information sent by the SMF in S507. For another example, the S-PSA may start to detect the service request packet and the service response packet after sending the context of the first transport layer connection to the SMF in S503. For still another example, after receiving second indication information sent by the SMF, the S-PSA may start to detect the service request packet and the service response packet, where the second indication information is used to indicate the S-PSA to start to detect the service request packet and the service response packet. For example, an occasion for the SMF to send the second indication information to the S-PSA may be a time point when the third transport layer connection establishment complete message sent by the T-PSA is received in S506, or may be a time point when the SMF detects that the UE moves and needs to switch the PSA, or may be a time point after the SMF sends the context of the first transport layer connection to the T-PSA through step S504. This is not specifically limited in this application.

For example, if a service request message is an HTTP request (HTTP request) message, and a service response message is an HTTP response (HTTP response) message, the S-PSA may determine, by parsing the HTTP response message and the HTTP response message, whether a complete HTTP response message sent by the S-AS for the HTTP request sent by the UE is received. For example, the S-PSA may determine, based on a message status code in the HTTP response message, whether the HTTP response message is a segment response message. If the HTTP status code carried in the HTTP response message is 200, it indicates that the HTTP response message is not segmented, and the S-PSA may determine that the complete response message of the corresponding HTTP request message has been received when receiving the HTTP response message. If the HTTP status code carried in the HTTP response message is 206, it indicates that the S-AS sends a service packet to the UE in a manner of segmented responses, and the S-PSA needs to determine, based on a range field carried in the HTTP request message and a content-range field in the HTTP response message, whether the received HTTP response message is the last segment response message corresponding to the HTTP request message. The range field carried in the HTTP request message is used by the UE to notify the S-AS of a range of requested content, and the content-range field in the HTTP response message is used by the S-AS to notify a range and an actual length of a response.

S509: The S-PSA sends first indication information to the UE, where the first indication information is used by the UE to switch a data transmission path from the first transport layer connection to the third transport layer connection.

Specifically, after determining that the complete service response packet sent by the S-AS for the service request sent by the UE has been received, the S-PSA includes the first indication information in the service response packet, so that the UE switches the data transmission path from the first transport layer connection to the third transport layer connection based on the first indication information after receiving the response packet.

For example, if the service request message and the service response message are respectively an HTTP request message and an HTTP response message, the S-PSA may modify an MPTCP option of a TCP layer of the HTTP response message for the HTTP request message or an MPTCP option of a TCP layer of the last segment of the HTTP response message for the HTTP request message, which is specifically that in a process of encapsulating the HTTP response message, the S-PSA sets a flag B of an MP_PRIO option in a TCP header to 1, that is, modifies a priority of the first transport layer connection, so that the first transport layer connection is used as a backup path.

S510: The UE switches the data transmission path from the first transport layer connection to the third transport layer connection based on the first indication information.

For example, after receiving the service response message, the UE determines, based on a value of the flag B in the MP_PRIO option of the MPTCP option in the service response message, to switch the data transmission path from the first transport layer connection to the third transport layer connection.

According to the method provided in this application, the S-PSA and the T-PSA each may establish an MPTCP connection to the UE. When path switching needs to be performed, the UE switches the data transmission path from the MPTCP connection to the S-PSA to the MPTCP connection to the T-PSA after the S-PSA detects the complete service response packet for the service request sent by the UE. According to the method, it can be ensured that path switching is performed after a complete status interaction process is completed, to ensure an ultra-low latency requirement of an application in an application migration process.

The method shown in FIG. 5A and FIG. 5B may be applied to two modes, that is, the SSC mode 3 and the UL CL mode mentioned in the descriptions of S504 above. For the SSC mode 3 mode, data transmission paths before and after path switching are those shown in FIG. 6. For the UL CL mode, data transmission paths before and after path switching are those shown in FIG. 7.

Figure 8:
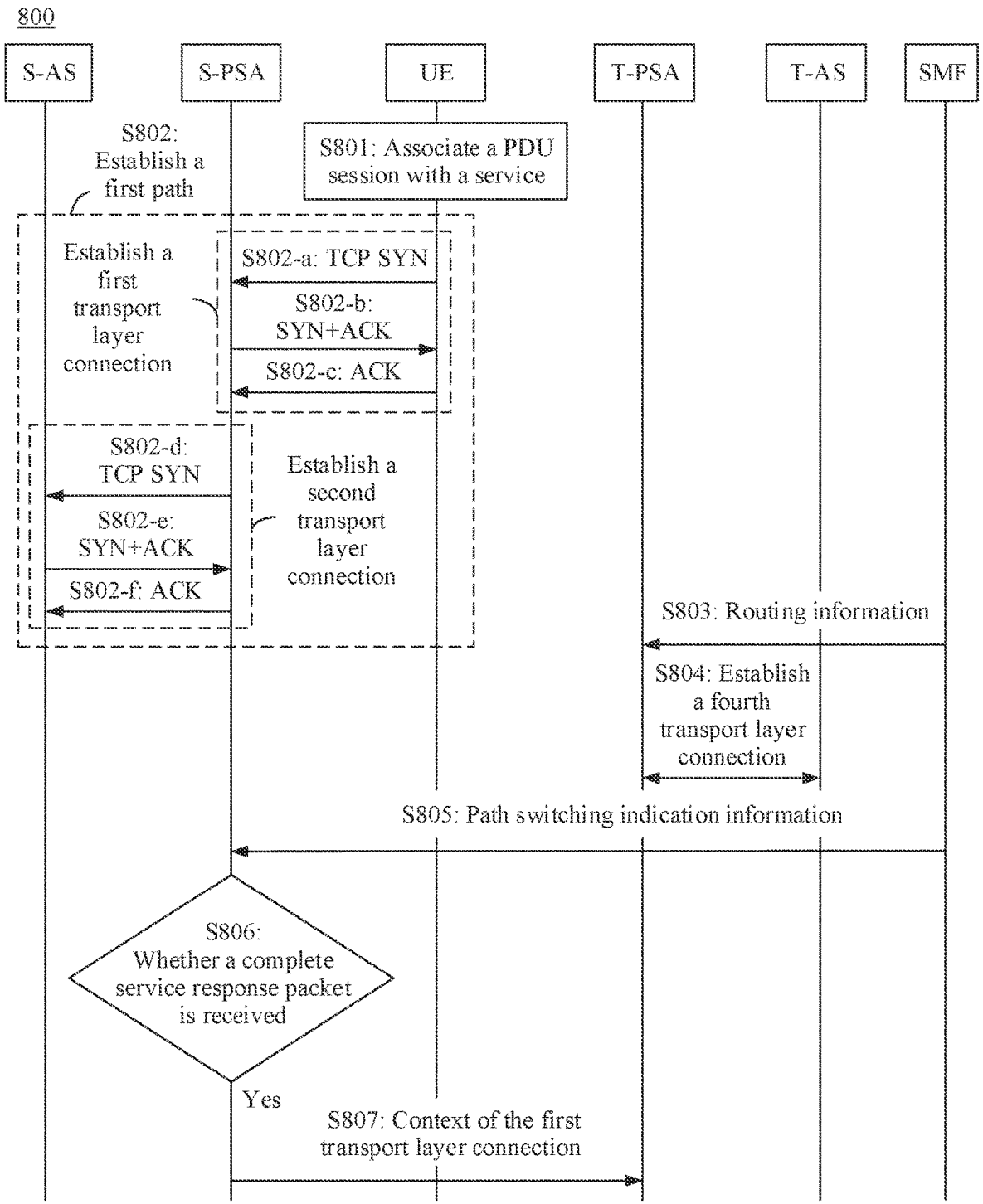
FIG. 8 is a schematic flowchart of a specific example of a path switching method according to this application.

FIG. 8 is a schematic flowchart of a path switching method 800. In the method 800, a first transport layer connection, a second transport layer connection, a third transport layer connection, and a fourth transport layer connection are all TCP connections. As shown in FIG. 8, the method 800 may include S801 to S807. The following separately describes the steps.

S801: When determining that an application needs to initiate a service, UE associates a PDU session with the service.

For this step, refer to S501. Details are not described herein again.

S802: Establish a first path between the UE and an S-AS.

Specifically, the first transport layer connection is established between the UE and an S-PSA, the second transport layer connection is established between the S-PSA and the S-AS, and both the first transport layer connection and the second transport layer connection are TCP connections.

S802 may be implemented in the following manner:

1. The TCP connection between the S-PSA and the UE, that is, the first transport layer connection between the S-PSA and the UE is established based on a TCP three-way handshake process. Details are as follows:

802-*a*: When initiating a service, the UE sends a TCP SYN message (synth) to the S-AS, and waits for an acknowledgment of the S-AS, where j represents a sequence number.

802-*b*: After receiving the TCP SYN message sent by the WE, the S-PSA activates a TCP proxy function based on an indication of an SW, so that the S-PSA, acting as proxy for the S-AS, establishes the TCP connection to the UE. In other words, the S-PSA, acting as proxy for the S-AS, sends a SYN+ACK message (syn=k, ack=j+1) to the UE, where k represents a sequence number.

802-*c*: The UE sends an ACK message (ack=k+1) to the S-PSA to acknowledge that the SYN+ACK message has been received. The S-PSA receives the ACK message from the UE and completes three-way handshakes with the UE, and establishment of the first transport layer connection between the UE and the S-PSA is completed.

2. The TCP connection between the S-PSA and the S-AS, that is, the second transport layer connection between the S-PSA and the S-AS is established based on the TCP three-way handshake process. Details are as follows:

802-*d*: The S-PSA sends a TCP SYN message (syn=m) to the S-AS, and waits for an acknowledgment of the S-AS, where m represents a sequence number.

802-*e*: After receiving the TCP SYN message, the S-AS returns a SYN+ACK message (syn=n, ack=m+1), where n represents a sequence number.

802-*f*: After receiving the SYN+ACK message, the S-PSA returns an ACK message (ack=n+1)) to acknowledge that the SYN+ACK message has been received.

After 802-*a* is performed, an execution sequence of the foregoing steps may be as follows: 802-*b* and 802-*c* may be performed in parallel with 802-*d* to 802-*f*. To be specific, 802-*d*, 802-*e*, and 802-*f* are sequentially performed when 802-*b* and 802-*c* are sequentially performed. Alternatively, the steps may be performed in a sequence of 802-*a*, 802-*d*, 802-*e*, 802-*b*, 802-*c*, and 802-*f*. To be specific, the S-PSA sends the SYN+ACK message (syn=k, ack=j+1) to the UE after receiving the SYN+ACK, message (syn=n, ack=m+1) returned by the S-AS, and returns the ACK message (ack=n+1) to the S-AS after receiving the ACK message (ack=k+1) returned by the UE.

S803: The SMF sends routing information to a T-PSA, where the routing information indicates the T-PSA to establish a TCP connection to a T-AS, that is, the fourth transport layer connection.

Specifically, when detecting that the UE moves and needs to switch a PSA, the SMF selects the T-PSA for the UE, and sends the routing information of an N6 interface to the T-PSA. The T-PSA establishes the fourth transport layer connection to the T-AS based on the routing information.

Optionally, the routing information further includes IP address information of the T-AS, and the IP address information is used by the T-PSA to establish the transport layer connection to the T-AS. For example, the SMF may send, to the T-PSA by using an N4 session establishment request message or an N4 session modification request message, the routing information including the IP address information.

S804: Establish the fourth transport layer connection between the T-PSA and the T-AS.

Specifically, the fourth transport layer connection is a TCP connection. The TCP connection is established between the T-PSA and the T-AS based on the TCP three-way handshake process, and the T-PSA initiates the TCP three-way handshake process. For specific steps, refer to 505-*d*, 505-*e*, and 505-*f* in S505. Details are not described herein again.

S805: The SMF sends path switching indication information to the S-PSA.

For example, when detecting that the UE moves and needs to switch the PSA, the SMF may select the target T-PSA for the UE, and insert the T-PSA as a UL CL. Then, the SMF sends the path switching indication information to the S-PSA.

Optionally, the SMF may also send the path switching indication information after determining that establishment of the fourth transport layer connection is completed.

For example, the SMF may send the path switching indication information to the S-PSA by using an N4 session modification request message.

Optionally, after inserting the T-PSA as the UL CL, the SMF further indicates the T-PSA to establish the fourth transport layer connection, that is, the TCP connection, to the T-AS. For example, the SMF may send, to the T-PSA by using an N4 session modification request message, indication information for indicating the T-PSA to establish the fourth transport layer connection to the T-AS.

S806: After receiving the path switching indication information, the S-PSA determines whether a complete service response packet sent by the S-AS for a service request sent by the UE is received.

If a determining result is "yes", S807 is performed. If a determining result is not "yes", S807 is not performed.

In this step, the S-PSA needs to first detect a service request packet and a service response packet, to determine whether the complete service response packet sent by the S-AS for the service request sent by the UE is received. A time point at which the S-PSA starts to detect the service request packet and the service response packet is not limited in this application. For example, the S-PSA may start to detect the service request packet and the service response packet after receiving the path switching indication information sent by the SNIT in S804. For another example, the S-PSA starts to detect the service request packet and the service response packet after receiving second indication information sent by the SMF. For example, an occasion for the SMF to send the second indication information to the S-PSA may be a time point when the SMF detects that the UE moves and needs to switch the PSA. This is not specifically limited in this application.

For example, a manner in which the S-PSA determines whether the complete service response packet sent by the S-AS for the service request sent by the UE is received is the same as the manner in which the S-PSA determines whether the complete service response packet sent by the S-AS for the service request sent by the UE is received in S508. Details are not described herein again.

S807: The S-PSA sends a context of the first transport layer connection to the T-PSA.

The context includes a first transport layer connection parameter and a transmission status parameter, the first transport layer connection parameter is used to generate the third transport layer connection, and the transmission status parameter is used to indicate a data transmission status of the first transport layer connection. The first transport layer connection parameter includes an IP address and a port number that are used by the UE for the first transport layer connection, and optionally, further includes an IP address and a port number of the S-AS, or optionally, further includes an IP address and a port number that are used by the S-PSA for the first transport layer connection. The transmission status parameter of the first transport layer connection includes at least a sent TCP sequence number of uplink data, a sent TCP sequence number of downlink data, or a sequence number of sent uplink and downlink TCP ACKs on the first transport layer connection.

To be specific, the third transport layer connection may be generated based on the context sent by the S-PSA to the T-PSA, and the third transport layer connection and the first transport layer connection have the same transport layer connection parameter and transmission status parameter. The UE is unaware of generation of the third transport layer connection and still considers that data is transmitted through the first transport layer. After the third transport layer connection is generated, the T-PSA sends data from the UE to the T-AS through the fourth transport layer connection, that is, a transmission path is switched from the first path to a second path.

For example, the context of the first transport layer connection may be carried by the S-PSA in an HTTP response message and sent to the T-PSA. Alternatively, after the S-PSA determines that the complete service response packet sent by the S-AS for the service request sent by the UE has been received, the S-PSA sends the context of the first transport layer connection to the T-PSA by using a first user plane packet after sending the service response packet, where the first user plane packet is a packet sent immediately after the service response packet.

According to the method provided in this application, a TCP connection is established between the S-PSA and the UE, and a connection status of the first transport layer connection on the S-PSA is migrated to the T-PSA after the S-PSA detects the complete service response packet for the service request sent by the UE, so that the transmission path of the UE may be switched from the TCP connection to the S-PSA to the TCP connection to the T-PSA. According to the method, it can be ensured that path switching is performed after a complete status interaction process is completed, to ensure an ultra-low latency requirement of an application in an application migration process.

The method shown in FIG. 8 may be applied to a UL CL mode. For this mode, data transmission paths before and after path switching are those shown in FIG. 7.

With reference to FIG. 9 to FIG. 12, the following describes in more detail the method shown in FIG. 4 when a source transport layer proxy network element is an MEC platform network element. For ease of understanding, in FIG. 9 to FIG. 12, an example in which a session management network element is an SMF, a source transport layer proxy network element is an S-MEC, a target transport layer proxy network element is a T-MEC, a first application server is an S-AS, and a second application server is a T-AS is used to describe the path switching method.

Figure 9:
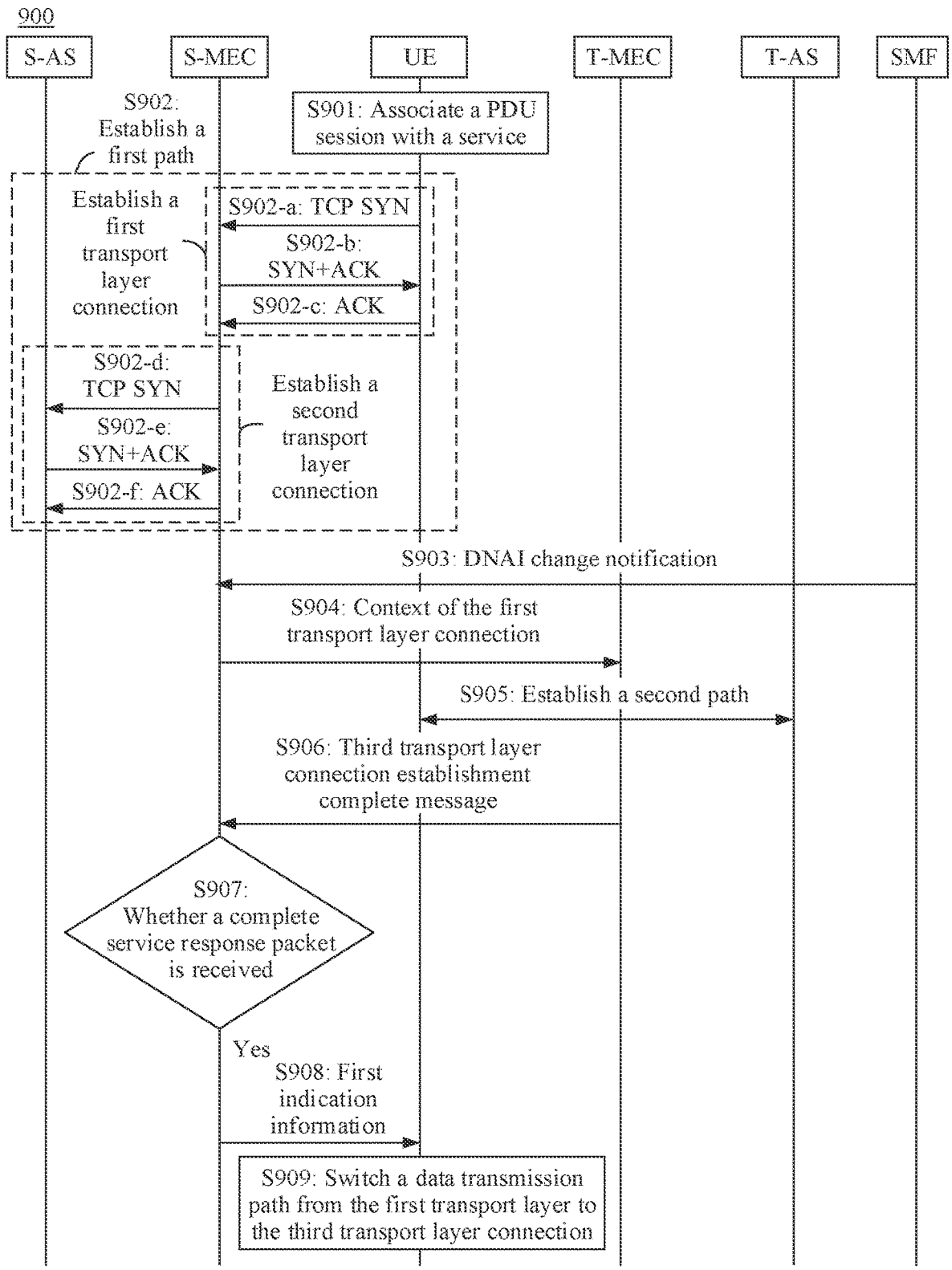
FIG. 9 is a schematic flowchart of a specific example of a path switching method according to this application.
Figure 10:
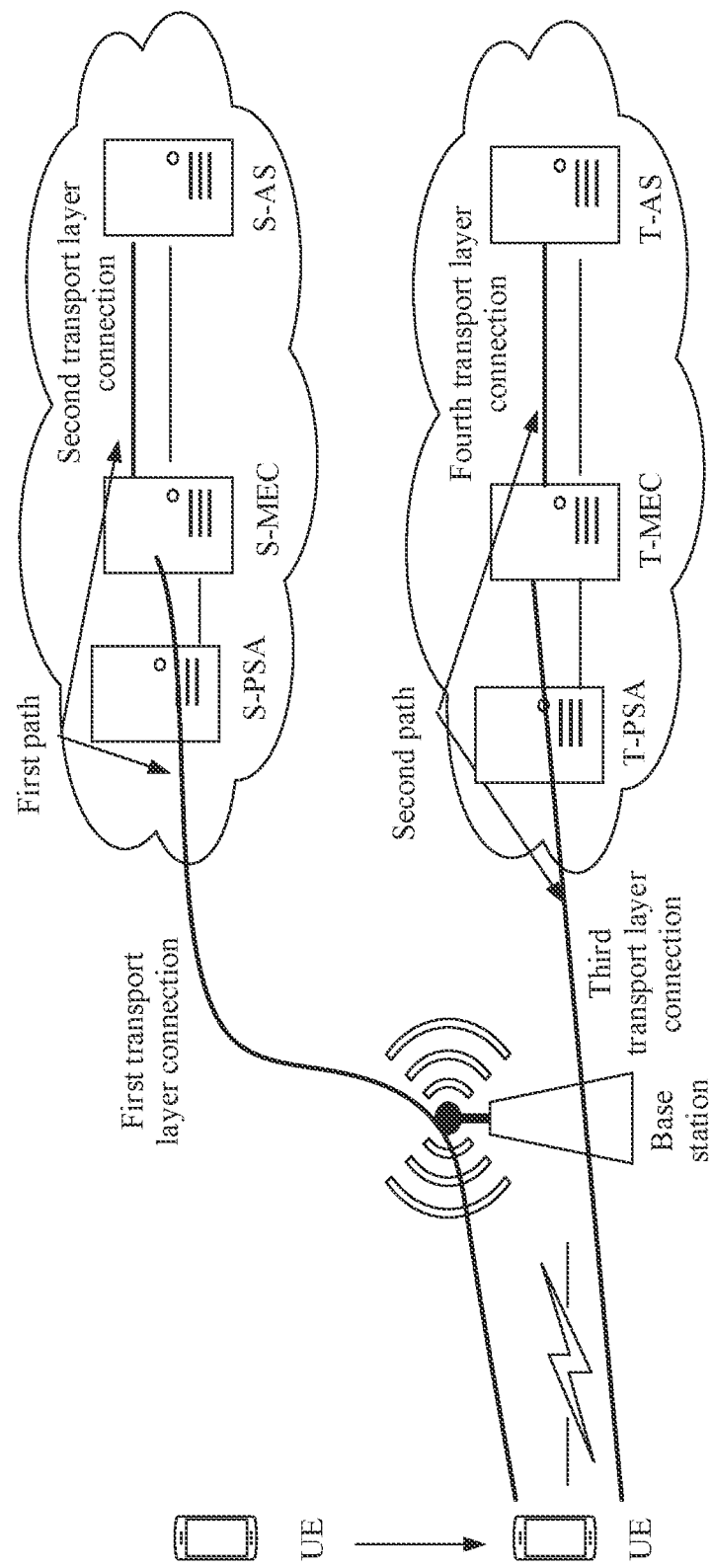
FIG. 10 is a schematic diagram of a data transmission path before and after path switching.
Figure 11:
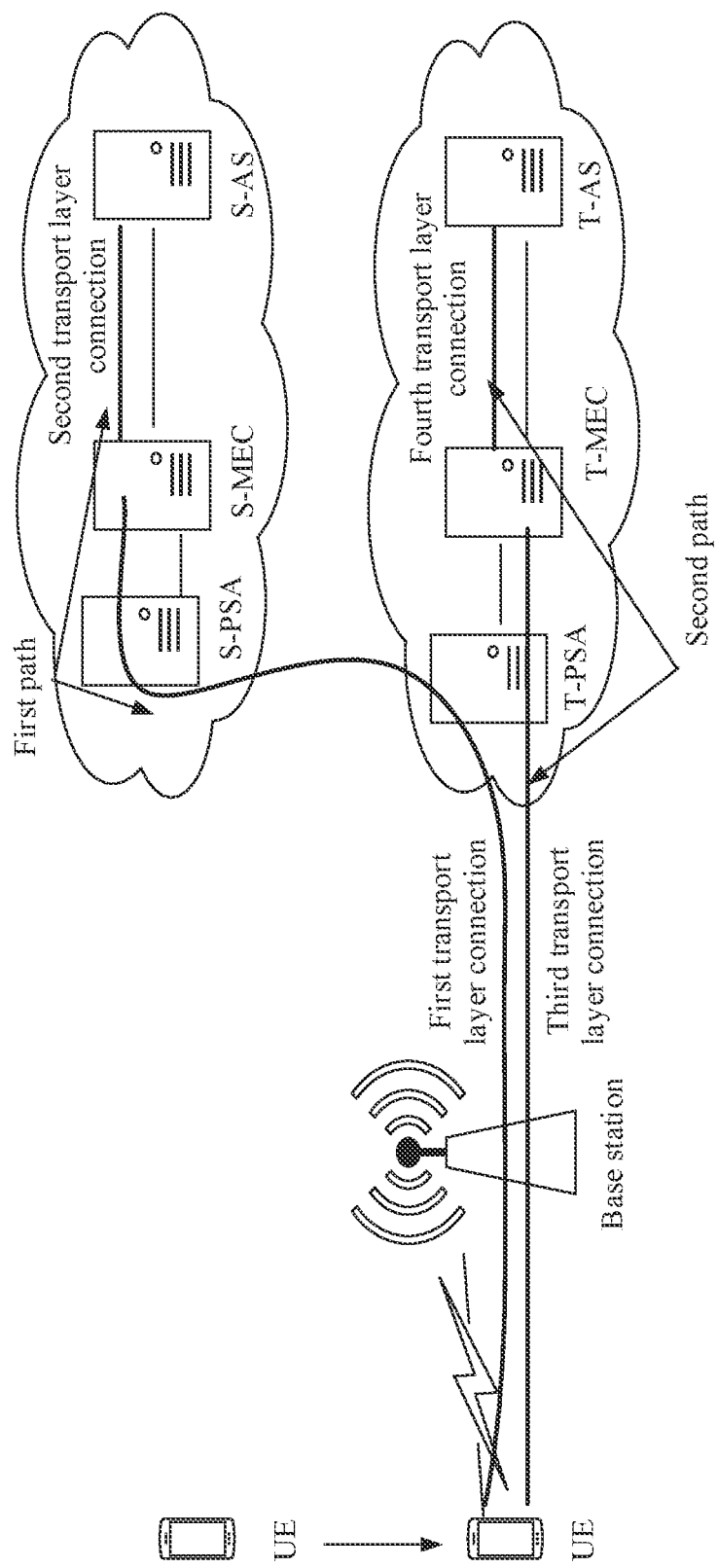
FIG. 11 is another schematic diagram of a data transmission path before and after path switching.

FIG. 9 is a schematic flowchart of a path switching method 900. In the method 900, a first transport layer connection and a third transport layer connection are MPTCP connections, and a second transport layer connection and a fourth transport layer connection are TCP connections. As shown in FIG. 9, the method 900 may include S901 to S909. The following separately describes the steps.

S901: When determining that an application needs to initiate a service, UE associates a PDU session with the service.

For example, if a PDU session that meets a QoS requirement of the service exists in the UE, the UE associates the PDU session with the service. If a PDU session that meets a QoS requirement of the service does not exist in the UE, the UE establishes a PDU session for the service by interacting with a core network, and associates the session with the service.

It should be understood that, in this application, when initiating a service, the UE needs to first establish a transport layer connection, to send a service packet or service data through the transport layer connection. A packet at a transport layer includes a packet for establishing a transport layer connection. An example in which the transport layer connection is a TCP connection is used. For a TCP packet, TCP SYN, SYN+ACK, and ACK messages that are sent in a TCP three-way handshake process need to be sent from the UE to a PSA through a base station by using a corresponding PDU session, and then sent from the PSA to an AS in a DN. After a TCP connection is established, a service packet of the UE is transmitted through the TCP connection. To be specific, the service packet is encapsulated into the TCP packet by the UE based on a parameter of the TCP connection, and then is sent from the UE to the AS through the base station and the PSA by using a PDU session corresponding to the TCP connection. That is, a transport layer connection between each UE and a server needs to be associated with one PDU session, and a transport layer connection between the UE and an S-PSA or a T-PSA in this application also needs to be associated with one PDU session.

This step is similar to S501, a difference lies in that in this step, in a PDU session establishment process, a proxy function of an S-MEC does not need to be activated, and a TCP proxy function of the S-MEC may be preconfigured.

S902: Establish a first path between the UE and an S-AS.

Specifically, the first transport layer connection, that is, an MPTCP connection, is established between the UE and the S-MEC, and the second transport layer connection, that is, a TCP connection, is established between the S-MEC and the S-AS.

Optionally, an IP address used by the UE to establish the first path may be allocated by the S-MEC and sent to the UE, or may be allocated by an MEC network configuration server and sent to the UE.

S902 may be implemented in the following manner:

1. The MPTCP connection between the S-MEC and the UE, that is, the first transport layer connection between the S-MEC and the UE is established based on an MPTCP three-way handshake process. Details are as follows:

902-*a*: When initiating a service, the UE sends a TCP SYN message (syn=j) to the S-AS, and waits for an acknowledgment of the S-AS. The SYN message carries a multipath capability MP_CAPABLE option (option), the MP_CAPABLE is used to indicate that a local device (that is, the UE) supports the MPTCP and performs key exchange between the UE and a peer end, where j represents a sequence number.

902-*b*: After receiving the TCP SYN message sent by the UE, the S-MEC, acting as proxy for the S-AS, establishes the MPTCP connection to the UE. In other words, the S-MEC, acting as proxy for the S-AS, sends a SYN+ACK message (syn=k, ack=j+1) to the UE. The SYN+ACK message carries the MP_CAPABLE option to indicate that the S-AS supports the MPTCP, where k represents a sequence number. The S-MEC is preconfigured to support the TCP proxy function.

902-*c*: The UE sends an ACK message (ack=k+1) to the S-MEC to acknowledge that the SYN+ACK message has been received. The S-MEC receives the ACK message from the UE and completes three-way handshakes with the UE, and establishment of the first transport layer connection between the UE and the S-MEC is completed.

2. The TCP connection between the S-MEC and the S-AS, that is, the second transport layer connection between the S-MEC and the S-AS is established based on the TCP three-way handshake process. Details are as follows:

902-*d*: The S-MEC sends a TCP SYN message (syn=m) to the S-AS, and waits for an acknowledgment of the S-AS, where m represents a sequence number.

902-*e*: After receiving the TCP SYN message, the S-AS returns a SYN+ACK message (syn=n, ack=m+1), where n represents a sequence number.

902-*f*: After receiving the SYN+ACK message, the S-MEC returns an ACK message ack=n+1) to acknowledge that the SYN+ACK message has been received.

After 902-*a* is performed, an execution sequence of the foregoing steps may be as follows: 902-*b* and 902-*c* may be performed in parallel with 902-*d*, 902-*e*, and 902-*f*. To be specific, 902-*d*, 902-*e*, and 902-*f* are sequentially performed when 902-*b* and 902-*c* are sequentially performed. Alternatively, the steps may be performed in a sequence of 902-*a*, 902-*d*, 902-*e*, 902-*b*, 902-*c*, and 902-*f*. To be specific, the S-MEC sends the SYN-ACK message (syn=k, ack=j+1) to the UE after receiving the SYN+ACK message (syn=n, ack=m+1) returned by the S-AS, and returns the ACK message (ack=n+1) to the S-AS after receiving the ACK message (ack=k+1) returned by the UE.

It should be understood that a process of establishing the MPTCP connection between the UE and the S-MEC is similar to a process of establishing the MPTCP connection between the UE and the S-PSA in S502. However, it should be noted that the TCP proxy function of the S-MEC may be preconfigured instead of being activated based on an indication of an SMF. Therefore, step S902-*b* similar to S502-*b* should be: " . . . because the TCP proxy function of the S-MEC has been preconfigured . . . " instead of " . . . because the TCP proxy function has been activated based on the indication of the SMF . . . " described in S502-*b*.

S903: The SMF sends a DNAI change notification to the S-MEC.

Specifically, when detecting that the UE moves and needs to switch the PSA, the SMF sends the DNAI change notification to the S-MEC, where the DNAI change notification includes a target DNAI.

S904: The S-MEC sends a context of the first transport layer connection to a T-MEC.

Specifically, the S-MEC may determine the T-MEC based on the target DNAI, and send the context of the first transport layer connection to the T-MEC. The context is a context of the MPTCP connection between the UE and the S-MEC, and may include, for example, one or more of the following: an IP address and a port number that are used by the UE for the first transport layer connection, key information of both ends, that is, the UE and the S-MEC, of the MPTCP connection, hash encryption algorithm information (for example, an HMAC-SHA256 encryption algorithm is used), a mapping relationship between a DSN and an SSN, an ISSN, and other information.

This application may be applied to two modes, that is, a UL CL mode and an SSC mode 3. In the IX CL mode, the SMF selects the T-PSA and then inserts the T-PSA as a UL CL. In the SSC mode 3, the SMF triggers the UE to establish a new PDU session, and the T-PSA is used as a user plane anchor for the PDU session. S905: The T-MEC establishes a second path between the UE and a T-AS.

Specifically, the T-MEC establishes the third transport layer connection, that is, the MPTCP connection, to the UE based on the context of the first transport layer connection, so that the third transport layer connection and the first transport layer connection belong to a same MPTCP session, and the T-MEC establishes the fourth transport layer connection, that is, the TCP connection, to the T-SA.

A process of establishing the MPTCP connection between the UE and the T-MEC is similar to the process of establishing the MPTCP connection between the UE and the T-PSA in S505 described above. A process of establishing the TCP connection between the T-MEC and the TAS is similar to the process of establishing the TCP connection between the T-PSA and the T-AS in S505. Details are not described herein again.

When the third transport layer connection is established, the last bit of a flag in an MP_JOIN option may be set to B=1 in the TCP SYN message initiated by the T-MEC, to indicate that a newly created subflow is a backup path backup path. To be specific, in this case, when the first transport layer connection is available, the third transport layer connection is used as a backup path and is not used to transmit data, and the data is still transmitted on the first transport layer connection.

Optionally, in the UL CL mode or the SSC mode 3, an IP address used by the UE for the second path or the third transport layer connection of the second path may be allocated by the S-MEC and sent to the UE, or may be allocated by an MEC network configuration server and sent to the UE.

S906: After establishment of the third transport layer connection is completed, the T-MEC sends a third transport layer connection establishment complete message to the S-MEC.

S907: After receiving the third transport layer connection establishment complete message, the S-MEC determines whether a complete service response packet sent by the S-AS for a service request sent by the UE is received.

If a determining result is "yes", S908 is performed. If a determining result is not "yes", S908 and a subsequent step are not performed.

In this step, the S-MEC needs to first detect a service request packet and a service response packet, to determine whether the complete service response packet sent by the S-AS for the service request sent by the UE is received. A time point at which the S-MEC starts to detect the service request packet and the service response packet is not limited in this application. For example, the S-MEC may start to detect the service request packet and the service response packet after receiving the third transport layer connection establishment complete message sent by the T-MEC in S906. For another example, the S-MEC may start to detect the service request packet and the service response packet after sending the context of the first transport layer connection to the T-MEC in S904.

For example, a manner in which the S-MEC determines whether the complete service response packet sent by the S-AS for the service request sent by the UE is received is similar to the manner in which the S-PSA determines whether the complete service response packet sent by the S-AS for the service request sent by the UE is received in S508. Details are not described herein again.

S908: The S-MEC sends first indication information to the UE.

This step is similar to S509. For details, refer to the foregoing descriptions of S509. It may be understood that the only difference between S908 and S509 lies in that S509 is performed by the S-PSA, and S908 is performed by the S-MEC.

S909: The UE switches a data transmission path from the first transport layer connection to the third transport layer connection based on the first indication information.

For this step, refer to S510. Details are not described herein again.

According to the method provided in this application, the S-MEC and the T-MEC each may establish an MPTCP connection to the UE. When path switching needs to be performed, the UE switches the data transmission path from the MPTCP connection to the S-MEC to the MPTCP connection to the T-MEC after the S-MEC detects the complete service response packet for the service request sent by the UE. According to the method, it can be ensured that path switching is performed after a complete status interaction process is completed, to ensure an ultra-low latency requirement of an application in an application migration process.

The method shown in FIG. 9 may be applied to two modes, that is, an SSC mode 3 and a UL CL mode. For the SSC mode 3 mode, data transmission paths before and after path switching are those shown in FIG. 10. For the UL CL mode, data transmission paths before and after path switching are those shown in FIG. 11.

Figure 12:
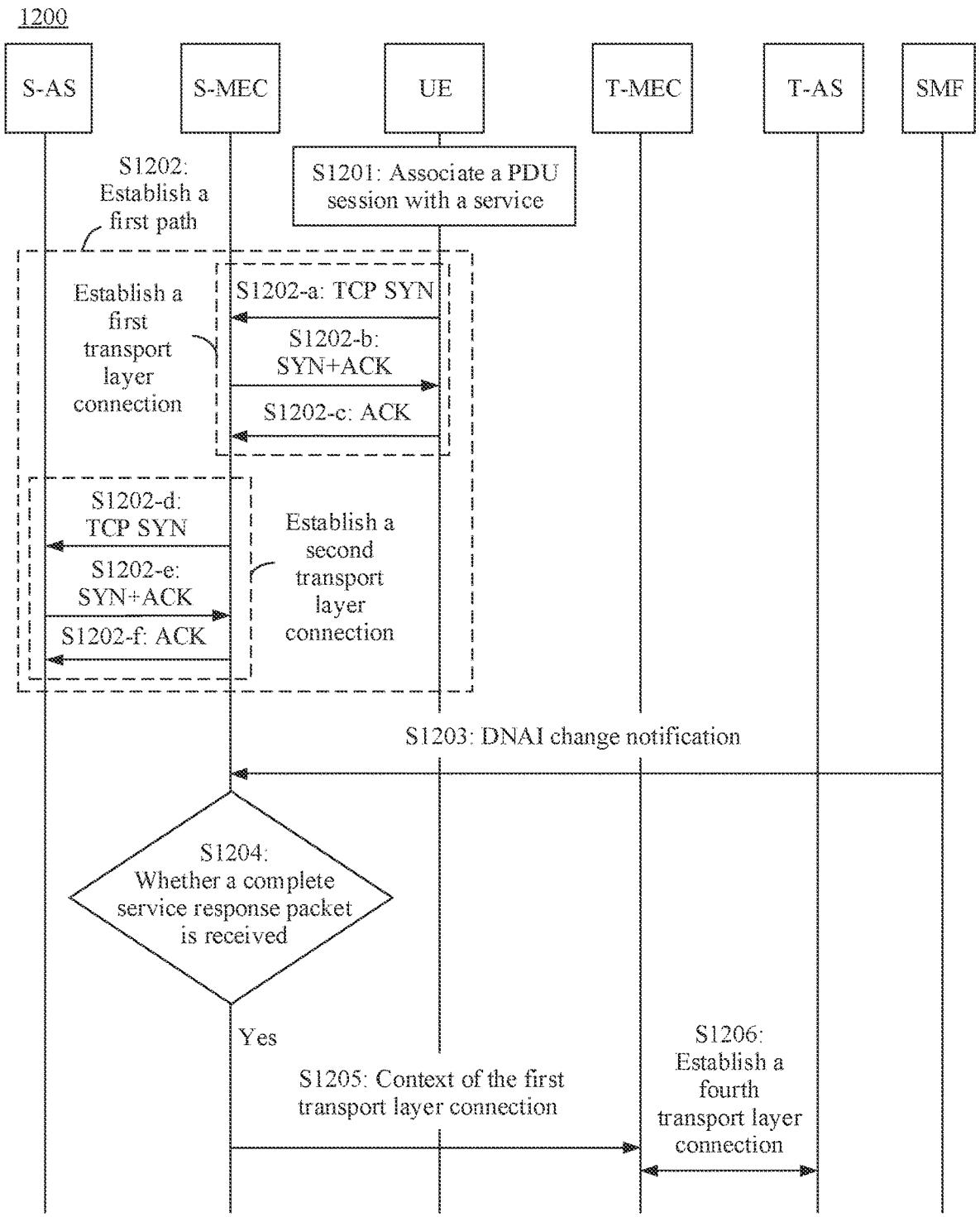
FIG. 12 is a schematic flowchart of a path switching method according to this application.

FIG. 12 is a schematic flowchart of a path switching method 1200. In the method 1200, a first transport layer connection, a second transport layer connection, a third transport layer connection, and a fourth transport layer connection are all TCP connections. As shown in FIG. 12, the method 1200 may include S1201 to S1206. The following separately describes the steps.

S1201: When determining that an application needs to initiate a service, UE associates a PDU session with the service.

For this step, refer to S901. Details are not described herein again.

S1202: Establish a first path between the UE and an S-AS.

Specifically, the first transport layer connection, that is, a TCP connection, is established between the UE and an S-MEC, and the second transport layer connection, that is, a TCP connection, is established between the S-MEC and the S-AS.

S1202 may be implemented in the following manner:

1. The TCP connection between the S-MEC and the UE, that is, the first transport layer connection between the S-MEC and the UE is established based on a TCP three-way handshake process. Details are as follows:

1202-a: When initiating a service, the UE sends a TCP SYN message (syn=j) to the S-AS, and waits for an acknowledgment of the S-AS, where j represents a sequence number.

1202-b: After receiving the TCP SYN message sent by the UE, the S-MEC, acting as proxy for the S-AS, establishes the TCP connection to the UE. In other words, the S-MEC, acting as proxy for the S-AS, sends a SYN+ACK message (syn=k, ack=+1) to the UE, where k represents a sequence number. The S-MEC is preconfigured to support the TCP proxy function.

1202-c: The UE sends an ACK message (ack=k+1) to the S-MEC to acknowledge that the SYN+ACK message has been received. The S-MEC receives the ACK message from the UE and completes three-way handshakes with the UE, and establishment of the first transport layer connection between the UE and the S-MEC is completed.

2. The TCP connection between the S-MEC and the S-AS, that is, the second transport layer connection between the S-MEC and the S-AS is established based on the TCP three-way handshake process. Details are as follows:

1202-d: The S-MEC sends a TCP SYN message (syn=m) to the S-AS, and waits for an acknowledgment of the S-AS, where m represents a sequence number.

1202-e: After receiving the TCP SYN message, the S-AS returns a SYN+ACK message (syn=n, ack=m+1), where n represents a sequence number.

1202-f: After receiving the SYN+ACK message, the S-MEC returns an ACK message (ack=n+1) to acknowledge that the SYN+ACK message has been received.

After 1202-a is performed, an execution sequence of the foregoing steps may be as follows: 1202-b and 1202-c may be performed in parallel with 1202-d, 1202-e, and 1202-f. To be specific, 1202-d, 1202-e, and 1202-f are sequentially performed when 1202-b and 1202-c are sequentially performed. Alternatively, the steps may be performed in a sequence of 1202-a, 1202-d, 1202-e, 1202-b, 1202-c, and 1202-f. To be specific, the S-MEC sends the SYN+ACK message (syn=k, ack=j+1) to the UE after receiving the SYN+ACK message (syn=n, ack=m+1) returned by the S-AS, and returns the ACK message (ack=n+1) to the S-AS after receiving the ACK message (ack=k+1) returned by the UE.

S1203: An SMF sends a DNAI change notification to the S-MEC.

Specifically, when detecting that the UE moves and needs to switch a PSA, the SMF sends the DNAI change notification to the S-MEC, where the DNAI change notification includes a target DNAI. The S-MEC may determine a T-MEC based on the target DNAI.

S1204: After receiving the DNAI change notification message, the S-MEC determines whether a complete service response packet sent by the S-AS for a service request sent by the UE is received.

If a determining result is "yes", S1205 is performed. If a determining result is not "yes", S1205 is not performed.

In this step, the S-MEC needs to first detect a service request packet and a service response packet, to determine whether the complete service response packet sent by the S-AS for the service request sent by the UE is received. A time point at which the S-MEC starts to detect the service request packet and the service response packet is not limited in this application. For example, the S-MEC may start to detect the service request packet and the service response packet after receiving the DNAI change notification message sent by the SME in S1203. This is not specifically limited in this application.

For example, a manner in which the S-MEC determines whether the complete service response packet sent by the S-AS for the service request sent by the UE is received is the same as the manner in which the S-PSA determines whether the complete service response packet sent by the S-AS for the service request sent by the UE is received in S508. Details are not described herein again.

S1205: The S-MEC sends a context of the first transport layer connection to the T-MEC.

The context includes a first transport layer connection parameter and a transmission status parameter, the first transport layer connection parameter is used to generate the third transport layer connection, and the transmission status parameter is used to indicate a data transmission status of the first transport layer connection. The first transport layer connection parameter may include an IP address and/or a port number of the UE, and optionally, may further include an IP address and/or a port number of the S-AS, or optionally, may further include an IP address and/or a port number that are/is used by the S-PSA for the first transport layer connection. The transmission status parameter of the first transport layer connection includes at least a sent TCP sequence number of uplink data, a sent TCP sequence number of downlink data, or a sequence number of sent uplink and downlink TCP ACKs on the first transport layer connection.

To be specific, the third transport layer connection may be generated based on the context sent by the S-MEC to the T-MEC, and the third transport layer connection and the first transport layer connection have the same transport layer connection parameter and transmission status parameter. The UE is unaware of generation of the third transport layer connection and still considers that data is transmitted through the first transport layer. After the third transport layer connection is generated, the T-MEC sends data from the UE to a T-AS through the fourth transport layer connection, that is, a transmission path is switched from the first path to a second path.

For example, the context of the first transport layer connection may be carried by the S-MEC in an HTTP response message and sent to the T-PSA. Alternatively, after the S-MEC determines that the complete service response packet sent by the S-AS for the service request sent by the UE has been received, the S-MEC sends the context of the first connection to the T-MEC by using a first user plane packet after sending the service response packet, where the first user plane packet is a packet sent immediately after the service response packet.

S1206: Establish the fourth transport layer connection between the T-MEC and the T-AS.

Specifically, the fourth transport layer connection is a TCP connection. The TCP connection is established between the T-MEC and the T-AS based on the TCP three-way handshake process, and the T-MEC initiates the TCP three-way handshake process. For specific steps, refer to 505-*d*, 505-*e*, and 505-*f* in S505. Details are not described herein again.

Specifically, S1206 may be performed before S1205, and this is not specifically limited in this application. For example, after an application on the T-AS completes registration with the T-MEC, the T-MEC establishes the fourth transport layer connection to the T-AS.

It should be understood that after the T-MEC generates the third transport layer connection and establishes the fourth transport layer connection, the data transmission path is switched from the first path to the second path.

According to the method provided in this application, a TCP connection is established between the S-MEC and the UE, and the S-MEC migrates a TCP connection status on the S-MEC to the T-MEC after the S-MEC detects the complete service response packet for the service request sent by the UE, so that the transmission path of the UE may be switched from the TCP connection to the S-MEC to the TCP connection to the T-MEC. According to the method, it can be ensured that path switching is performed after a complete status interaction process is completed, to ensure an ultra-low latency requirement of an application in an application migration process.

The method shown in FIG. 12 may be applied to a UL CL mode. For this mode, data transmission paths before and after path switching are those shown in FIG. 11.

An example in which a session management network element is an SW, a source transport layer proxy network element is an S-PSA, a target transport layer proxy network element is a T-PSA, a first application server is an S-AS, and a second application server is a T-AS is used below to describe another path switching method provided in the application.

Figure 13A:
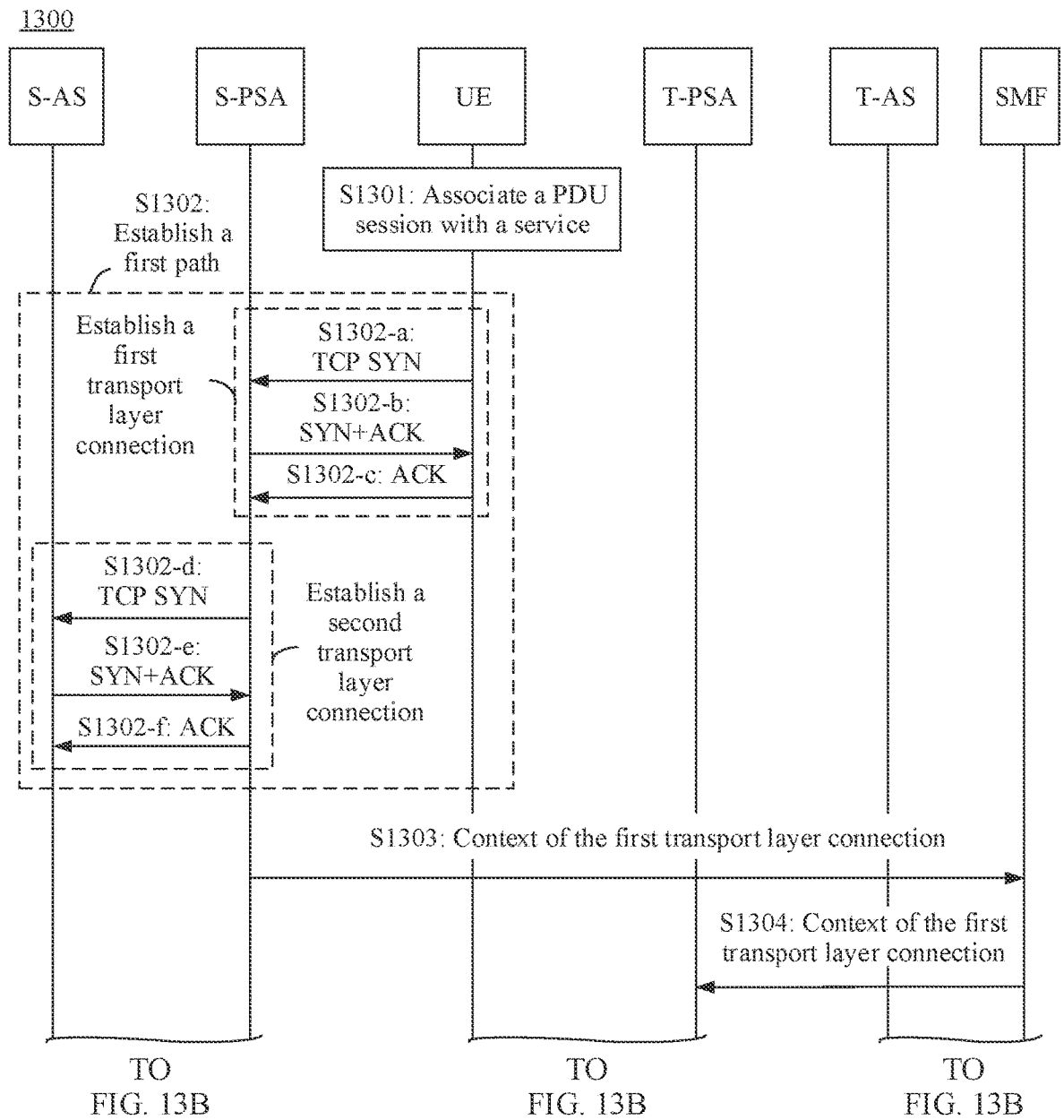
FIG. 13A and FIG. 13B are a schematic flowchart of a path switching method according to this application.
Figure 13B:
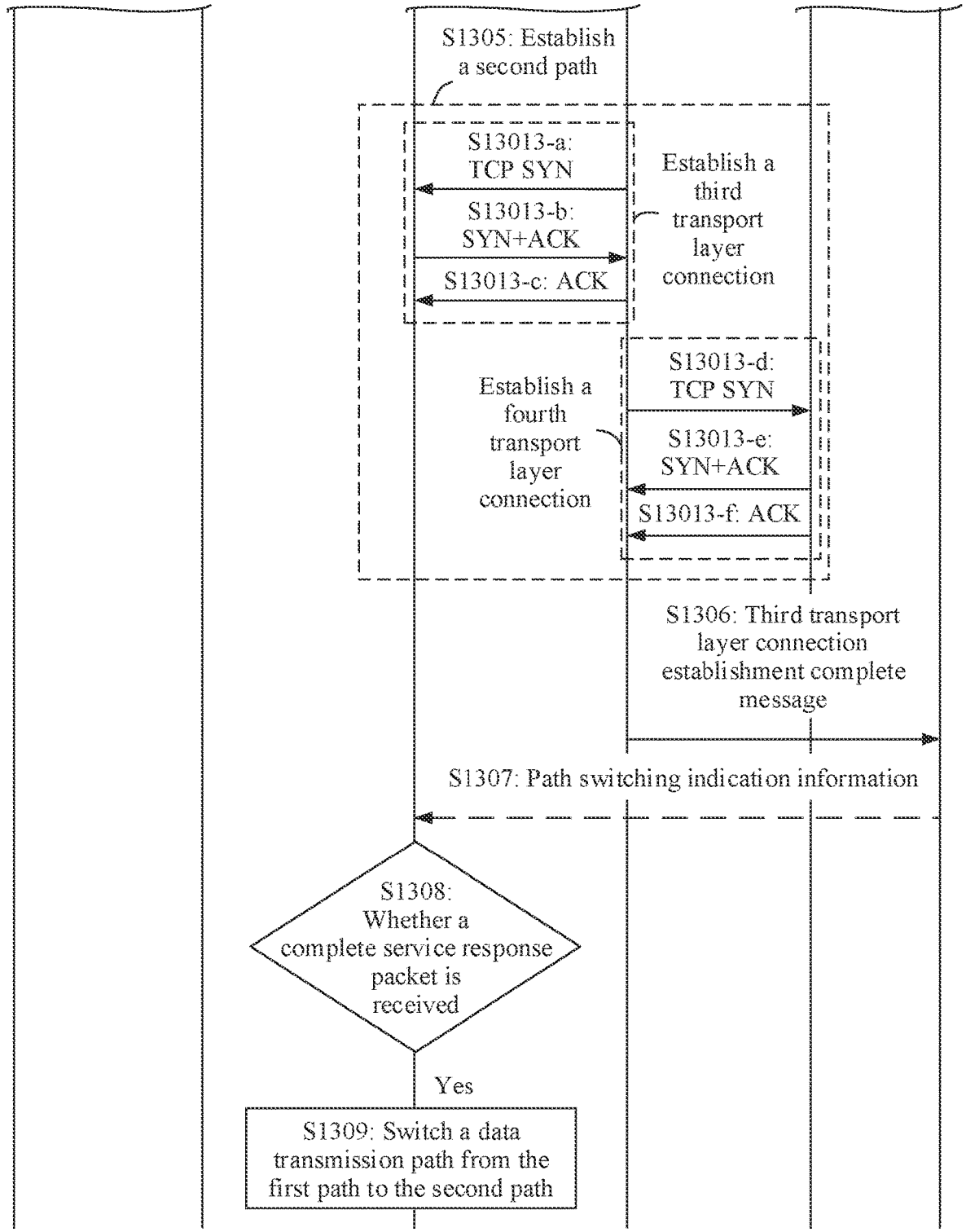

FIG. 13A and FIG. 13B are a schematic flowchart of another path switching method according to this application. A difference between the method and the method shown in FIG. 5A and FIG. 5B lies in that in FIG. 5A and FIG. 5B, the S-PSA determines whether the complete service response packet sent by the S-AS for the service request sent by the UE is received, and in this method, the UE determines whether the complete service response packet sent by the S-AS for the service request sent by the UE is received.

As shown in FIG. 13A and FIG. 13B, the method 1300 may include S1301 to S1309. The following describes the steps.

For S1301 to S1306, refer to S501 to S506. Details are not described herein again.

S1307: An SMF sends path switching indication information to the UE.

After learning, based on a third transport layer connection establishment complete message, that establishment of a third transport layer connection is completed, the SMF sends the path switching indication information to the UE, to indicate the UE to perform path switching.

Optionally, S1307 may not be performed. To be specific, the SMF does not indicate LTE to perform path switching, but the UE autonomously determines to perform path switching. For example, if the establishment of the third transport layer connection is completed, the determines that path switching needs to be performed. A method used by the UE to determine that the establishment of the third transport layer connection is completed may be as follows: When establishing the third transport layer connection, the UE receives an ACK message sent by a T-PSA in a three-way handshake process, and the UE may determine that the establishment of the third transport layer connection is completed.

S1308: The UE determines whether the complete service response packet sent by the S-AS for the service request sent by the UE is received.

If a determining result is "yes", S1309 is performed. If a determining result is not "yes", S1309 is not performed.

For example, if a service request message is an HTTP request (HTTP request) message, and a service response message is an HTTP response (HTTP response) message, the UE may determine, by parsing the HTTP response message and the HTTP response message, whether a complete HTTP response message sent by the S-AS for the HTTP request sent by the UE is received. For example, the UE may determine, based on a message status code in the HTTP response message, whether the HTTP response message is a segment response message. If the HTTP status code carried in the HTTP response message is 200, it indicates that the HTTP response message is not segmented, and the UE may determine that the complete response message of the corresponding HTTP request message has been received when receiving the HTTP response message. If the HTTP status code carried in the HTTP response message is 206, it indicates that the S-AS sends a service packet to the UE in a manner of segmented responses, and the UE needs to determine, based on a range field carried in the HTTP request message and a content-range field in the HTTP response message, whether the received HTTP response message is the last segment response message corresponding to the HTTP request message. The range field carried in the HTTP request message is used by the UE to notify the S-AS of a range of requested content, and the content-range field in the HTTP response message is used by the S-AS to notify a range and an actual length of a response.

S1309: The UE switches a data transmission path from a first path to a second path.

In other words, the UE switches the data transmission path from a first transport layer connection to the third transport layer connection.

Optionally, the UE further sets a TCP option of an MPTCP packet sent on the third transport layer connection, and sets a flag B of an MP_PRIO option to 0, to indicate to the T-PSA that a priority of the third transport layer connection is higher than that of the first transport layer connection and data is transmitted through the third transport layer connection.

According to the method provided in this application, the S-PSA and the T-PSA each may establish an MPTCP connection to the UE. When path switching needs to be performed, the UE switches the data transmission path from the MPTCP connection to the S-PSA to the MPTCP connection to the T-PSA after the UE detects the complete service response packet for the service request sent by the UE. According to the method, it can be ensured that path switching is performed after a complete status interaction process is completed, to ensure an ultra-low latency requirement of an application in an application migration process.

It should be understood that the method shown in FIG. 13A and FIG. 13B may be applied to two modes, that is, an SSC mode 3 and a UL CL mode. For the SSC mode 3 mode, data transmission paths before and after path switching are those shown in FIG. 6. For the UL CL mode, data transmission paths before and after path switching are those shown in FIG. 7.

Figure 14:
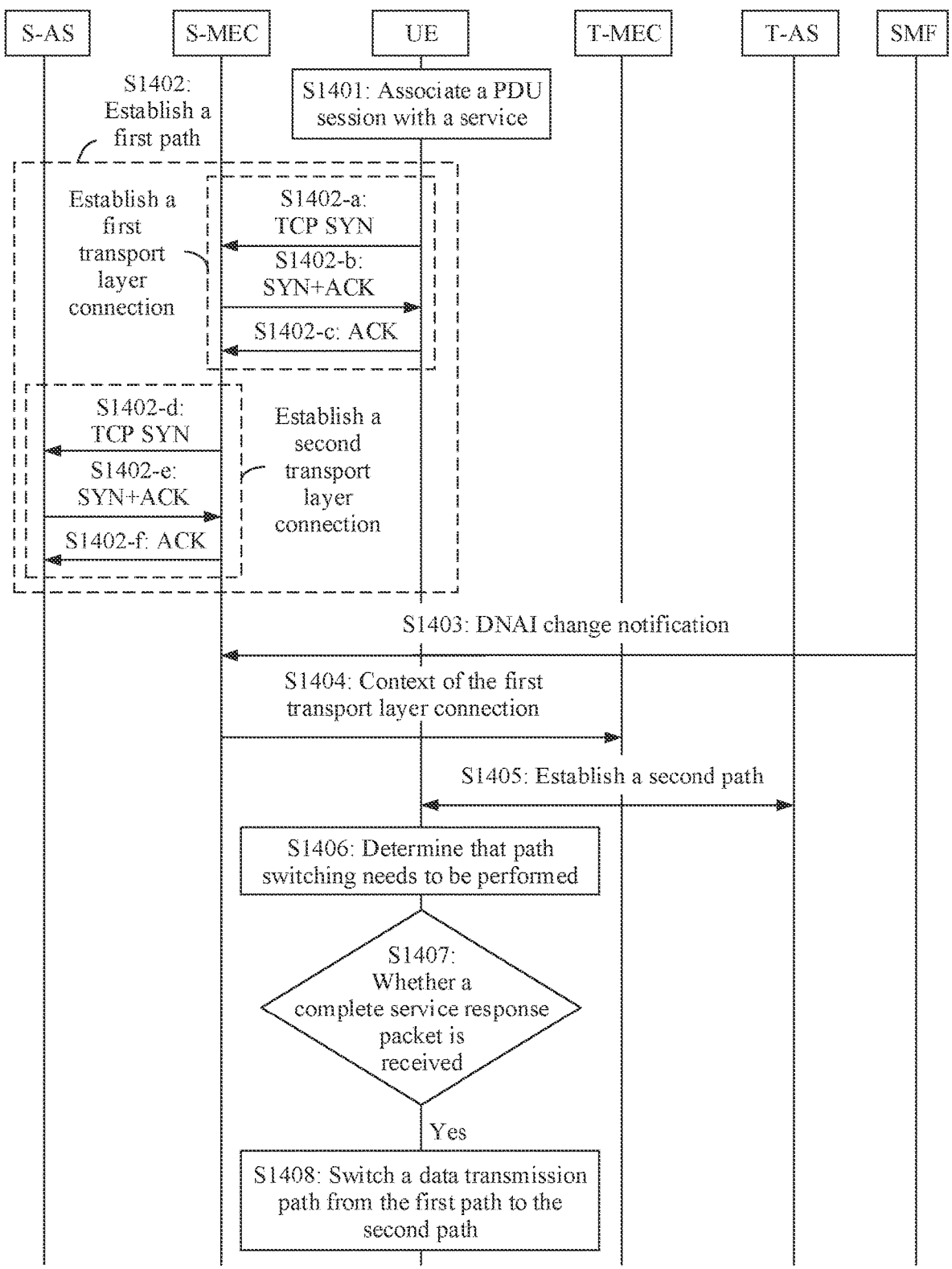
FIG. 14 is a schematic flowchart of a path switching method according to this application.

FIG. 14 is a schematic flowchart of another path switching method according to this application. A difference between the method and the method shown in FIG. 13A and FIG. 13B lies in that in FIG. 13A and FIG. 13B, the source transport layer proxy network element is an S-PSA and the target transport layer proxy network element is a T-PSA, and in FIG. 14, the source transport layer proxy network element is an S-MEC and the target transport layer proxy network element is a T-MEC.

As shown in FIG. 14, the method 1400 may include S1401 to S1408. The following describes the steps.

For S1401 to S1405, refer to S901 to S905. Details are not described herein again.

S1406: UE determines that path switching needs to be performed.

Specifically, if establishment of a third transport layer connection is completed, the UE determines that path switching needs to be performed. If establishment of a third transport layer connection is not completed, path switching does not need to be performed. A method used by the UE to determine that the establishment of the third transport layer connection is completed may be as follows: When establishing the third transport layer connection, the UE receives an ACK message sent by the T-MEC in a three-way handshake process, and the UE may determine that the establishment of the third transport layer connection is completed.

Alternatively, an SMF indicates to the UE that path switching needs to be performed. Specifically, after learning, based on a third transport layer connection establishment complete message, that the establishment of the third transport layer connection is completed, the SMF sends path switching indication information to the UE, to indicate the UE to perform path switching. The SMF may learn from the T-MEC that the establishment of the third transport layer is completed, or may learn from an AF that the establishment of the third transport layer is completed. In this case, the AF learns from the T-MEC that the establishment of the third transport layer is completed.

S1407: The UE determines whether a complete service response packet sent by an S-AS for a service request sent by the UE is received.

If a determining result is "yes", S1408 is performed. If a determining result is not "yes", S1408 and a subsequent step are not performed.

For S1407, refer to S1308. Details are not described herein again.

For S1408, refer to S1309.

According to the method provided in this application, the S-MEC and the T-MEC each may establish an MPTCP connection to the UE. When path switching needs to be performed, the UE switches a data transmission path from the MPTCP connection to the S-MEC to the MPTCP connection to the T-MEC after the UE detects the complete service response packet for the service request sent by the UE. According to the method, it can be ensured that path switching is performed after a complete status interaction process is completed, to ensure an ultra-low latency requirement of an application in an application migration process.

It should be understood that the method shown in FIG. 14 may be applied to two modes, that is, an SSC mode 3 and a UE CL mode. For the SSC mode 3 mode, data transmission paths before and after path switching are those shown in FIG. 10. For the UL CL mode, data transmission paths before and after path switching are those shown in FIG. 11.

An example in which a session management network element is an SMF, a first application server is an S-AS, and the second application server is a T-AS is used below to describe another path switching method provided in the application.

Figure 15:
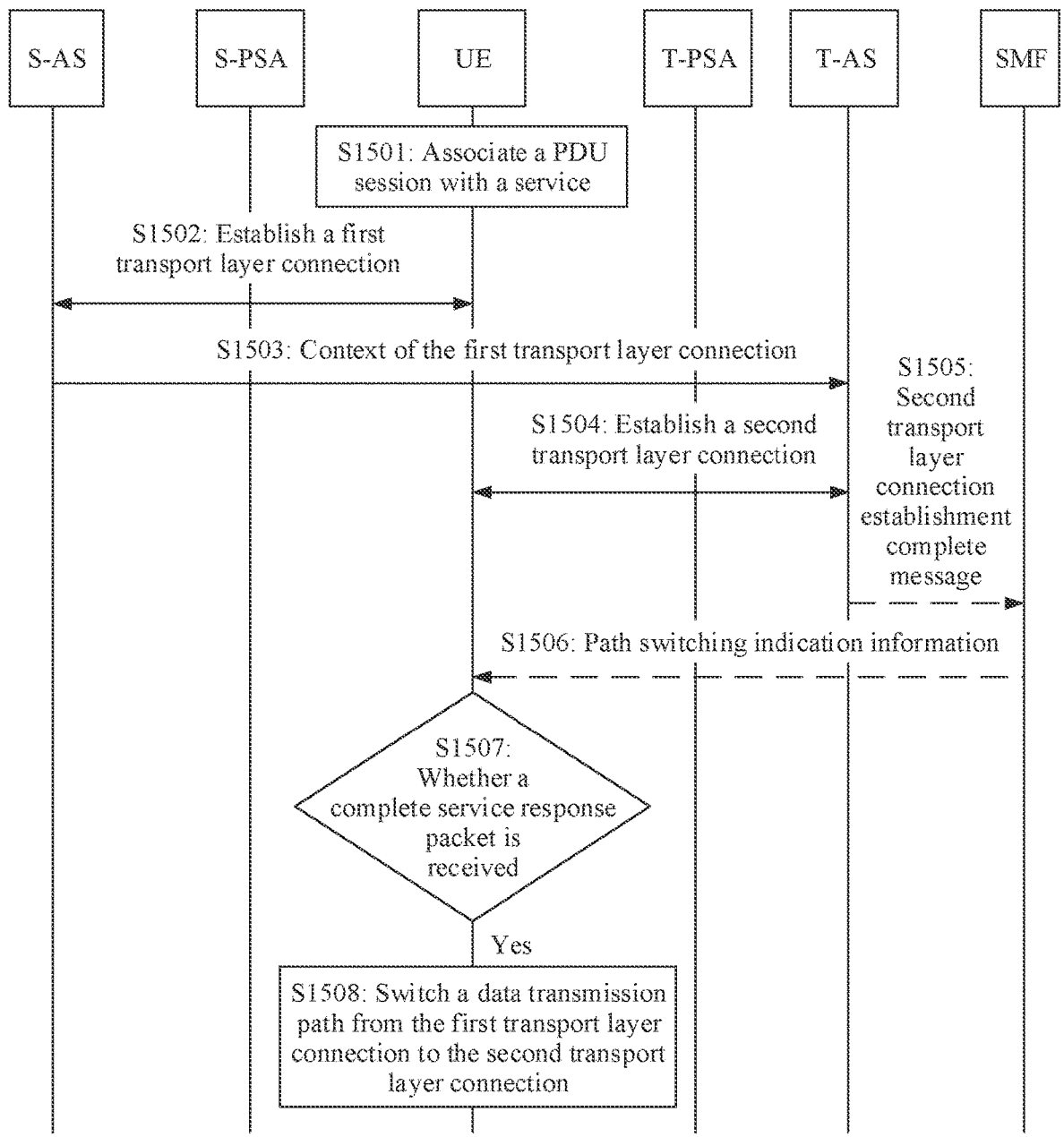
FIG. 15 is a schematic flowchart of a path switching method according to this application.

FIG. 15 is a schematic flowchart of another path switching method according to this application. As shown in FIG. 15, the method 1500 may include S1501 to S1508. The following separately describes the steps.

S1501: Refer to S501.

S1502: Establish a first transport layer connection between UE and an S-AS.

The first transport layer connection herein may be an MPTCP connection. However, this is not limited in this application.

For a process of establishing the MPTCP connection between the UE and the S-AS, refer to the process of establishing the MPTCP connection between the UE and the S-PSA described in S502. Details are not described herein again.

S1503: The S-AS sends a context of the first transport layer connection to a T-AS.

For example, when receiving an indication from an MEC platform network element, an application management network element, or an AF, the S-AS may send the context of the first transport layer connection to the T-AS. For example, the context of the first transport layer connection may include one or more of the following: an IP address and a port number that are used by the UE for the first transport layer connection, key information of both ends, that is, the UE and the S-AS, of the MPTCP connection, hash encryption algorithm information, a mapping relationship between a DSN and an SSN, an ISSN, and other information.

S1504: The T-AS establishes a second transport layer connection to the UE based on the context of the first transport layer connection.

The second transport layer connection herein may be an MPTCP connection. However, this is not limited in this application.

For a process of establishing the MPTCP connection between the UE and the T-AS, refer to the process of establishing the MPTCP connection between the UE and the T-PSA described in S505. Details are not described herein again.

When the second transport layer connection is established, the last bit of a SYN flag in an MP_JOIN option may be set to B=1, to indicate that a newly created subflow is a backup path backup path. To be specific, in this case, the second transport layer connection is used as a backup path and is not used to transmit data, and the data is still transmitted on the first transport layer connection.

S1505: The T-AS sends a second transport layer connection establishment complete message to an SMF.

Specifically, after completing establishment of the second transport layer connection, the T-AS sends the second transport layer connection establishment complete message to the AF or the MEC platform network element, and the AF or the MEC platform network element forwards the second transport layer connection establishment complete message to the SMF.

S1506: The SMF sends path switching indication information to the UE.

The SMF may learn, based on the second transport layer connection establishment complete message, that the establishment of the second transport layer connection is completed, and therefore may indicate the UE to perform path switching by sending the path switching indication information to the UE.

S1507: The UE determines whether a complete service response packet sent by the S-AS for a service request sent by the UE is received.

If a determining result is "yes", S1508 is performed. If a determining result is not "yes", S1508 is not performed.

For example, if a service request message is an HTTP request (HTTP request) message, and a service response message is an HTTP response (HTTP response) message, the UE may determine, by parsing the HTTP response message and the HTTP response message, whether a complete HTTP response message sent by the S-AS for the HTTP request sent by the UE is received. For example, the UE may determine, based on a message status code in the HTTP response message, whether the HTTP response message is a segment response message. If the HTTP status code carried in the HTTP response message is 200, it indicates that the HTTP response message is not segmented, and the UE may determine that the complete response message of the corresponding HTTP request message has been received when receiving the HTTP response message. If the HTTP status code carried in the HTTP response message is 206, it indicates that the S-AS sends a service packet to the UE in a manner of segmented responses, and the UE needs to determine, based on a range field carried in the HTTP request message and a content-range field in the HTTP response message, whether the received HTTP response message is the last segment response message corresponding to the HTTP request message. The range field carried in the HTTP request message is used by the UE to notify the S-AS of a range of requested content, and the content-range field in the HTTP response message is used by the S-AS to notify a range and an actual length of a response.

S1508: The UE switches a data transmission path from the first transport layer connection to the second transport layer connection.

Specifically, when the UE determines that path switching needs to be performed, if the complete service response packet sent by the S-AS for the service request sent by the UE is received, the UE switches the data transmission path from the first transport layer connection to the second transport layer connection.

Optionally, the UE further sets a TCP option of an MPTCP packet sent on the second transport layer connection, and sets a flag B of an MP_PRIO option to 0, to indicate to the T-PSA that a priority of the second transport layer connection is higher than that of the first transport layer connection and data is transmitted through the second transport layer connection.

Optionally, S1505 and S1506 may not be performed. After the UE and the T-AS complete an MPTCP three-way handshake process and establish the second transport layer connection, if the complete service response packet sent by the S-AS for the service request sent by the UE is received, the UE switches the data transmission path from the first transport layer connection to the second transport layer connection.

According to the method provided in this application, the S-AS and the T-AS each may establish a transport layer connection to the UE. When path switching needs to be performed, the UE, switches from the transport layer connection to the S-AS to the transport layer connection to the T-AS if the UE detects the complete service response packet for the service request sent by the UE. According to the method, it can be ensured that path switching is performed after a complete status interaction process is completed, to ensure an ultra-low latency requirement of an application in an application migration process.

Figure 16:
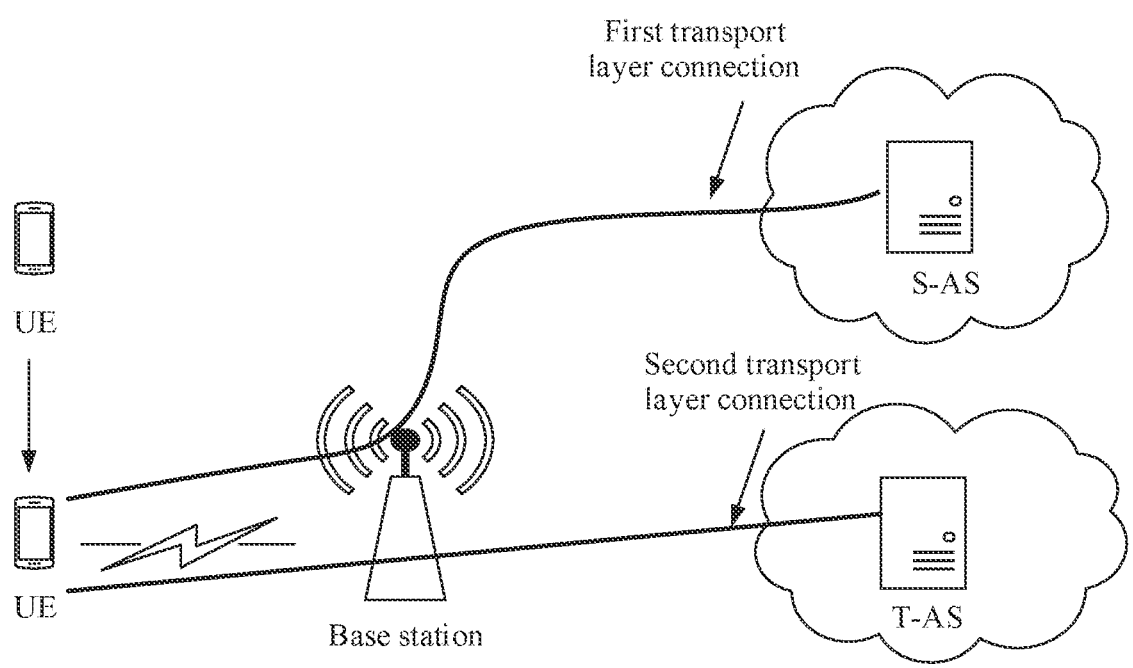
FIG. 16 is a schematic diagram of a data transmission path before and after path switching.

It should be understood that the method shown in FIG. 15 may be applied to two modes, that is, an SSC mode 3 and a UL CL mode. For the SSC mode 3 mode or the UL CL mode, data transmission paths before and after path switching are those shown in FIG. 16.

An example in which a session management network element is an SW, a first application server is an S-AS, a second application server is a T-AS, a source transport layer proxy network element is an S-PSA, and a target transport layer proxy network element is a T-PSA is used below to describe path switching methods shown in FIG. 17 to FIG. 20.

Figure 17:
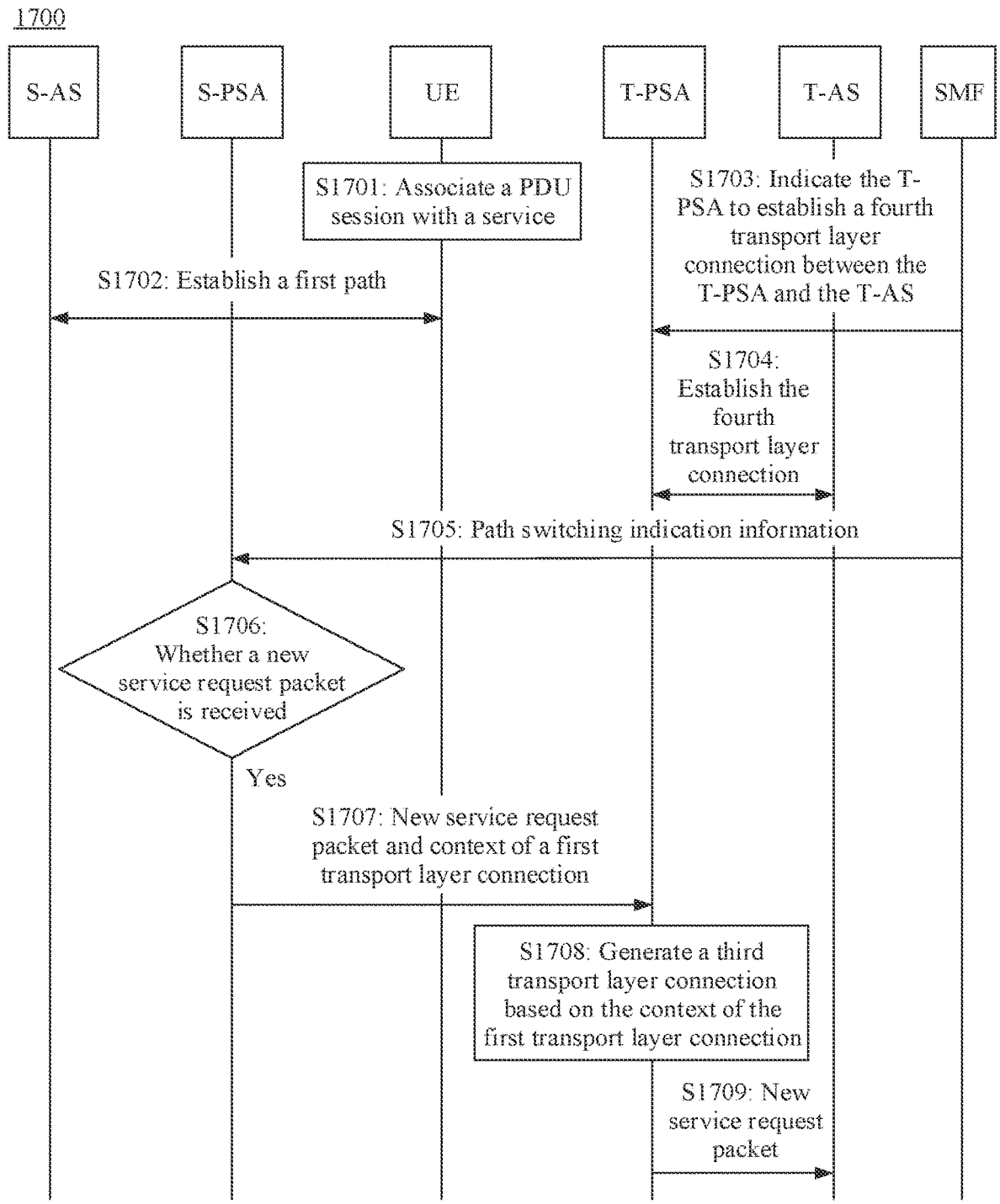
FIG. 17 is a schematic diagram of a data transmission path before and after path switching.

FIG. 17 is a schematic flowchart of another path switching method according to this application. The method 1700 is described with reference to FIG. 17.

S1701: When determining that an application needs to initiate a service, UE associates a PDU session with the service.

This step is the same as S501. For details, refer to S501.

S1702: Establish a first path between the UE and an S-AS,

Specifically, a first transport layer connection is established between the UE and an S-PSA, a second transport layer connection is established between the S-PSA and the S-AS, and both the first transport layer connection and the second transport layer connection are TCP connections.

It should be understood that S1702 is the same as S802. For details, refer to the foregoing descriptions of S802.

S1703: An SMF indicates a T-PSA to establish a TCP connection between the T-PSA and a T-AS, that is, a fourth transport layer connection.

For example, when detecting that the UE moves and needs to switch a PSA, the SMF selects the T-PSA for the UE, and inserts the selected T-PSA as a UL CL. In addition, the SMF may send routing information to the selected T-PSA, where the routing information indicates the T-PSA to establish the TCP connection to the T-AS. For example, the SMF may send the routing information to the T-PSA by using an N4 session modification request message. Optionally, the routing information may include IP address information of the T-AS, and the IP address information is used by the T-PSA to establish the transport layer connection to the T-AS. For example, the SMF may send, to the T-PSA by using an N4 session establishment request message or an N4 session modification request message, the routing information including the IP address information.

S1704: Establish the fourth transport layer connection between the T-PSA and the T-AS.

The T-PSA may obtain the IP address information of the T-AS based on an indication of the SW, and then establish the TCP connection to the T-AS based on a TCP three-way handshake process. For specific steps of the TCP three-way handshake process initiated by the T-PSA, refer to 505-*d*, 505-*e*, and 505-*f* in S505. Details are not described herein again.

S1705: The SMF sends path switching indication information to the S-PSA.

For example, the SMF may send the path switching indication information after determining that establishment of the fourth transport layer connection is completed.

Optionally, the SMF may send the path switching indication information to the S-PSA by using an N4 session modification request message.

S1706: After receiving the path switching indication information, the S-PSA determines whether a new service request packet sent by the UE is received.

After receiving the path switching indication information, the S-PSA may determine that path switching needs to be performed. In this case, the S-PSA determines whether the new service request packet sent by the UE is received, and if a determining result is "yes", S1707 and subsequent steps are performed.

Herein, the new service request packet means that a service request packet is not a segmented service request packet, or a service request packet is a segmented service request packet and is the first segment.

It should be understood that a complete service request packet corresponding to one service request may be divided into a plurality of segments for transmission. To be specific, one segment may be transmitted each time, and a server (for example, the S-AS or the T-AS in this application) responds to all segments after receiving all the segments. Alternatively, a server responds to each segment. In this case, the server needs to return a response to the terminal device based on one or more received segments (where for example, the server may return a response based on the first segment service request after receiving the first segment service request, to indicate the terminal device to continue to send a subsequent segment request; and return a response based on the first segment service request and the second segment service request after receiving the second service request). After receiving a complete response packet sent by the server, the terminal device may send a new service request packet.

Optionally, the new service request packet may be an HTTP request message. This is not limited in this application.

S1707: The S-PSA sends the new service request packet and a context of the first transport layer connection to the T-PSA.

The context of the first transport layer connection is used to migrate a connection status between the UE and the S-PSA to the T-PSA.

For example, the context of the first transport layer connection may include a first transport layer connection parameter and a first transmission status parameter, the first transport layer connection parameter is used to generate a third transport layer connection, and the first transmission status parameter is used to indicate a data transmission status of the first transport layer connection.

For example, the first transport layer connection parameter may include an IP address and a port number that are used by the UE for the first transport layer connection, and optionally, may further include an IP address and/or a port number of the S-AS, or optionally, may further include an IP address and a port number that are used by the S-PSA for the first transport layer connection. For example, the transmission status parameter of the first transport layer connection may include one or more of the following: a sent TCP sequence number of uplink data, a sent TCP sequence number of downlink data, or a sequence number of sent uplink and downlink TCP ACKs on the first transport layer connection.

For example, the context of the first transport layer connection may be carried by the S-PSA in an HTTP request message and sent to the T-PSA. Alternatively, after the S-PSA determines that the new service request packet sent by the UE has been received, the S-PSA sends the context of the first transport layer connection to the T-PSA by using a first user plane packet after sending the new service request packet to the T-PSA, where the first user plane packet is a packet sent to the T-PSA immediately after the new service request packet.

It should be understood that, after the S-PSA sends the context of the first transport layer connection to the T-PSA, a TCP proxy function of the S-PSA for this service data flow is deactivated. In other words, for a packet of the service data flow the S-PSA does not perform transport layer TCP protocol processing. S1708: The T-PSA generates the third transport layer connection based on the context of the first transport layer connection.

It should be understood that the third transport layer connection and the first transport layer connection have the same transport layer connection parameter and transmission status parameter. The LIE is Unaware of generation of the third transport layer connection, and still considers that data is transmitted through the first transport layer connection.

After the T-PSA generates the third transport layer connection or the S-PSA sends the context of the first transport layer connection, a data transmission path is switched from the first path to a second path. To be specific, data sent by the UE is sent to the T-PSA through the third transport layer connection, and the T-PSA sends received information to the T-AS through the fourth transport layer connection.

It should be understood that the second path includes the third transport layer connection and the fourth transport layer connection.

It should be further understood that generating the third transport layer connection by the T-PSA may also be understood as storing the context of the first transport layer connection by the T-PSA.

S1709: The T-PSA sends the new service request packet to the T-AS.

It should be understood that a sequence of S1708 and S1709 is not limited in this application.

It should be further understood that a subsequent response of the T-AS to the new service request packet is transmitted through the second path.

According to the path switching method provided in this application, a TCP connection is established between the S-PSA and the UE, and the S-PSA may migrate a status of the first transport layer connection on the S-PSA to the T-PSA after determining that path switching needs to be performed and detects the new service request packet sent by the UE, so that a transmission path of a packet may be switched front a path to the S-AS to a path to the T-AS. According to this method, it can be ensured that a complete status interaction process is performed on a same path, to ensure an ultra-low latency requirement of an application in an application migration process.

Figure 18:
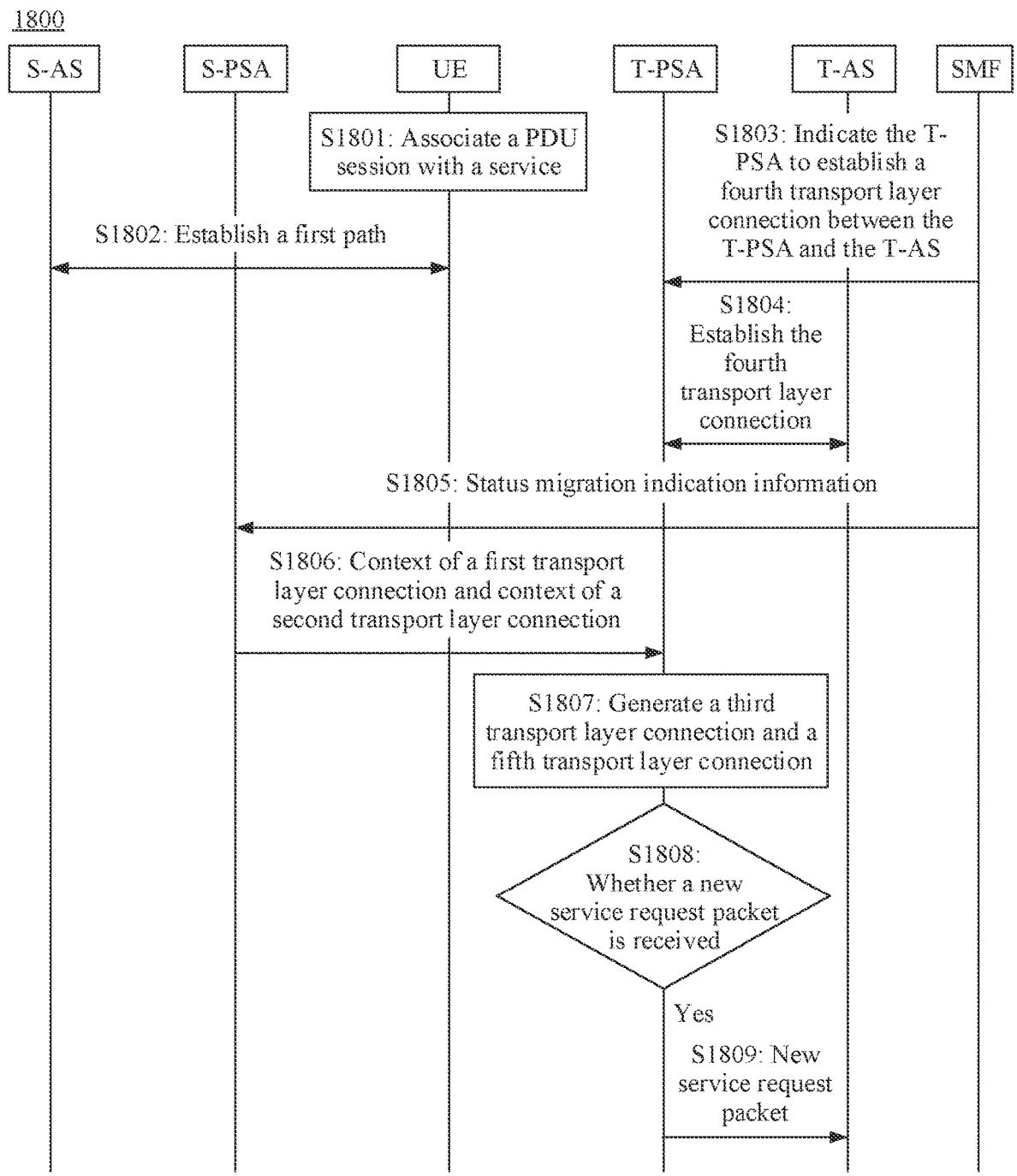
FIG. 18 is a schematic diagram of a data transmission path before and after path switching.

FIG. 18 is a schematic flowchart of another path switching method according to this application. The method 1800 is described with reference to FIG. 18.

S1801 to S1804 are the same as S1701 to S1704. For details, refer to S1701 to S1704.

S1805: An SMF sends status migration indication information to an S-PSA, to indicate the S-PSA to migrate a TCP connection status to a T-PSA.

In other words, the status migration indication information indicates the S-PSA to migrate a connection status between the S-PSA and UE and a connection status between the S-PSA and an S-AS to the T-PSA.

For example, when detecting that the UE moves and needs to switch a PSA, the SMF may select the target T-PSA for the UE, and insert the T-PSA as a UL CL. Then, the SMF sends the indication information to the S-PSA.

Optionally, the SMF may also send the indication information after determining that establishment of a fourth transport layer connection is completed.

For example, the SMF may send the indication information to the S-PSA by using an N4 session modification request message.

S1806: After receiving the indication information sent by the SMF, the S-PSA migrates the TCP connection status to the T-PSA. In other words, the S-PSA sends a context of a first transport layer connection and a context of a second transport layer connection to the T-PSA.

For example, the context of the first transport layer connection may include a first transport layer connection parameter and a first transmission status parameter. The first transport layer connection parameter is used to generate a third transport layer connection (a TCP connection between the UE and the T-PSA), and the first transmission status parameter is used to indicate a data transmission status of the first transport layer connection. For example, the first transport layer connection parameter may include an IP address and a port number that are used by the UE for the first transport layer connection, and optionally, may further include an IP address and/or a port number of the S-AS, or optionally, may further include an IP address and a port number that are used by the S-PSA for the first transport layer connection. For example, the transmission status parameter of the first transport layer connection may include one or more of the following: a sent TCP sequence number of uplink data, a sent TCP sequence number of downlink data, or a sequence number of sent uplink and downlink TCP ACKs on the first transport layer connection.

A context of a second transport layer connection may include a second transport layer connection parameter and a second transmission status parameter. The second transport layer connection parameter is used to generate a fifth transport layer connection (a TCP connection between the T-PSA and the S-AS), and the second transmission status parameter is used to indicate a data transmission status of the second transport layer connection. For example, the second transport layer connection parameter may include the IP address and the port number of the S-AS, and optionally, may further include the IP address and/or the port number used by the UE for the first transport layer connection. The transmission status parameter of the second transport layer connection may include one or more of the following: a sent TCP sequence number of uplink data, a sent TCP sequence number of downlink data, or a sequence number of sent uplink and downlink TCP ACK s on the second transport layer connection.

S1807: The T-PSA generates the third transport layer connection based on the context of the first transport layer connection, and generates the fifth transport layer connection based on the context of the second transport layer connection.

It should be understood that the third transport layer connection and the first transport layer connection have the same transport layer connection parameter and transmission status parameter. The UE is unaware of generation of the third transport layer connection, and still considers that data is transmitted through the first transport layer connection. The fifth transport layer connection and the second transport layer connection have the same transport layer connection parameter and transmission status parameter. The UE is unaware of generation of the fifth transport layer connection, and still considers that data is transmitted through the second transport layer connection.

It should be further understood that generating the third transport layer connection by the T-PSA may also be understood as storing the context of the first transport layer connection by the T-PSA. Generating the fifth transport layer connection by the T-PSA may also be understood as storing the context of the second transport layer connection by the T-PSA.

After migration of the TCP connection status is completed, that is, the third transport layer connection and the fifth transport layer connection are generated, a packet from the TIE is sent to the S-AS through a third path, where the third path includes the third transport layer connection and the fifth transport layer connection. A packet sent by the S-AS to the UE is also sent to the UE through the third path.

S1808: The T-PSA determines whether a new service request packet sent by the UE is received.

If a determining result is "yes", S1809 is performed, that is, the new service request packet is sent to the T-AS through the fourth transport layer connection.

If a determining result is not "yes", S1809 is not performed, and the T-PSA still transmits a service packet through the fifth transport layer connection, that is, transmits the service packet through the third path.

Herein, the new service request packet means that a service request packet is not a segmented service request packet, or a service request packet is a segmented service request packet and is the first segment.

It should be understood that a complete service request packet corresponding to one service request may be divided into a plurality of segments for transmission. To be specific, one segment may be transmitted each time, and a server (for example, the S-AS or the T-AS in this application) responds to all segments after receiving all the segments. Alternatively, a server responds to each segment. In this case, the server needs to return a response to the terminal device based on one or more received segments (where for example, the server may return a response based on the first segment service request after receiving the first segment service request, to indicate the terminal device to continue to send a subsequent segment request; and return a response based on the first segment service request and the second segment service request after receiving the second service request). After receiving a complete response packet sent by the server, the terminal device may send a new service request packet. Alternatively, the terminal device may send a new service request packet at any time. The new service request packet, a corresponding response packet, a subsequent segmented packet corresponding to the new service request packet, and a response packet corresponding to the segmented packet are transmitted through a second path. Another service request packet and a corresponding service response packet are transmitted through the third path.

S1809: The T-PSA sends the new service request packet to the T-AS through the fourth transport layer connection.

The fourth transport layer connection and the third transport layer connection form the second path.

It should be understood that, that the T-PSA sends the new service request packet to the T-AS through the fourth transport layer connection may also be understood as that the T-PSA switches a data transmission path from a first path to the second path.

It should be further understood that if the determining result in S1808 is "yes", the T-AS subsequently sends a response packet for the new service request packet to the UE through the second path.

According to the method provided in this application, a TCP connection is established between the S-PSA and the UE. When determining that path switching needs to be performed, the S-PSA migrates the TCP connection status on the S-PSA to the T-PSA. In addition, after detecting the new service request packet sent by the UE, the T-PSA switches a transmission path of the service request packet from the TCP connection between the T-PSA and the S-AS to a TCP connection between the T-PSA and the T-AS.

According to this method, it can be ensured that a complete status interaction process is performed on a same path, to ensure an ultra-low latency requirement of an application in an application migration process.

Figure 19:
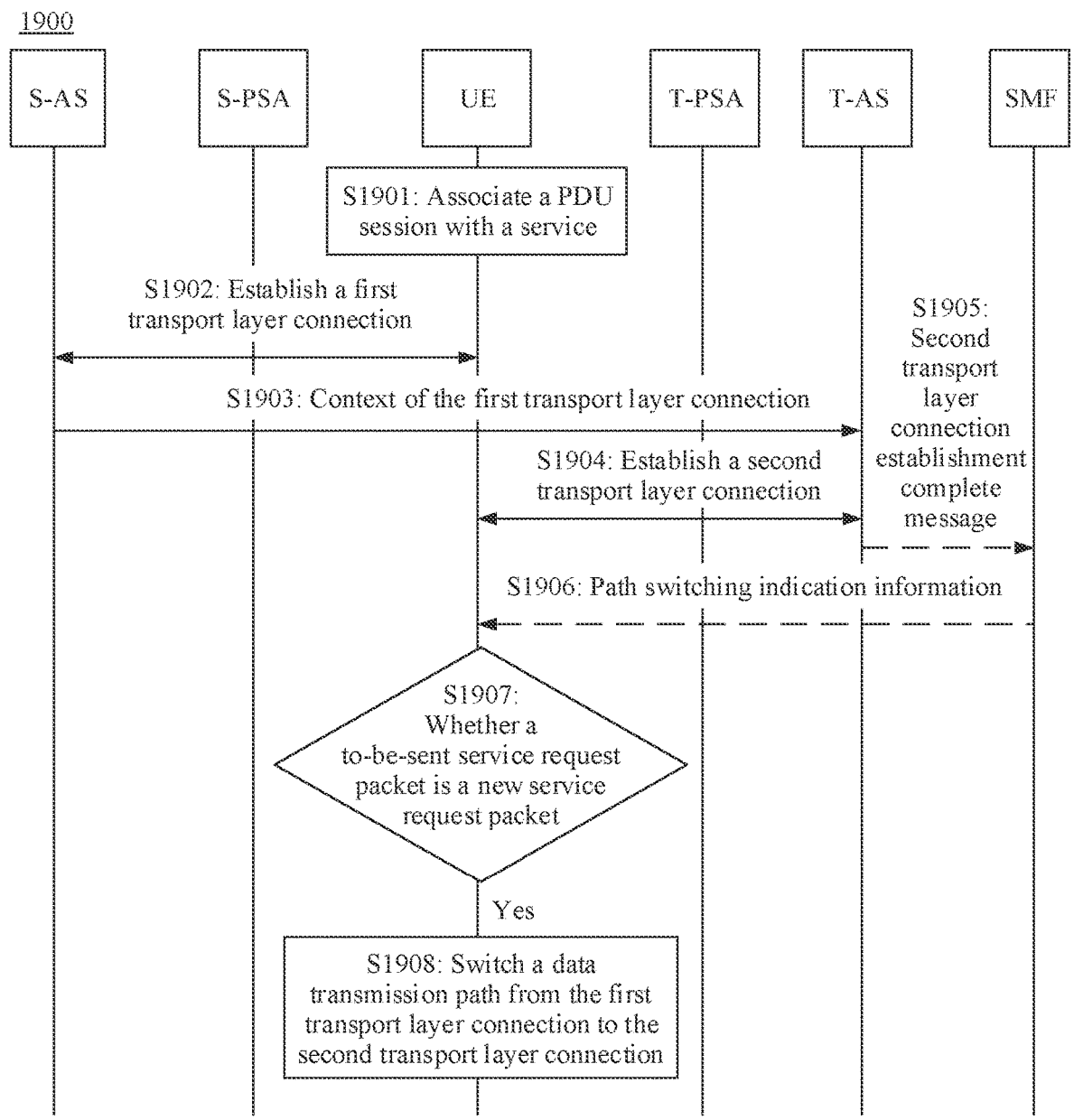
FIG. 19 is a schematic diagram of a data transmission path before and after path switching.

FIG. 19 is a schematic flowchart of another path switching method according to this application. The method 1900 is described with reference to FIG. 19.

S1901 to S1906 are the same as S1501 to S1506. For details, refer to S1501 to S1506.

S1907: UE determines whether a to-be-sent service request packet is a new service request packet.

To be specific, the UE determines whether the to-be-sent service request packet meets one of the following:

the to-be-sent service request packet is a segmented service request packet and is the first segment of a complete service request packet corresponding to the to-be-sent service request packet; or the to-be-sent service request packet is not a segmented service request packet.

If the to-be-sent service request packet meets one of the foregoing, S1908 is performed. If the to-be-sent service request packet does not meet one of the foregoing, S1908 is not performed.

S1908: The UE switches a data transmission path from a first transport layer connection to a second transport layer connection.

That is, the UE sends the to-be-sent service request packet through the second transport layer connection. Subsequently, information between a T-AS and the UE is transmitted through the second transport layer connection.

Optionally, the UE may further set a TCP option of an MPTCP packet sent through the second transport layer connection, and specifically set a flag B of an MP_PRIO option to 0, to indicate to a T-PSA that a priority of the second transport layer connection is higher than that of the first transport layer connection.

Optionally, S1905 and S1906 may not be performed. For example, after the UE and the T-AS complete an MPTCP three-way handshake process and establish the second transport layer connection, if the to-be-sent service request packet is the new service request packet, the UE switches the data transmission path from the first transport layer connection to the second transport layer connection.

According to the method provided in this application, an S-AS and the T-AS each may establish a transport layer connection to the UE. When path switching needs to be performed, the UE switches from the transport layer connection to the S-AS to the transport layer connection to the T-AS if the UE determines that the to-be-sent service request packet is the new service request packet. According to the method, it can be ensured that path switching is performed after a complete status interaction process is completed, to ensure an ultra-low latency requirement of an application in an application migration process. It should be understood that the method shown in FIG. 19 may be applied to two modes, that is, an SSC mode 3 and a UL CL mode. For the SSC mode 3 mode or the UL CL mode, data transmission paths before and after path switching are those shown in FIG. 16.

Figure 20:
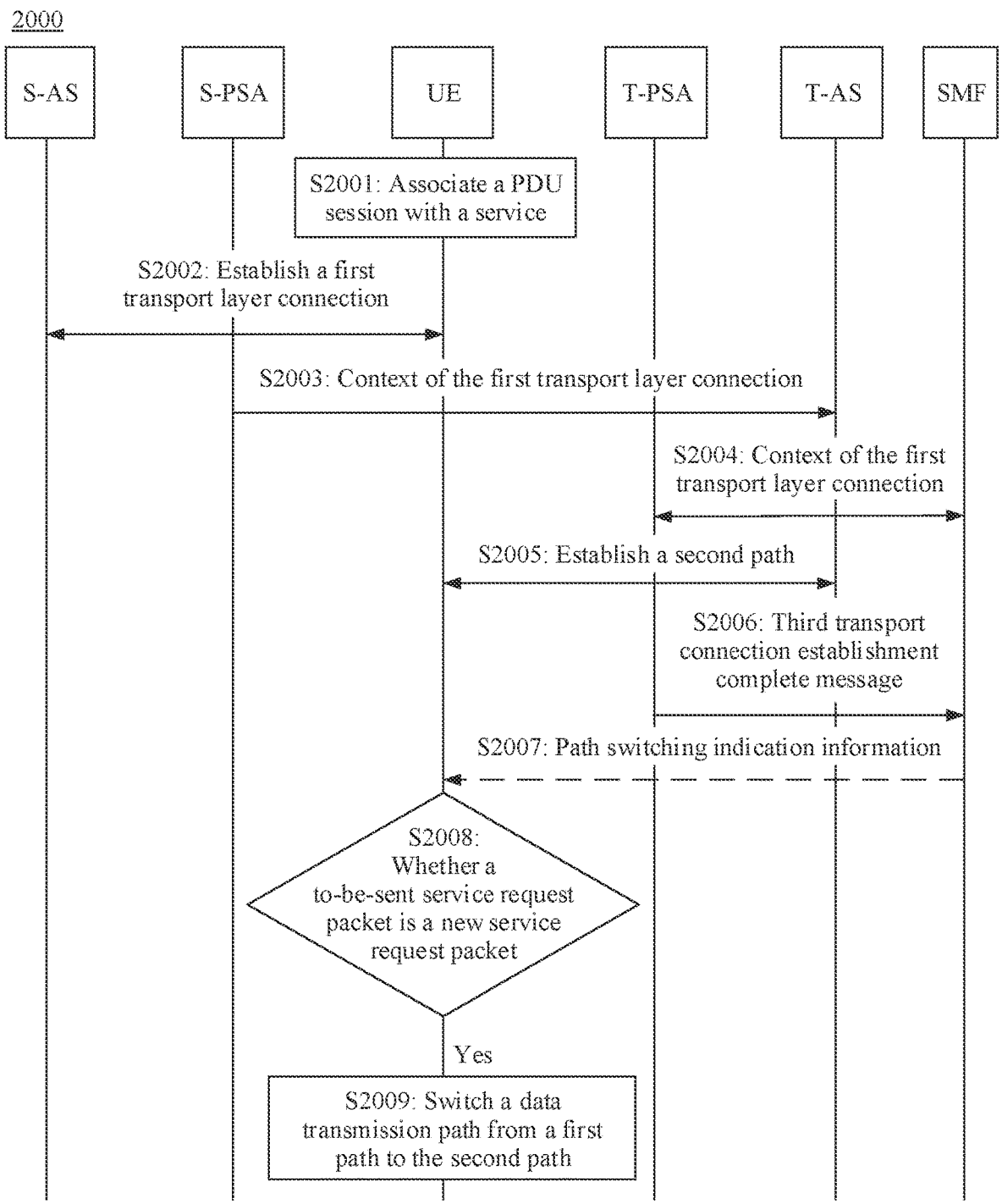
FIG. 20 is a schematic diagram of a data transmission path before and after path switching.

FIG. 20 is a schematic flowchart of another path switching method according to this application. The method 2000 is described with reference to FIG. 20.

S2001 to S2007 are the same as S1301 to S1307. For details, refer to S1301 to S1307.

Optionally, S2007 may not be performed. To be specific, an SMF does not indicate UE to perform path switching, but the UE autonomously determines to perform path switching.

For example, if establishment of a third transport layer connection is completed, the UE determines that path switching needs to be performed. A method used by the UE to determine that the establishment of the third transport layer connection is completed may be as follows: When establishing the third transport layer connection, the UE receives an ACK message sent by a T-PSA in a three-way handshake process, and the UE may determine that the establishment of the third transport layer connection is completed.

S2008: The UE determines whether a to-be-sent service request packet is a new service request packet.

To be specific, the UE determines whether the to-be-sent service request packet meets one of the following:

the to-be-sent service request packet is a segmented service request packet and is the first segment of a complete service request packet corresponding to the to-be-sent service request packet; or the to-be-sent service request packet is not a segmented service request packet.

If the to-be-sent service request packet meets one of the foregoing, S2009 is performed. If the to-be-sent service request packet does not meet one of the foregoing, S2009 is not performed.

S2009: The UE switches a data transmission path from a first path to a second path.

In other words, the UE switches the data transmission path from a first transport layer connection to the third transport layer connection.

Optionally, the UE further sets a TCP option of an MPTCP packet sent on the third transport layer connection, and sets a flag B of an MP_PRIO option to 0, to indicate to the T-PSA that a priority of the third transport layer connection is higher than that of the first transport layer connection and data is transmitted through the third transport layer connection.

According to the method provided in this application, the S-PSA and the T-PSA each may establish an MPTCP connection to the UE. When path switching needs to be performed, the UE switches from a transport layer connection to an S-AS to a transport layer connection to a T-AS if the UE determines that the to-be-sent service request packet is the new service request packet. According to the method, it can be ensured that path switching is performed after a complete status interaction process is completed, to ensure an ultra-low latency requirement of an application in an application migration process.

It should be understood that the method shown in FIG. 20 may be applied to two modes, that is, an SSC mode 3 and a UL CL mode. For the SSC mode 3 mode, data transmission paths before and after path switching are those shown in FIG. 6. For the UL CL mode, data transmission paths before and after path switching are those shown in FIG. 7.

The foregoing describes in detail the methods provided in the embodiments of this application with reference to FIG. 4 to FIG. 20. The following describes in detail apparatuses provided in the embodiments of this application with reference to FIG. 21 to FIG. 23.

Figure 21:
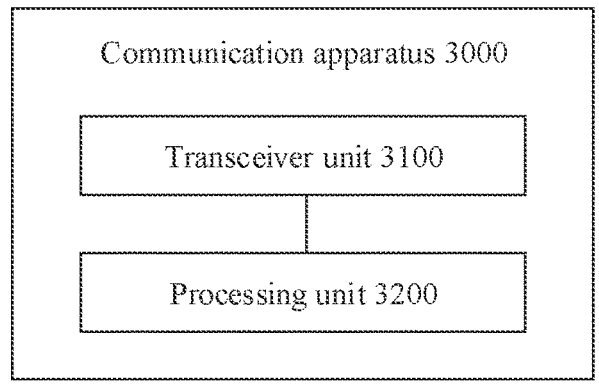
FIG. 21 is a schematic block diagram of a communication apparatus according to an embodiment of this application.

FIG. 21 is a schematic block diagram of a communication apparatus according to an embodiment of this application. As shown in FIG. 21, the communication apparatus 3000 may include a transceiver unit 3100 and a processing unit 3200.

The transceiver unit 3100 may be configured to receive information (or a message) sent by another apparatus, and may be further configured to send information (or a message) to the another apparatus, for example, send switching indication information or receive switching indication information. The processing unit 3200 may be configured to perform internal processing of the apparatus, for example, switch a data transmission path from a first path to a second path.

In a possible design, the communication apparatus 3000 may correspond to the source transport layer proxy network element (for example, the S-PSA or the S-MEC) in the foregoing method embodiments. For example, the communication apparatus 3000 may be a source transport layer proxy network element, or may be a chip in the source transport layer proxy network element. The communication apparatus 3000 may include units configured to perform operations performed by the source transport layer proxy network element in the foregoing method embodiments, and the units in the communication apparatus 3000 are respectively configured to implement the operations performed by the source transport layer proxy network element in the foregoing method embodiments.

For example, the processing unit 3200 is configured to: if determining that path switching needs to be performed, switch a data transmission path from a first path to a second path after the transceiver unit 3100 receives a complete service response packet sent by a first application server for a service request. The first path is a path established between a terminal device and the first application server, the first path includes a first transport layer connection and a second transport layer connection, the first transport layer connection is a transport layer connection between the communication apparatus 3000 and the terminal device, the second transport layer connection is a transport layer connection between the communication apparatus 3000 and the first application server, the second path includes a third transport layer connection and a fourth transport layer connection, the third transport layer connection is a transport layer connection between a target transport layer proxy network element and the terminal device, and the fourth transport layer connection is a transport layer connection between the target transport layer proxy network element and a second application server.

In a possible design, the communication apparatus 3000 may correspond to the target transport layer proxy network element (for example, the T-PSA or the T-MEC) in the foregoing method embodiments. For example, the communication apparatus 3000 may be a target transport layer proxy network element, or may be a chip in the target transport layer proxy network element. The communication apparatus 3000 may include units configured to perform operations performed by the target transport layer proxy network element in the foregoing method embodiments, and the units in the communication apparatus 3000 are respectively configured to implement the operations performed by the target transport layer proxy network element in the foregoing method embodiments.

For example, the transceiver unit 3100 is configured to receive a context of a first transport layer connection, where the first transport layer connection is a transport layer connection between a source transport layer proxy network element and a terminal device. The processing unit 3200 is configured to establish a third transport layer connection to the terminal device based on the context. After establishment of the third transport layer connection is completed, the transceiver unit 3100 is configured to send a third transport layer connection establishment complete message to a session management network element or the source transport layer proxy network element, where the third transport layer connection establishment complete message is used to indicate that the establishment of the third transport layer connection is completed.

In a possible design, the communication apparatus 3000 may correspond to the first application server (for example, the S-AS) in the foregoing method embodiments. For example, the communication apparatus 3000 may be a first application server, or may be a chip in the first application server. The communication apparatus 3000 may include units configured to perform operations performed by the first application server in the foregoing method embodiments, and the units in the communication apparatus 3000 are respectively configured to implement the operations performed by the first application server in the foregoing method embodiments.

In a possible design, the communication apparatus 3000 may correspond to the second application server (for example, the T-AS) in the foregoing method embodiments. For example, the communication apparatus 3000 may be a second application server, or may be a chip in the second application server. The communication apparatus 3000 may include units configured to perform operations performed by the second application server in the foregoing method embodiments, and the units in the communication apparatus 3000 are respectively configured to implement the operations performed by the second application server in the foregoing method embodiments.

In a possible design, the communication apparatus 3000 may correspond to the session management network element (for example, the SMF) in the foregoing method embodiments. For example, the communication apparatus 3000 may be a session management network element, or may be a chip in the session management network element. The communication apparatus 3000 may include units configured to perform operations performed by the session management network element in the foregoing method embodiments, and the units in the communication apparatus 3000 are respectively configured to implement the operations performed by the session management network element in the foregoing method embodiments.

For example, the transceiver unit 3100 is configured to: obtain a context of a first transport layer connection, where the first transport layer connection is a transport layer connection between a source transport layer proxy network element and a terminal device; and when a protocol data unit PDU session anchor for the terminal device needs to be changed, send the context of the first transport layer connection to a target transport layer proxy network element, where the context is used to establish a third transport layer connection between the target transport layer proxy network element and the terminal device.

In a possible design, the communication apparatus 3000 may correspond to the UE in the foregoing method embodiments. For example, the communication apparatus 3000 may be UE, or may be a chip in the UE. The communication apparatus 3000 may include units configured to perform operations performed by the UE in the foregoing method embodiments, and the units in the communication apparatus 3000 are respectively configured to implement the operations performed by the UE in the foregoing method embodiments.

For example, the processing unit 3200 is configured to: when determining that path switching needs to be performed, switch a data transmission path from a first path to a second path after the transceiver unit 3100 receives a complete service response packet for a service request. The first path is a path established between the communication apparatus 3000 and a first application server, the first path includes a first transport layer connection and a second transport layer connection, the first transport layer connection is a transport layer connection between a source transport layer proxy network element and the communication apparatus 3000, the second transport layer connection is a transport layer connection between the source transport layer proxy network element and the first application server, the second path includes a third transport layer connection and a fourth transport layer connection, the third transport layer connection is a transport layer connection between a target transport layer proxy network element and the communication apparatus 3000, and the fourth transport layer connection is a transport layer connection between the target transport layer proxy network element and a second application server.

For example, the first transport layer connection is established between the communication apparatus 3000 and the first application server, and the second transport layer connection is established between the communication apparatus 3000 and the second application server. The processing unit 3200 is configured to: when determining that path switching needs to be performed, switch a data transmission path from the first transport layer connection to the second transport layer connection after the transceiver unit 3100 receives a complete service response packet sent by the first application server for a service request, where the service request comes from the communication apparatus 3000.

Figure 22:
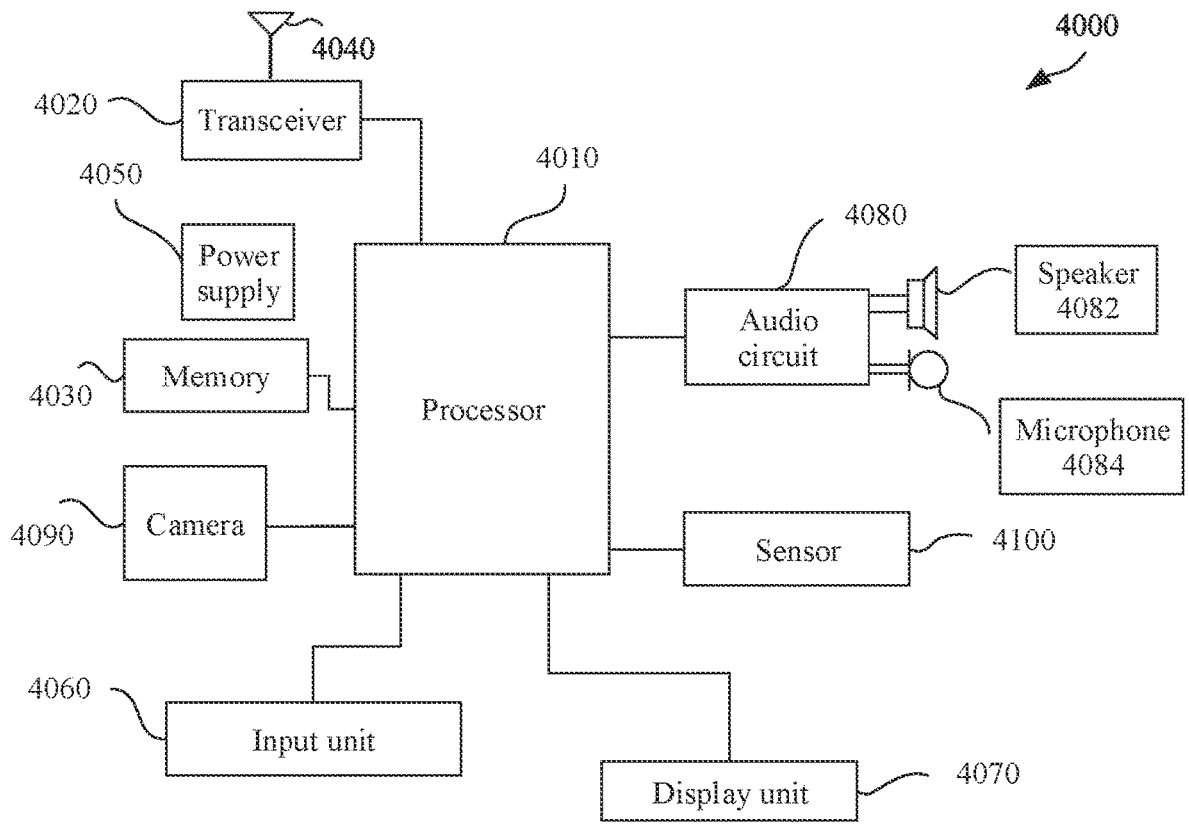
FIG. 22 is a schematic diagram of a structure of a terminal device according to an embodiment of this application.

It should be understood that, when the communication apparatus 3000 is the UE, the transceiver unit 3100 in the communication apparatus 3000 may correspond to a transceiver 4020 in a terminal device 4000 shown in FIG. 22, and the processing unit 3200 in the communication apparatus 3000 may correspond to a processor 4010 in the terminal device 4000 shown in FIG. 22.

It should be further understood that, when the communication apparatus 3000 is the chip disposed in the UE, the transceiver unit 3100 in the communication apparatus 3000 may be an input/output interface.

Figure 23:
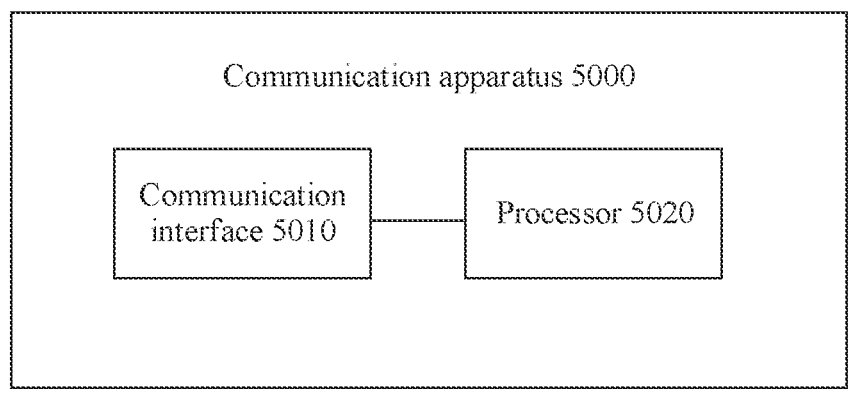
FIG. 23 is a schematic block diagram of another communication apparatus according to an embodiment of this application.

It should be understood that when the communication apparatus 3000 corresponds to the source transport layer proxy network element, the target transport layer proxy network element, the first application server, the second application server, or the session management network element, the transceiver unit 3100 in the communication apparatus 3000 may correspond to a communication interface 5010 shown in FIG. 23, and the processing unit 5200 may correspond to a processor 5020 shown in FIG. 23.

It should be understood that the apparatus shown in FIG. 21 may be configured to perform an operation performed by any network element in the foregoing method embodiments. For details, refer to the descriptions in the method embodiments. Details are not described herein again.

FIG. 22 is a schematic diagram of a structure of a terminal device 4000 according to an embodiment of this application. The terminal device 4000 may be applied to the system shown in FIG. 1, and performs a function of the terminal device (or the UE) in the foregoing method embodiments. As shown in FIG. 22, the terminal device 4000 includes a processor 4010 and a transceiver 4020. Optionally, the terminal device 4000 further includes a memory 4030. The processor 4010, the transceiver 4020, and the memory 4030 may communicate with each other through an internal connection path, and transfer a control signal or a data signal. The memory 4030 is configured to store a computer program. The processor 4010 is configured to: invoke the computer program from the memory 4030 and run the computer program, to control the transceiver 4020 to receive/send a signal. Optionally, the terminal device 4000 may further include an antenna 4040, configured to send, by using a radio signal, uplink data or uplink control signaling output by the transceiver 4020.

The processor 4010 and the memory 4030 may be integrated into one processing apparatus. The processor 4010 is configured to execute program code stored in the memory 4030 to implement the foregoing functions. During specific implementation, the memory 4030 may alternatively be integrated into the processor 4010, or may be independent of the processor 4010. The processor 4010 may correspond to the processing unit in FIG. 21.

The transceiver 4020 may correspond to the transceiver unit in FIG. 21. The transceiver 4020 may include a receiver (also referred to as a receiver machine or a receiver circuit) and a transmitter (also referred to as a transmitter machine or a transmitter circuit). The receiver is configured to receive a signal, and the transmitter is configured to transmit a signal.

It should be understood that the terminal device 4000 shown in FIG. 22 can implement processes related to the terminal device in any one of the foregoing method embodiments. Operations or functions of the modules in the terminal device 4000 are respectively intended to implement corresponding procedures in the foregoing method embodiments. For details, refer to the descriptions in the foregoing method embodiments. To avoid repetition, detailed descriptions are properly omitted herein.

The processor 4010 may be configured to perform an action that is implemented inside the terminal device and that is described in the foregoing method embodiments, and the transceiver 4020 may be configured to perform an action of receiving or sending that is performed by the terminal device from or to the network device and that is described in the foregoing method embodiments. For details, refer to the descriptions in the foregoing method embodiments. Details are not described herein again.

Optionally, the terminal device 4000 may further include a power supply 4050, configured to supply power to various components or circuits in the terminal device.

In addition, to make functions of the terminal device more perfect, the terminal device 4000 may further include one or more of an input unit 4060, a display unit 4070, an audio circuit 4080, a camera 4090, a sensor 4100, and the like, and the audio circuit may further include a speaker 4082, a microphone 4084, and the like.

FIG. 23 is a schematic diagram of a structure of a communication apparatus according to an embodiment of this application. It should be understood that the communication apparatus 5000 shown in FIG. 23 is merely an example. The communication apparatus in this embodiment of this application may further include another module or unit, or include a module with a function similar to that of each module in FIG. 23, or may not necessarily include all modules in FIG. 23.

The communication apparatus 5000 includes a communication interface 5010 and at least one processor 5020.

The communication apparatus 5000 may correspond to any one of a source transport layer proxy network element, a target transport layer proxy network element, a first application server, a second application server, and a session management network element. The at least one processor 5020 executes program instructions, so that the communication apparatus 5000 implements a corresponding procedure of a method performed by a corresponding network element in the foregoing method embodiments.

Optionally, the communication apparatus 5000 may further include a memory. The memory may store program instructions, and the at least one processor 5020 may read the program instructions stored in the memory and execute the program instructions.

The processor in this embodiment of this application may be a central processing unit (Central Processing Unit, CPU), or the processor may be another general-purpose processor, a digital signal processor (digital signal processor, DSP), an application specific integrated circuit (application specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor or the like.

According to the method provided in the embodiments of this application, this application further provides a computer program product. The computer program product includes computer program code. When the computer program code is run on a computer, the computer is enabled to perform the method on the terminal device side in any one of the foregoing method embodiments.

According to the method provided in the embodiments of this application, this application further provides a computer-readable medium. The computer-readable medium stores program code. When the program code is run on a computer, the computer is enabled to perform the method on the source transport layer proxy network element side in the foregoing method embodiments.

According to the method provided in the embodiments of this application, this application further provides a computer-readable medium. The computer-readable medium stores program code. When the program code is run on a computer, the computer is enabled to perform the method on the target transport layer proxy network element side in the foregoing method embodiments.

According to the method provided in the embodiments of this application, this application further provides a computer-readable medium. The computer-readable medium stores program code. When the program code is run on a computer, the computer is enabled to perform the method on the first application server side in the foregoing method embodiments.

According to the method provided in the embodiments of this application, this application further provides a computer-readable medium. The computer-readable medium stores program code. When the program code is run on a computer, the computer is enabled to perform the method on the second application server side in the foregoing method embodiments.

According to the method provided in the embodiments of this application, this application further provides a computer-readable medium. The computer-readable medium stores program code. When the program code is run on a computer, the computer is enabled to perform the method on the session management network element side in the foregoing method embodiments.

According to the method provided in the embodiments of this application, this application further provides a system, including at least one of the terminal device, the source transport layer proxy network element, the target transport layer proxy network element, the first application server, the second application server, and the session management network element in any one of the foregoing method embodiments.

An embodiment of this application further provides a processing apparatus, including a processor and an interface. The processor is configured to perform the method in any one of the foregoing method embodiments.

It should be understood that, the processing apparatus may be a chip. For example, the processing apparatus may be a field programmable gate array (field programmable gate array, FPGA), or may be a general-purpose processor, a digital signal processor (digital signal processor, DSP), an application specific integrated circuit (application specific integrated circuit, ASIC), a field programmable gate array (field programmable gate array, FPGA) or another programmable logic device, a discrete gate or a transistor logic device, a discrete hardware component, may be a system on chip (system on chip, SoC), may be a central processing unit (central processor unit, CPU), may be a network processor (network processor, NP), may be a digital signal processing circuit (digital signal processor, DSP), may be a micro controller unit (micro controller unit, MCU), and may be a programmable controller (programmable logic device, PLD) or another integrated chip. The processor may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and implements the steps in the foregoing methods in combination with hardware of the processor.

It may be understood that the memory in the embodiments of this application may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. Through examples but not imitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced. SDRAM, ESDRAM), a synchlink dynamic random access memory (synchlink DRAM, SLDRAM), and a direct rambus random access memory (direct rambus RAM, DR RAM). It should be noted that the memories of the systems and methods described in this specification are intended to include but are not limited to these memories and a memory of any other proper type.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state disc, SSD)), or the like.

The network device and the terminal device in the foregoing apparatus embodiments exactly correspond to the network device and the terminal device in the method embodiments. A corresponding module or unit performs a corresponding step. For example, a communication unit (a transceiver) performs a receiving step or a sending step in the method embodiments, and a processing unit (a processor) may perform a step other than the sending step and the receiving step. For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that is run on a processor, the processor, an object, an executable file, a thread of execution, a program, or a computer. As shown in figures, both a computing device and an application that runs on a computing device may be components. One or more components may reside within a process or a thread of execution, and a component may be located on one computer or distributed between two or more computers. In addition, these components may be executed from various computer-readable media that store various data structures. For example, the components may perform communication by using a local or remote process and based on, for example, a signal having one or more data packets (for example, data from two components interacting with another component in a local system, a distributed system, or across a network such as the Internet interacting with other systems by using the signal).

It should be understood that "an embodiment" mentioned in the entire specification particular features, structures, or characteristics related to the embodiment are included in at least one embodiment of this application. Therefore, the embodiments in the entire specification are not necessarily same embodiments. In addition, these particular features, structures, or characteristics may be combined in one or more embodiments in any appropriate manner.

It should be understood that, in the embodiments of this application, numbers "first", "second", and the like are merely used to distinguish between different objects, for example, to distinguish between different network devices, and do not constitute a limitation on the scope of the embodiments of this application. The embodiments of this application are not limited thereto.

It should be further understood that in this application, "when" and "if" mean that the network element performs corresponding processing in an objective situation, and are not intended to limit time, and the network element is not necessarily required to have a determining action during implementation, and do not mean any other limitation.

It should be further understood that in the embodiments of this application, "B corresponding to A" indicates that B is associated with A, and B may be determined based on A. However, it should be further understood that determining B based on A does not mean that B is determined based on only A. B may also be alternatively determined based on A and/or other information.

It should be further understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally represents an "or" relationship between the associated objects.

Unless otherwise stated, an expression used in this application similar to an expression that "an item includes one or more of the following: A, B, and C" usually means that the item may be any one of the following cases: A; B; C; A and B; A and C; B and C; A, B, and C: A and A; A, A, and A; A, A, and B; A, A, and C; A, B, and B; A, C, and C; B and B; B, B, and B; B, B, and C; C and C; C, C, and C; and other combinations of A, B, and C. The foregoing uses three elements A, B, and C as an example to describe an optional case of the item. When the expression is "the item includes at least one of the following: A, B, . . . , and X", in other words, more elements are included in the expression, a case to which the item is applicable may also be obtained according to the foregoing rule.

It may be understood that in the embodiments of this application, the terminal device and/or the network device may perform some or all steps in the embodiments of this application. These steps or operations are merely examples. In the embodiments of this application, other operations or variations of various operations may be further performed. In addition, the steps may be performed in a sequence different from that presented in the embodiments of this application, and not all the operations in the embodiments of this application are necessarily performed.

A person of ordinary skill in the art may be aware that, with reference to the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other similar forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or a part contributing to an existing technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk drive, a read-only memory ROM, a random access memory RAM, a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A path switching method, comprising:
    obtaining, by a session management network element, a context of a first transport layer connection by using a first N4 session modification request message, wherein the first transport layer connection is between a source transport layer proxy network element and a terminal device; and
    in response to determining that a protocol data unit (PDU) session anchor for the terminal device needs to be changed, sending, by the session management network element, the context of the first transport layer connection to a target transport layer proxy network element by using a second N4 session modification request message, wherein the context is used to establish a third transport layer connection between the target transport layer proxy network element and the terminal device.

2. The method according to claim 1, wherein the method further comprises:
    in response to determining that establishment of the third transport layer connection is completed, sending, by the session management network element, path switching indication information to the source transport layer proxy network element, wherein the path switching indication information indicates to switch a data transmission path from the first transport layer connection to the third transport layer connection.

3. The method according to claim 2, wherein the path switching indication information indicates to modify a priority of the first transport layer connection, a priority of the third transport layer connection is higher than the priority of the first transport layer connection after modifying the priority of the first transport layer connection.

4. The method according to claim 1, wherein the first transport layer connection and the third transport layer connection are multipath transmission control protocol (MPTCP) connections, and the first transport layer connection and the third transport layer connection belong to a same MPTCP session.

5. The method according to claim 1, wherein both the source transport layer proxy network element and the target transport layer proxy network element are user plane network elements.

6. A path switching method, wherein a first transport layer connection is established between a terminal device and a first application server, a second transport layer connection is established between the terminal device and a second application server, and the method comprises:
    in response to at least determining that path switching needs to be performed and determining that a service response message from the first application server for a service request is not a segment response message or that the service response message for the service request is a last segment response message, switching a data transmission path from the first transport layer connection to the second transport layer connection, wherein the service request comes from the terminal device.

7. The method according to claim 6, wherein the determining that path switching needs to be performed comprises:
    receiving path switching indication information sent by a session management network element.

8. The method according to claim 6, wherein the first transport layer connection and the second transport layer connection are multipath transmission control protocol (MPTCP) connections, and the first transport layer connection and a third transport layer connection belong to a same MPTCP session.

9. The method according to claim 6, wherein the first application server and the second application server provide a same application service.

10. A session management network element, comprising:
    at least one processor; and
    one or more memories coupled to the at least one processor and storing programming instructions for execution by the at least one processor to:
        obtain a context of a first transport layer connection by using a first N4 session modification request message, wherein the first transport layer connection is between a source transport layer proxy network element and a terminal device; and in response to determining that a protocol data unit (PDU) session anchor needs to be changed, send the context of the first transport layer connection to a target transport layer proxy network element by using a second N4 session modification request message, wherein the context is used to establish a third transport layer connection between the target transport layer proxy network element and the terminal device.

11. The session management network element according to claim 10, wherein the programming instructions are for execution by the at least one processor to:

in response to determining that establishment of the third transport layer connection is completed, send path switching indication information to the source transport layer proxy network element, wherein the path switching indication information indicates to switch a data transmission path from the first transport layer connection to the third transport layer connection.

12. The session management network element according to claim 11, wherein the path switching indication information indicates to modify a priority of the first transport layer connection, and a priority of the third transport layer connection is higher than the priority of the first transport layer connection after modifying the priority of the first transport layer connection.

13. The session management network element according to claim 10, wherein the first transport layer connection and the third transport layer connection are multipath transmission control protocol (MPTCP) connections, and the first transport layer connection and the third transport layer connection belong to a same MPTCP session.

14. The session management network element according to claim 10, wherein both the source transport layer proxy network element and the target transport layer proxy network element are user plane network elements.

15. A communication apparatus, comprising:
at least one processor; and
one or more memories coupled to the at least one processor and storing programming instructions for execution by the at least one processor to:
in response to at least determining that path switching needs to be performed and determining that a service response message from a first application server for a service request is not a segment response message or that the service response message for the service request is a last segment response message, switch a data transmission path from a first transport layer connection to a second transport layer connection, wherein the first transport layer connection is established between a terminal device and the first application server, the second transport layer connection is established between the terminal device and a second application server, and the service request comes from the terminal device.

16. The communication apparatus according to claim 15, wherein the determining that path switching needs to be performed comprises:
receiving path switching indication information from a session management network element.

17. The communication apparatus according to claim 15, wherein the first transport layer connection and the second transport layer connection are multipath transmission control protocol (MPTCP) connections, and the first transport layer connection and a third transport layer connection belong to a same MPTCP session.

18. The communication apparatus according to claim 15, wherein the first application server and the second application server provide a same application service.

19. The method according to claim 6, wherein the determining that a service response message from the first application server for a service request is not a segment response message or that the service response message for the service request is the last segment response message is based on a message status code in the service response message.

* * * * *

UNITED STATES PATENT AND TRADEMARK OFFICE
CERTIFICATE OF CORRECTION

| | |
|---|---|
| PATENT NO. | : 12,245,132 B2 |
| APPLICATION NO. | : 17/687195 |
| DATED | : March 4, 2025 |
| INVENTOR(S) | : Fang Yu and Yan Li |

It is certified that error appears in the above-identified patent and that said Letters Patent is hereby corrected as shown below:

On the Title Page

In Column 1 (Foreign Application Priority Data), In Line 1, Delete "(WO)" and insert -- (CN) --.

In the Specification

In Column 1, In Line 10-11, Delete "PCT/CN2019/104509," and insert -- PCT/CN2019/104809, --.

Signed and Sealed this
Twenty-second Day of July, 2025

Coke Morgan Stewart
*Acting Director of the United States Patent and Trademark Office*